United States Patent [19]
Yoshimoto et al.

[11] Patent Number: 5,933,534
[45] Date of Patent: Aug. 3, 1999

[54] IMAGE INFORMATION ENCODING APPARATUS, IMAGE INFORMATION DECODING APPARATUS, AND IMAGE INFORMATION RECORDING AND REPRODUCING SYSTEM

[75] Inventors: Masakazu Yoshimoto; Tsutomu Yamamoto, both of Kanagawa, Japan

[73] Assignee: Sony Corporation, Tokyo, Japan

[21] Appl. No.: 08/656,431

[22] Filed: May 30, 1996

[30] Foreign Application Priority Data

Jun. 2, 1995 [JP] Japan .................................. 7-136937

[51] Int. Cl.⁶ .................................................. G06K 9/36
[52] U.S. Cl. ............................................................ 382/236
[58] Field of Search .................................. 382/232, 236, 382/238, 239, 250, 251; 348/390, 394, 395, 400, 401, 402, 403, 405, 409, 412, 415, 419, 420, 424, 425, 431

[56] References Cited

U.S. PATENT DOCUMENTS

| 4,692,801 | 9/1987 | Ninomiya et al. | 348/425 |
| 4,745,459 | 5/1988 | Ninomiya et al. | 348/431 |
| 4,979,037 | 12/1990 | Mizutani et al. | 348/424 |
| 5,144,427 | 9/1992 | Kitaura et al. | 348/402 |
| 5,347,308 | 9/1994 | Wai | 348/420 |
| 5,661,523 | 8/1997 | Yamane | 348/390 |

Primary Examiner—Jose L. Couser
Attorney, Agent, or Firm—Frommer Lawrence & Haug, LLP.; William S. Frommer

[57] ABSTRACT

A video encoder enables a picture quality of a reproduced image to be improved and a moving object to move smoothly. Also this video encoder enable an edit to be carried out at the frame unit without deteriorating an encoding efficiency. The video encoder comprises a frame memory for storing therein image data of present frame, a frame memory for storing therein image data of preceding frame, an external memory control means for supplying read/write control signals to the frame memories, a motion detecting circuit for executing a motion detection processing by use of block data of present and preceding frames and image data of present and succeeding frames to provide first and second motion vector data, motion compensating circuits for extracting block data from preceding and succeeding frames based on the first and second motion vector data, a first adding circuit for adding and averaging these extracted block data, a second adding circuit for subtracting an output of the first adding circuit from block data of present frame, an intra-field/inter-frame switching control circuit for selecting the block data of present frame and difference data from the second adding circuit, a DCT circuit for compressing and encoding selected output and decoded information, a quantizing circuit and a variable-word length encoding circuit.

44 Claims, 15 Drawing Sheets

FIG. 13A
FIG. 13B
FIG. 13C
FIG. 13D
FIG. 13E

IMAGE INFORMATION ENCODING APPARATUS, IMAGE INFORMATION DECODING APPARATUS, AND IMAGE INFORMATION RECORDING AND REPRODUCING SYSTEM

BACKGROUND OF THE INVENTION

The present invention relates to an image information encoding apparatus, an image information decoding apparatus, and an image information recording and reproducing system for use with a digital VCR (video cassette recorder), and a disk drive, and an edit system using such devices.

FIGS. 1A and 1B of the accompanying drawings show a digital VCR as an example of an apparatus using a video encoder and a video decoder conforming to storage moving image encoding standard standardized based on standardization promoted according to the MPEG (moving picture image coding experts group). FIG. 1A shows, in block form, a recording system of digital VCR, and FIG. 1B shows, in block form, a reproducing system thereof.

As shown in FIG. 1A, the recording system of the digital VCR comprises an interface circuit 2 for converting an analog signal, supplied thereto through an input terminal 1 from a signal source (not shown), into digital data, an encoder 3 for encoding the digital data supplied thereto from the interface circuit 2, a shuffling circuit 4 for shuffling encoded output from the encoder 3 such that the encoded output is rearranged from the original data arrangement, an ECC (error correction code) encoder 5 for generating data string in the form of a product code by adding inner parity and outer parity to the output from the shuffling circuit 4, a channel encoder 6 for effecting digital modulation on the output from the ECC encoder 5, a recording amplifier 7 for amplifying in current the output from the channel encoder 6 and supplying the amplified output to recording heads 8, and a plurality of recording heads 8 mounted on a rotary drum (not shown) at a predetermined angular spacing.

The encoder 3 comprises a video encoder 3v for encoding video data of the digital data supplied thereto from the interface circuit 2 in a manner conforming to the above storage moving image coding standard, and an audio encoder 3a for encoding audio data in the digital data supplied thereto from the interface circuit 2.

An operation of the recording system of the digital VCR shown in FIG. 1A will be described.

The analog signal from the signal source, not shown, is supplied to the interface circuit 2, and converted into digital data by the interface circuit 2. The digital data from the interface circuit 2 is supplied to the encoder 3.

Of the digital data supplied to the encoder 3, the video data is supplied to the video encoder 3v, and encoded by the video encoder 3v. Of the digital data supplied to the encoder 3, the audio data is supplied to the audio encoder 3a, and encoded by the audio encoder 3a.

The video data encoded by the video encoder 3v and the audio data encoded by the audio encoder 3a are both supplied to the shuffling circuit 4. The video and audio data supplied to the shuffling circuit 4 are rearranged such that data arrangements thereof become different from those obtained when they are inputted to the recording system. The video data and audio data shuffled by the shuffling circuit 4 are sequentially supplied to the ECC encoder 5. The video and audio data supplied to the ECC encoder 5 are added with the inner parity and the outer parity, and thereby converted in the form of data string of product code. The video and audio data that had been converted in the form of data string of product code by the ECC encoder 5 are further added with decode information EDa supplied from the encoder 3, and supplied to and digitally modulated by the channel encoder 6. The video and audio data thus digitally modulated by the channel encoder 6 are supplied through the recording amplifying circuit 7 to the recording heads 8, and recorded on the magnetic tape 9 by the recording heads 8 so as to form slant tracks.

As shown in FIG. 1B, the reproducing system of the digital VCR comprises a plurality of recording heads 10 mounted on a rotary drum (not shown) at a predetermined angular spacing, a playback amplifying circuit 11 for amplifying playback RF signal reproduced by these reproducing heads 10, a waveform equalizing circuit 12 for equalizing a waveform of the playback RF signal by phase-correcting and amplitude-correcting the playback RF signal supplied thereto from the playback amplifying circuit 11, a channel decoder 13 for decoding the output from the waveform equalizing circuit 12, an ECC decoder 14 for error-correcting video data in the decoded output from the channel decoder 13 by the inner parity and the outer parity added to the video data, adding an error flag for error-concealing uncorrectable error by some suitable methods such as interpolation, error-correcting the audio data by use of the inner parity and the outer parity added to the audio data, and adding error flag for error-concealing uncorrectable error by some proper methods such as interpolation, a de-shuffling circuit 15 for reconverting data strings of the video and audio data supplied thereto from the ECC decoder 15 into original data strings obtained before these data are shuffled by the shuffling circuit 4 upon recording, a decoder 16 for decoding the video and audio data supplied thereto from the de-shuffling circuit 15 based on the decode information DDa from the ECC decoder 14 to provide original video and audio data, an error concealing circuit 17 for error-concealing the video data when the error flag is added to the video data from the decoder 16, and error-concealing the audio data when the error flag is added to the audio data from the decoder 16, and an interface circuit 18 for converting the video and audio data supplied thereto from the error-concealing circuit 17 into analog video signals, and outputting the analog video and audio signals through an output terminal 19.

The decoder 16 comprises a video decoder 16v for decoding the video data supplied thereto from the de-shuffling circuit 15 in a manner conforming to the storage moving image coding standard, and an audio decoder 16a for decoding the audio data supplied thereto from the de-shuffling circuit 15. While this reproducing system includes only one output terminal 19 in FIG. 1B, in actual practice, the output terminal 19 comprises a video signal output terminal and an audio signal output terminal although not shown.

An operation of the reproducing system of the digital VCR shown in FIG. 1B will be described.

Record data that has been recorded on the magnetic tape by the recording heads 8 so as to form oblique tracks is reproduced by the reproducing heads 10, and supplied through the playback amplifying circuit 11 to the waveform-equalizing circuit 12 as the playback RF signal. The playback RF signal supplied to the waveform-equalizing circuit 12 is waveform-equalized by phase-correction and amplitude-correction, and supplied to the channel decoder 13, in which it is demodulated. The video and audio data from the channel decoder 13 are supplied to the ECC decoder 14, and the inner parities and the outer parities added to the video and audio data are extracted by the ECC decoder 14. Then, the ECC decoder 14 error-corrects the video and audio data by the inner parities and outer parities thus extracted, and adds the error flags indicative of uncorrectable data to uncorrectable video and audio data.

The video and audio data from the ECC decoder 14 are supplied to the de-shuffling circuit 15, and reconverted by the de-shuffling circuit 15 into data arrangement obtained before the video and audio data are shuffled by the shuffling circuit 4 upon recording. The video and audio data from the de-shuffling circuit 15 are supplied to the decoder 16, and the video decoder 16*v* in the decoder 16 decodes the video data supplied to the decoder 16 based on the decode information DDA from the ECC decoder 14 to provide the original video data. The audio decoder 16*a* in the decoder 16 decodes the audio data supplied to the decoder 16 to provide the original audio data. The video and audio data from the decoder 16 are supplied to the error concealing circuit 17, and the error concealing circuit 17 error-conceals only video and audio data with the error flags added thereto. The video and audio data from the error concealing circuit 17 are supplied to and converted by the interface circuit 18 into analog video and audio signals, and outputted through the output terminal 19. When a television monitor is connected to the video signal output terminal of the output terminal 19 and a speaker is connected through an amplifier to an audio signal output terminal of the output terminal 19, the video signal is reproduced on a picture screen of the television monitor as an image, and the audio signal is emanated from the speaker as sounds.

The video encoder 3*v* shown in FIG. 1A will be described more fully with reference to FIG. 2. FIG. 2 shows, in block form, an inside arrangement of the video encoder 3*v* shown in FIG. 1A.

In the video encoder 3*v*, as shown in FIG. 2, the video data is supplied to an input terminal 20 from the interface circuit 2 shown in FIG. 1A. The input terminal 20 is connected to a first input terminal of a motion detecting circuit 21, the other input terminal of a motion compensating circuit 24 and an input terminal of a frame memory 22. An output terminal of the frame memory 22 is connected to a second input terminal of the motion detecting circuit 21, an input terminal of the frame memory 22, an adding-side input terminal of an adding circuit 27, an intra-side fixed contact b of a switch 28, and the other input terminal of an inter/intra judgement circuit 29. An output terminal of a frame memory 23 is connected to a third input terminal of the motion detecting circuit 21 and the other input terminal of a motion compensating circuit 25. An output terminal of the motion compensating circuit 24 is connected to one adding-side input terminal of an adding circuit 26 which incorporates therein a ½-multiplier. An output terminal of the motion compensating circuit 25 is connected to the other adding-side input terminal of the adding circuit 26, and an output terminal of the adding circuit 26 is connected to a subtracting-side input terminal of the adding circuit 27, and an output terminal of the adding circuit 27 is connected to an inter-side fixed contact a of the switch 28, and one input terminal of an inter/intra judgement circuit 61. A movable contact c of the switch 28 is connected to an input terminal of a DCT (discrete cosine transform) circuit 30, and an output terminal of the DCT circuit 30 is connected to an input terminal of a quantizing circuit 31. An output terminal of the quantizing circuit 31 is connected to an input terminal of a variable-word length encoding circuit 32, and an output terminal of the variable-word length encoding circuit 32 is connected through an output terminal 33 to the input terminal of the shuffling circuit 4 shown in FIG. 1A. The output terminal of the motion detecting circuit 21 is connected to input terminals of the motion compensating circuits 24, 25, and the input terminal of the variable-word length encoding circuit 32, and the frame memories 22, 23, the inter/intra judgement circuit 29, and the output terminal 33 for outputting the decode information EDa are connected to a controller 35.

The frame memories 22, 23 read and write image data in response to read/write control signals R/W supplied thereto from the controller 35.

At the time frame image data is stored in the frame memory 22, if the output of the frame memory is a present frame, then the frame image data supplied to the input terminal 20 becomes a future frame, and frame image data stored in the frame memory 23 becomes a past frame. The present frame will be referred to as "present frame", the future frame will be referred to as "succeeding frame", and the past frame will be referred to as "preceding frame", hereinafter, respectively.

The motion detecting circuit 21 motion-detects the frame image data supplied thereto through the input terminal 20, the frame image data read out from the frame memory 22, and the frame image data read out from the frame memory 23 at the unit of macroblock comprising 16 lines×16 pixels, for example. As a motion detecting method, there is known a motion detecting method based on a so-called full-search block matching, for example.

The block matching obtains difference absolute value sum data between macroblock data MB (f) of macroblock data MB (f) of present frame and macroblock data MB (f−1) of all preceding frames provided within a search area set in the preceding frame, and obtains motion vector data based on difference absolute sum data of smallest value, address of macroblock data MB (f−1) of preceding frame where the difference absolute value sum data could be obtained, and address of macroblock data MB (f) of present frame. The resultant motion vector data indicates macroblock data MB (f−1) of preceding frame having an optimum level arrangement pattern, i.e., level arrangement pattern most close to the level arrangement pattern of macroblock data MB (f) of present frame for calculating a difference between the macroblock data MB (f−1) of preceding frame and the macroblock data MB (f) of present frame. The motion compensation processing extracts the macroblock data MB (f−1) of preceding frame indicated by the motion vector data from the preceding frame.

The motion detecting circuit 21 motion-detects the macroblock data MB (f) of present frame stored in the frame memory and the macroblock data (f+1) of succeeding frame supplied thereto through the input terminal 20 to provide motion vector data MV based on a motion-detected result. The motion detecting circuit 21 motion-detects the macroblock data of present frame stored in the frame memory 22 and the macroblock data MB (f−1) of preceding frame stored in the frame memory 23 to provide motion vector data MV based on a motion-detected result.

While the signal link connected to the output terminal of the motion detecting circuit 21 is shown by a single line and only one "MV" is referred to as a symbol indicating motion vector data in FIG. 2, the number of motion vector data is not limited thereto, and motion vector data of all macroblocks of frame image data stored in the frame memory can be provided each time motion detection is implemented.

The motion compensating circuit 24 extracts macroblock data MB (f+1) of contents closest to those of macroblock data MB (f) of present frame to be processed from the frame image data of succeeding frame supplied thereto through the input terminal 20 based on the motion vector data supplied thereto from the motion detecting circuit 21, and supplies the macroblock data MB (f+1) thus extracted to the adding circuit 26.

The motion compensating circuit 25 extracts macroblock data MB (f−1) of contents closest to those of macroblock data MB (f) of present frame to be processed from the frame image data of preceding frame stored in the frame memory 23 based on the motion vector data supplied thereto from the motion detecting circuit 21, and supplies the macroblock data MB (f−1) thus extracted to the adding circuit 26.

The adding circuit 26 adds the macroblock data MB (f+1) from the motion compensating circuit 24 and the macroblock data MB (f−1) from the motion compensating circuit 25, and multiplies a coefficient "½" to the added result by the ½-multiplier incorporated therein to provide mean value data between the macroblock data MB (f+1) from the motion compensating circuit 24 and the macroblock data (f−1) from the motion compensating circuit 25.

The adding circuit 27 subtracts the mean value data of the adding circuit 26 from the macroblock data MB (f) of present frame supplied thereto from the frame memory 22 to provide difference data between the macroblock data MB (f) of present frame and macroblock data obtained as mean value data by bidirectional prediction.

The inter/intra judgement circuit 29 properly allows the switch 28 to connect the movable contact c to the inter-side fixed contact a or the intra-side fixed contact b based on the difference data from the adding circuit 27, the macroblock data MB (f) from the frame memory 22, and a frame pulse Fp supplied thereto from the controller 35.

Summarily, the frame image data of present frame stored in the frame memory 22 is to be encoded, and the processing unit is the macroblock unit. The reason that the motion detecting circuit 21 implements the motion detection is to search the macroblock data MB (f+1) and MB (f−1) of succeeding and preceding frames closest to contents of the macroblock data MB (f) of present frame to be encoded. The detected results obtained when the above search is completed, or when the macroblock data MB (f+1) and MB (f−1) of succeeding and preceding frames closest to the contents of the macroblock data MB (f) of present frame are the motion vector data MV. When the macroblock data (f+1) and MB (f−1) of succeeding and preceding frames closest to the contents of the macroblock data MB (f) of present frame are extracted by use of the motion vector data MV, data having contents common to those of data that has been transmitted before can be inhibited from being transmitted.

However, because the macroblock data MB (f) of present frame subtracted from the macroblock data, obtained by bidirectional prediction, by the adding circuit 27 cannot be decoded by only the difference data upon decoding, as shown in FIG. 2, the motion vector data MV is supplied to the variable-word length encoding circuit 32, compressed by the variable-word length encoding circuit 32, and then transmitted together with the difference data.

A role that the inter/intra judgement circuit 29 plays is to select either the encoding of the difference data or the encoding of the output from the frame memory 22. To encode difference data, i.e., interframe difference information is referred to as "interframe encoding", and to encode the output from the frame memory as it is referred to as "intraframe encoding". The word "encoding" means not the difference calculation done by the adding circuit 27 but encoding executed by circuits, which will be described later on, following the DCT circuit 30. Although the inter/intra judgement circuit 29 switches the interframe encoding and the intraframe encoding at the macroblock unit, let it be assumed that the inter/intra judgement circuit 29 switches the interframe encoding and the intraframe encoding at the frame unit in order to understand the following description more clearly.

Image data of respective frames outputted from the switch 28 and which are to be encoded are generally referred to as "I picture", "B picture", and "P picture" in accordance with the encoded forms.

The I picture is one frame-encoded image data which results from intraframe-encoding the macroblock data MB (f) of present frame outputted from the switch 28. The word "encoding" used herein means "encoding" executed by the DCT circuit 30, the quantizing circuit 31 and the variable-word length encoding circuit 32. Accordingly, in the case of I picture, the movable contact c of the switch 28 is constantly connected to the fixed contact b under control of the inter/intra judgement circuit 29.

The P picture is one frame-encoded image data comprising data which results from encoding (interframe-encoding) difference data between macroblock data MB (f) of present frame outputted from the switch 28 and I or P picture motion-compensated macroblock data which becomes a preceding frame relative to the macroblock data MB (f) of present frame and data which results from intraframe-encoding the macroblock data MB (f) of present frame. However, when the P picture is generated, the motion vector data MV for motion-compensating image data serving as the I picture is obtained based on image data to be encoded as P picture and image data provided immediately before the above image data.

The B picture is data which results from encoding (interframe-encoding) the difference data between the macroblock data MB (f) of present frame outputted from the switch 28 and macroblock data of the following six kinds.

Of the macroblock data of six kinds, macroblock data of two kinds are the macroblock data MB (f) of present frame outputted from the switch 28 and I or P picture motioncompensated macroblock data which becomes the preceding frame relative to the macroblock data MB (f) of present frame. Of the macroblock data of six kinds, macroblock data of other two kinds are the macroblock data MB (f) of present frame outputted from the switch 28 and I or P picture motion-compensated macroblock data which becomes a preceding frame relative to the macroblock data MB (f) of present frame. Of the macroblock data of six kinds, macroblock data of other two kinds are interpolated macroblock data which are generated from I picture which becomes a preceding frame relative to the macroblock data MB (f) of present frame outputted from the switch 28 and P picture which becomes a preceding frame, and interpolated macroblock data generated from a P picture which becomes a preceding frame relative to the macroblock data MB (f) of present frame outputted from the switch 28 and a P picture which becomes a preceding frame.

As is clear from the above description, the P picture contains data which is encoded by use of image data of other frames than the present frame, i.e., interframe-encoded data. Also, the B picture is composed of only interframe-encoded data, and hence the B picture cannot be decoded by itself. Therefore, as is conventional, a plurality of pictures are collected as one GOP (Group Of Picture), and it is standardized that such image data is processed at the unit of GOP.

In general, the GOP comprises one or a plurality of I pictures and zero or a plurality of non-I pictures. In order to facilitate the description below, let it be assumed that intraframe-encoded data is I picture, bidirectionally-predicted and encoded image data is B picture, and that one GOP is composed of one B picture and one P picture.

As is clear from the above description, in FIG. 2, the I picture is generated through a route comprising the output of the frame memory 22, the switch 28, the DCT circuit 30, and circuits following the DCT circuit 30. Also, the B picture is generated through a route comprising the input terminal 20, the motion compensating circuit 24, the adding circuit 26, the output terminal of the frame memory 23, the motion compensating circuit 25, the adding circuit 26, the adding circuit 26, the adding circuit 27, the switch 28, the DCT circuit 30, and circuits following the DCT circuit 30.

The DCT circuit 30 transforms the output of the switch 28 in the form of coefficient data of DC to high-order AC component. The quantizing circuit 31 quantizes the coefficient data supplied thereto from the DCT circuit 30 at a predetermined quantization step size. The variable-word length encoding circuit 32 encodes the coefficient data supplied thereto from the quantizing circuit 31 and the motion vector data MV supplied thereto from the motion detecting circuit 21 by some proper methods such as Huffman coding or run-length-coding. When data is outputted, decode information, frame data of B picture, decode information, an frame data of I picture are arranged within one GOP, in that order.

The decode information EDa comprises GOP header data indicative of the head of GOP, an inter/intra selection signal SEL or the like. The GOP header data of "1" shows that frame data with the GOP header data added to the head thereof is frame data of the header of GOP, and the GOP header data of "0" shows that frame data with the GOP header data added to the head thereof is not the head of GOP but the head of picture.

An operation of the video encoder 3v will be described. When I picture composing one GOP is generated, the switch 28 connects the movable contact c to the intra-side fixed contact b under control of the inter/intra judgement circuit 29. In this case, the frame image data read out from the frame memory 22 is encoded by the DCT circuit 30 and circuits following the DCT circuit 30. At that time, the decode information EDa from the controller 35 is supplied through the output terminal 34 to the ECC encoder 5 shown in FIG. 1A.

Subsequently, when B picture composing one GOP is generated, the switch 28 connects the movable contact c to the inter-side fixed contact a under control of the inter/intra judgement circuit 29.

The motion detecting circuit 21 motion-detects image data by the macroblock data MB (f) of present frame and the macroblock data MB (f+1) of succeeding frame provided within the frame image data sequentially. As a consequence, the motion detecting circuit 21 selects the macroblock data MB (f+1) with contents best agreed with those of the macroblock data MB (f) of present frame, and obtains motion vector data MV indicative of the position of the macroblock data MB (f+1) where the position of the macroblock data MB (f) of present frame is assumed to be a starting point. Similarly, the motion detecting circuit 21 motion-detects image data by the macroblock data MB (f) of present frame and the macroblock data MB (f−1) of preceding frame provided within the frame image data sequentially. As a consequence, the motion detecting circuit 21 selects the macroblock data MB (f−1) with contents best agreed with those of the macroblock data MB of present frame, and obtains motion vector data MV indicative of the position of the macroblock data MB (f−1) where the position of the macroblock data of present frame is assumed to be a starting point.

The above two motion vector data MV are supplied to the variable-word length encoding circuit 32, and the motion compensating circuits 24, 25, respectively. The motion compensating circuit 24 extracts the macroblock data MB (f+1), shown by the motion vector data MV, from the frame image data of succeeding frame, and the macroblock data MB (f+1) thus extracted is supplied to the adding circuit 26. On the other hand, the motion compensating circuit 25 extracts the macroblock data MB (f−1), shown by the motion vector data MV, from the frame image data of preceding frame, and the macroblock data MB (f−1) thus extracted is supplied to the adding circuit 26.

The adding circuit 26 adds the macroblock data MB (f+1) from the motion compensating circuit 24 and the macroblock data MB (f−1) from the motion compensating circuit 25, and averages the added result with a multiplication of the coefficient "½" to the added result to provide mean value data. The mean value data is supplied through the subtracting-side input terminal of the adding circuit 27 to the adding circuit 27. The macroblock data MB (f) of present frame read out from the frame memory 22 is supplied to the adding-side input terminal of the adding circuit 27. Thus, the adding circuit 27 subtracts the mean value data supplied thereto from the adding circuit 26 from the macroblock data MB (f) of present frame. The output from the adding circuit 27 is interframe-encoded by the DCT circuit 30, the quantizing circuit 31, and the variable-word length encoding circuit 32, and outputted as B picture.

After all macroblock data MB (f) stored in the frame memory 22 have been processed in the above manner, i.e., interframe-encoded, the frame image data is read out from the frame memory 22, and supplied to the frame memory 23, in which it is stored as image data of preceding frame. On the other hand, image data of the next frame is stored in the frame memory 22 as frame image data of present frame. At that very time, the decode information from the controller 35 is supplied through the output terminal 34 to the ECC encoder 5 shown in FIG. 1A.

A concept in which image data is encoded by the video encoder 3v will be described with reference to FIG. 3. FIG. 3 is a conceptual diagram used to explain a manner in which the video encoder 3v encodes image data.

FIG. 3 shows frame image data to be encoded, and frame numbers F1 through F10 are illustrated on the lower portions of these encoded image data. Frame image data shown hatched indicate frame image data I1, I3, I5, I7 and I9 serving as I pictures, and frame image data that are not shown hatched indicate frame image data B2, B4, B6, B8, B10 serving as B pictures (or frame image data P2, P4, P6, P8, P10 serving as P pictures). In this case, the frame image data I1 and B2 of the frame numbers F1 and F2 constitute one GOP; the frame image data I3 and B4 of the frame numbers F3 and F4 constitute one GOP; the frame image data I5 and B6 of the frame numbers F5 and F6 constitute one GOP; frame image data I7 and B8 of the frame numbers F7 and F8 constitute one GOP; and frame image data I9 and B10 of the frame numbers F9 and F10 constitute one GOP.

Of the frame image data shown in FIG. 3, the frame image data I1, I3, I5, I7 and I9 of the frame numbers F1, F3, F5, F7, F9 are read out from the frame memory 22, supplied through the switch 28 to the DCT circuit 30, the quantizing circuit 31, and the variable-word length encoding circuit 32, in that order, and respectively intraframe-encoded by these circuits 30, 31, 32 as earlier noted.

When on the other hand image data of B pictures are encoded, frame image data provided at left and right of encoded frame image data, i.e., frame image data of preceding and succeeding frames are used as shown by arrows in FIG. 3, and the encoded image data is interframe-encoded. By way of example, the frame image data I1 and I3 of preceding and succeeding frames are used for the frame image data of the frame number F2, and the frame image data I3 and I5 of preceding and succeeding frames are used for the frame image data of the frame number F4.

When the frame image data B2 of the frame number F2, for example, is encoded, the frame image data B2 of the frame number F2 is stored in the frame memory 22 shown in FIG. 2 as frame image data of present frame. At that time, the frame image data I1 of the frame number F1 is stored in the frame memory 23 as frame image data of preceding frame. Then, when the processing is started, the frame image data I3 of the frame number F3 is supplied through the input terminal 20 as frame image data of succeeding frame.

The motion detecting circuit 21 motion-detects image data by the macroblock data MB (f) of the frame image data B2 of the frame number F2 and the macroblock data MB (f−1) of the frame image data I2 of the frame number F1 read out from the frame memory 23 to provide one motion vector data MV. Also, the motion detecting circuit 21 motion-detects image data by the macroblock data MB (f) of the frame image data B2 of the frame number F2 and the macroblock data MB (f+1) of the frame image data I3 of the frame number F3 supplied thereto through the input terminal 20 to provide one motion vector data MV.

The motion compensating circuit 24 extracts the macroblock data MB (f−1) of the frame image data I1 of the frame number F1 shown by the motion vector data MV. The motion compensating circuit 25 extracts the macroblock data MB (f−1) of the frame image data I3 of the frame number F3 shown by the motion vector data MV. The macroblock data MB (f−1) and MB (f+1) extracted by the motion compensating circuits 24 and 25 are closest to the contents, i.e., the level arrangement of pixel data within the macroblock of the macroblock data (f) of the frame image data B2 of the frame number F2.

The adding circuit 26 adds the macroblock data MB (f−1) in the frame image data I1 of the frame number F1 supplied thereto from the motion compensating circuit 24 and the macroblock data MB (f+1) in the frame image data I3 of the frame number F3 supplied thereto from the motion compensating circuit 25, and adds the coefficient "½" to the added result by the ½-multiplier incorporated therein to provide mean value data of the two macroblock data MB (f−1) and MB (f+1). This mean value data is supplied through the subtraction-side input terminal of the adding circuit 27 to the adding circuit 27.

On the other hand, macroblock data MB (f−1) of the frame image data B2 of the frame number F2 is supplied through the adding-side input terminal of the adding circuit 27 to the adding circuit 27. Therefore, the adding circuit 27 subtracts the mean value data from the macroblock data MB (f) of the frame image data B2 of the frame number F2 to provide difference data. The resultant difference data is supplied through the switch 28 to the DCT circuit 30 and the circuits following the DCT circuit 30, and thereby encoded. Then, all macroblock data MB (f) of the frame image data B2 of the frame number 2 are processed in the above-mentioned manner to interframe-encode the frame image data B2 of the frame number F2. The frame image data B4, B6, B8 and B10 of the frame numbers F4, F6, F8 and F10 also are interframe-encoded by similar processing.

Referring to FIG. 4, the video decoder 16v shown in FIG. 1B will be described. FIG. 4 shows, in block form, an arrangement of the video decoder 16v shown in FIG. 1B.

As shown in FIG. 4, the video decoder 16v comprises a variable-word length decoding circuit 42 for decoding reproduced image data, supplied thereto from the de-shuffling circuit 15 shown in FIG. 1B through an input terminal 40, to provide quantized coefficient data, decoding motion vector data MV and supplying the decoded motion vector data MV to motion compensating circuits 47, 48 which will be described later on, an inverse quantizing circuit 43 for inverse-quantizing the output of the variable-word length decoding circuit 42 to provide coefficient data transformed by DCT, an IDCT (inverse discrete cosine transform) circuit 44 for inverse-discrete-cosine-transforming the output of the inverse quantizing circuit 43 to provide image data of I or B picture, a frame memory 45 for storing the output of the IDCT circuit 44 in response to a read/write control signal R/W supplied thereto from a controller 53, a frame memory 46 for storing image data read out from the frame memory 45 in response to a read/write control signal R/W supplied thereto from the controller 53, a motion compensating circuit 47 for extracting macroblock data indicated by motion vector data MV from the variable-word length encoding circuit 42 from the frame image data supplied thereto as I picture from the IDCT circuit 44, a motion compensating circuit 48 for extracting macroblock data shown by the motion vector data Mv supplied thereto from the variable-word length encoding circuit 42 from the frame image data stored in the frame memory 46, an adding circuit 49 for adding the macroblock data from the motion compensating circuit 47 and the macroblock data supplied from the motion compensating circuit 48 and multiplying coefficient "½" to the added result by a ½-multiplier incorporated therein to provide mean value data of the two macroblock data, an adding circuit 50 for adding the mean value data of the adding circuit 49 and the difference data serving as B picture read out from the frame memory 45 to provide the original macroblock data, and a switch 51 for switching the macroblock data from the adding circuit 50 and the macroblock data read out from the frame memory 49 based on an inter/intra selection signal SEL supplied thereto from the controller 53, and supplying a switched output through an output terminal 52 to the error concealing circuit 17 shown in FIG. 1B as reproduced video data.

In FIG. 4, data of I picture is decoded through a data path of an output of the frame memory 45 and the switch 51. Also, data of B picture is decoded through a data path of the IDCT circuit 44, the motion compensating circuit 47 and the adding circuit 49, the output terminal of the frame memory 46, the motion compensating circuit 48 and the adding circuit 49, the adding circuit 50 and the switch 51.

An operation of the video decoder 16v shown in FIG. 4 will be described. To facilitate the explanation, let it be assumed that, upon decoding, image data serving as decoded I picture of immediately-preceding GOP is stored in the frame memory 46, image data serving as B picture of GOP to be decoded is stored in the frame memory 45, and that image data serving as decoded I picture of GOP to be decoded is outputted from the IDCT circuit 44. Moreover, the frame image data of decoded I picture of immediately-preceding GOP is frame image data of preceding frame, image data of B picture of GOP to be decoded is difference image data of present frame, and frame image data of decoded I picture of GOP to be decoded is frame image data of succeeding frame.

The video data from the de-shuffling circuit 15 shown in FIG. 1B is supplied through the input terminal 40 shown in FIG. 4 to the variable-word length decoding circuit 42. On the other hand, the decode information DDa from the ECC decoder 14 shown in FIG. 1B is supplied through the input terminal 41 shown in FIG. 4 to the controller 53. The video data is decoded into quantized coefficient data of the variable-word length decoding circuit 42. The video data thus decoded is supplied to the inverse quantizing circuit 43, and reconverted by the inverse quantizing circuit 43 into coefficient data transformed by DCT. The video data that has been reconverted to the DCT coefficient data is supplied to the IDCT circuit 44, and thereby reconverted into the original image data. The "original image data" is "difference data" if this image data is B picture generated by interframe-encoding, and "macroblock data" if this image data is I picture generated by intraframe-encoding.

The controller 53 extracts GOP header data and the inter/intra selection signal SEL from the decode information DDa, and supplies the inter/intra selection signal SEL to the switch 51 as the switching control signal, whereby a movable contact c of the switch 51 is connected to an inter-side fixed contact a. Information indicating a timing at which the switch 51 is changed-over based on the inter/intra selection signal SEL is GOP header data detected from the decode information DDa. Since the GOP header data is added to every GOP, it is possible to determine that the period of one GOP data is from the detection of GOP header data of the detection of the next GOP header data.

The motion compensating circuit 47 extracts the macroblock data MB (f+1) shown by the motion vector data MV supplied thereto from the variable-word length decoding circuit 42 from the frame image data of succeeding frame serving as decoded I picture from the IDCT circuit 44 after the difference image data serving as B picture has been stored in the frame memory 45. The macroblock data MB (f+1) extracted from the frame image data serving as the succeeding frame by the motion compensating circuit 47 is supplied to the adding circuit 49.

On the other hand, the motion compensating circuit 48 starts the processing in unison with the processing start timing of the motion compensating circuit 47 after the frame image data serving as encoded I picture of immediately-preceding GOP has been stored in the frame memory 46. Specifically, the motion compensating circuit 48 extracts the macroblock data MB (f–1)O shown by the motion vector data MV supplied thereto from the variable-word length decoding circuit 42 from the frame image data serving as decoded I picture of immediately-preceding GOP. The macroblock data MB (f–1) extracted from the frame image data serving as the preceding frame by the motion compensating circuit 48 is supplied to the adding circuit 49.

Although the signal line connected to the output terminal of the variable-word length decoding circuit 42 is shown by a single line and one "MV" is used as reference symbol for indicating motion vector, motion vector data MV of all macroblocks of one frame image data are respectively obtained in each motion detection of the encoding processing as earlier noted with reference to FIGS. 1A, 1B. Accordingly, the motion vector data MV supplied to the motion compensating circuit 47 and the motion vector data MV supplied to the motion compensating circuit 48 are different motion vector data obtained upon encoding.

The macroblock data MB (f+1) from the motion compensating circuit 47 and the macroblock data MB (f–1) from the motion compensating circuit 48 are added by the adding circuit 49. The added result is multiplied with the coefficient "½" by the ½-multiplier incorporated within the adding circuit 49, and thereby averaged. Mean value data from the adding circuit 49 is supplied to the adding circuit 50.

The adding circuit 50 adds the difference data read out from the frame memory 45 and the mean value data from the adding circuit 49. The added output from the adding circuit 50 is supplied through the output terminal 52 to the error concealing circuit 17 shown in FIG. 1B as decoded reproduced video data of the present frame.

The read/write control signals R/W from the controller 53 are supplied to the frame memories 45, 46, whereby the macroblock data of succeeding frame serving as I picture outputted from the IDCT circuit 44 is supplied to the motion compensating circuit 47 and the frame memory 46, and thereby stored in the frame memory 46.

Meaning of the processing executed by the adding circuits 49, 50 will be described below one more time. The adding circuit 27 shown in FIG. 2 obtains the mean value between the macroblock data MB (f+1) of the succeeding frame obtained by the motion-compensation in the motion compensating circuit 24 and the macroblock data MB (f–1) of the preceding frame obtained by the motion-compensation in the motion compensating circuit 25 by calculation. Then, the adding circuit 27 subtracts the mean value data supplied thereto from the adding circuit 26 from the macroblock data MB (f) of the present frame, which is expressed by the following equation (1):

Difference data MBd (f) of macroblock unit of present frame $$=MB(f)-[\{MB(f+1)+MB(f-1)\}/2] \quad (1)$$

Accordingly, in order to obtain the macroblock data MB (f) of the present frame from the difference data MBd, the video decoder 16v side has to carry out the calculation expressed by the following equation (2):

Macroblock data $MB(f)$ of present frame=Difference data $MBd(f)$ of macroblock unit of the present frame+$[\{MB(f+1)+MB(f-1)\}/2]$ (2)

Reference symbol "+", i.e., "addition" in the beginning of the equation (2) corresponds to addition executed by the adding circuit 50 shown in FIG. 4. Reference symbol "+" which shows addition of the macroblock data MB (f+1) and the macroblock data MB (f–1) in the parentheses in the equation (2) corresponds to an addition executed by the adding circuit 49 shown in FIG. 4. Furthermore, the coefficient "½" multiplied with data provided in the braces in the equation (2) corresponds to a multiplication of the coefficient "½".

In order to perform the calculation expressed by the equation (2), the macroblock data MB (f+1) should be extracted from the frame image data of succeeding frame thus transmitted, and the macroblock data MB (f–1) should be extracted from the frame image data of preceding frame thus transmitted. The motion vector data MV that have been supplied from the variable-word length decoding circuit 42 to the motion compensating circuits 47, 48 are used in the above-mentioned "extraction", respectively.

After all frame image data of the present frame serving as B pictures are decoded by repeatedly executing the above processings, the controller 53 supplies the inter/intra selection signal SEL to the switch 51, whereby the movable contact c of the switch 51 is connected to the inter-side fixed contact b. Since the contents of the frame memory 45 are rewritten as the macroblock data (f+1) of succeeding frame serving as I pictures in each processing, at this timing point, frame image data of succeeding frame serving as I picture is stored in the frame memory 45.

The read/write control signals R/W is supplied to the frame memory 45 from the controller 35, whereby the frame image data of succeeding frame serving as I picture is supplied through the switch 51 and the output terminal 52 to the error concealing circuit 17 shown in FIG. 1B.

Referring back to FIG. 3, a concept in which the video decoder 16v decodes image data will be described below. FIG. 3 is a conceptual diagram used to explain a decode processing executed by the video decoder 16v. FIG. 3 shows frame image data to be decoded, and the frame numbers are illustrated on the lower portions of these encoded image data, respectively. Frame image data shown hatched show frame image data serving as I pictures, and frame image data, not shown hatched, show frame image data serving as B pictures (or frame image data serving as P pictures), respectively.

Of the frame image data shown in FIG. 3, the frame image data I1, I3, I5, I7 and I9 of the frame numbers F1, F3, F5, F7 and F9 are respectively supplied to the variable-word length decoding circuit 42, the inverse quantizing circuit 43, and the IDCT circuit 44, in that order, as earlier noted, and decoded, respectively. Thereafter, these image data are stored in the frame memory 45, read out from the frame memory 45, and outputted through the switch 51 and the output terminal 52 as reproduced image data, respectively.

On the other hand, as shown by the arrows in FIG. 3, the frame image data serving as B picture is decoded by use of frame image data of left and right, i.e., preceding and succeeding frames. The frame image data B2 of the frame number F2, for example, is decoded by use of the frame image data I1 of the preceding frame and the frame image data I3 of the succeeding frame.

When the frame image data B2 of the frame number F2 is decoded, the frame image data B2 of the frame number F2 is stored in the frame memory 45 shown in FIG. 4 as the frame image data B2 of the present frame. At that time, the frame image data I1 of the frame number F1 is stored in the frame memory 46 as the frame image data of the preceding frame. Then, when the decode processing is started, the frame image data I3 of the frame number F3 is outputted from the IDCT circuit 44 as the frame image data of the succeeding frame.

The motion compensating circuit 47 extracts the macroblock data MB (f−1) from the image data I1 of the frame number F1 shown by the motion vector data MV from the variable-word length decoding circuit 42, The motion compensating circuit 48 extracts the macroblock data MB (f+1) of the frame image data I3 of the frame number F3 shown by the motion vector data MV from the variable-word length decoding circuit 42. The macroblock data MB (f−1) and MB (f+1) extracted by the motion compensating circuits 47, 48 are extracted and used as those data whose contents, i.e., level arrangements of pixel data in the macroblocks are closest to that of the macroblock data MB (f) of the frame image data B2 of the frame number F2.

The adding circuit 49 adds the macroblock data MB (f−1) in the frame image data I1 of the frame number F1 supplied thereto from the motion compensating circuit 47 and the data MB (f+1) in the frame image data I3 of the frame number F3 supplied thereto from the motion compensating circuit 48, and multiplies the added result with the coefficient "½" by the ½-multiplier incorporated therein to provide mean value data of the two macroblock data MB (f−1) and MB (f+1). The resultant mean value data is supplied through one addition-side input terminal of the adding circuit 50 to the adding circuit 50.

On the other hand, the macroblock data MB (f) in the frame image data B2 of the frame number F2 is supplied through the other addition-side input terminal of the adding circuit 50 to the adding circuit 50. Therefore, the adding circuit 50 adds difference data of the macroblock data MB (f) in the frame image data B2 of the frame number F2 to the mean value data to provide the original macroblock data MB (f). The macroblock data thus obtained by this calculation is outputted through the switch 51 and the output terminal 52. The above-mentioned processings are effected on all macroblock data MB (f) of the frame image data B2 of the frame number F2, and thereby the frame image data B2 of the frame number F2 is decoded. The frame image data B4, B6, B8 and B10 of the frame numbers F4, F6, F8 and F10 also are decoded by the similar processings.

U.S. Pat. No. 4,897,720 describes the above fullsearch block matching. U.S. Pat. No. 4,969,055 describes GOP, and U.S. Pat. No. 4,383,272 describes B picture. U.S. Pat. No. 4,232,338 describes P picture, and U.S. Pat. No. 4,894,713 describes encoding based on DCT, quantization and variable-word length encoding.

Recording and reproducing apparatus such as VCR are generally able to reproduce recorded data recorded on a recording medium in the five modes, in total, such as normal-speed positive direction playback, normal-speed reverse direction playback, positive direction playback at other speed than the normal speed, reverse direction playback at other speed than the normal speed, and still playback.

The digital VCR including the video encoder for encoding image data and the video decoder for decoding image data encoded by the video encoder shown in FIGS. 1A, 1B does not face a problem when image data is reproduced in the normal-speed positive direction playback and in the still playback, i.e., such digital VCR can reproduce recorded data by decoding recorded data correctly. However, such digital VCR are facing a serious problem when image data is reproduced in the normal-speed reverse direction playback mode, the positive direction playback at other speed than the normal speed and in the reverse direction high-speed playback mode.

Initially, the problem that the digital VCR encounters in the normal-speed reverse direction playback mode and the reverse direction playback mode at other speed than the normal speed will be described. A manner in which such a problem is caused will be described with reference to the drawings.

FIG. 5 shows examples of frame image data obtained when the digital VCR reproduces recorded data recorded on a magnetic tape in the reverse direction playback mode while a capstan motor is driven in the reverse direction.

As shown in FIG. 5, because image data is reproduced in the reverse direction playback mode, the arrangement of frame image data is reversed to that of frame image data shown in FIG. 3. However, the order of frame image data provided within the GOP is the same. Even when this order is reversed, upon decoding, frame image data are constantly processed at the GOP unit.

In this reverse direction playback mode, frame image data are reproduced in the sequential order of frame image data I9 of frame number F9, frame image data B10 (or P10) of frame number F10 (or P10), frame image data I7 of frame number F7, frame image data B8 (or P8) of frame number F8, frame image data I5 of frame number F5, frame image data B6 (or P6) of frame number F6, frame image data I3 of frame number F3, frame image data B4 (or P4) of frame number F4, frame image data I1 of frame number F1 and frame image data B2 (or P2) of frame number F2.

In this case, frame image data I9, I7, I5, I3 and I1 can be decoded without any trouble because they are intraframe-encoded upon encoding. Therefore, if they are decoded, then a satisfactory image can be obtained without trouble.

On the other hand, the frame image data B10 is decoded by use of frame image data I9 and the frame image data I7 as shown by arrows in FIG. 5; the frame image data B8 is decoded by use of the frame image data I7 and the frame image data Is as shown by arrows in FIG. 5; the frame image data B6 is decoded by use of the frame image data I5 and the frame image data I3 as shown by arrows in FIG. 5; the frame image data B4 is decoded by use of the frame image data I3 and the frame image data I1 as shown by arrows in FIG. 5; and the frame image data B2 is decoded by use of only the frame image data I1 as shown by an arrow in FIG. 5.

The frame image data I1, I3, I5, I7 and I9 used when the frame image data B2, B4, B6, B8 and B10 are encoded and decoded are compared with each other. The correct patterns are such ones used upon encoding as is clear from the comparison of FIGS. 3 and 5. In FIG. 5, the patterns different from those of FIG. 3 are marked with "X".

As shown in FIG. 3, upon encoding, a frame image data B10 is encoded by use of frame image data I9 and frame image data I11, not shown. On the other hand, as shown in FIG. 5, the frame image data B10 is decoded by use of frame image data I9 and frame image data I7 upon decoding. Therefore, as shown by "X" in FIG. 5, the use of the frame image data I7 upon decoding is not correct.

As shown in FIG. 3, the frame image data B8 is encoded by use of frame image data I7 and frame image data I9 upon encoding. On the other hand, as shown in FIG. 5, the frame image data B8 is decoded by use of frame image data I7 and frame image data I5. Therefore, as shown by "X" in FIG. 5, the use of the frame image I5 upon decoding is not correct.

As shown in FIG. 3, the frame image data B6 is encoded by use of frame image data I5 and frame image data I7 upon encoding. On the other hand, as shown in FIG. 5, the frame image data B6 is decoded by use of frame image data I5 and frame image data I3 upon decoding. Therefore, as shown by "X" in FIG. 5, the use of frame image data I3 upon decoding is not correct.

As shown in FIG. 3, the frame image data B4 is encoded by use of frame image data I3 and frame image data I5 upon encoding. On the other hand, as shown in FIG. 5, the frame image data B4 is decoded by use of frame image data I3 and frame image data I1 upon decoding. Therefore, as shown by "X" in FIG. 5, the use of the frame image data I1 upon decoding is not correct.

As shown in FIG. 3, the frame image data B2 is encoded by use of frame image data I1 and frame image data I3 upon encoding. On the other hand, as shown in FIG. 5, the frame image data B2 is decoded by use of only frame image data I1 upon decoding. Therefore, as shown by "X" in FIG. 5, there is not provided one frame image data that should be used upon decoding.

As is clear from the above description, when the magnetic tape is reproduced in the reverse direction, the same frame image data as those used in the encoding cannot be used and an incorrect processing is executed with the result that a picture quality of a reproduced image is deteriorated considerably. In the case of P picture, if frame image data of succeeding frame is used upon encoding, there then arises a similar problem.

Problems caused when the magnetic tape is reproduced at speed other than the normal speed in the positive or reverse direction will be described below. As is conventional, when recorded data recorded on the magnetic tape is reproduced, it becomes difficult for the playback head 10 shown in FIG. 1B to accurately reproduce recorded data that is recorded on the magnetic tape so as to form oblique tracks. As a result, a drop-out of data is increased. Furthermore, if the reproducing speed is very much higher than the normal speed, there then occurs a problem that reproduced record data cannot be decoded satisfactorily.

Therefore, in the recording and reproducing apparatus using the video encoder and the video decoder conforming to the storage moving image coding standard, e.g., the digital VCR shown in FIGS. 1A, 1B, in the playback mode other than the playback mode where the magnetic tape is reproduced at normal speed in the positive direction, there are used only frame image data serving as I pictures obtained by intraframe-encoding. In the digital VCR using the video encoder and the video decoder conforming to the storage moving image encoding standard based on MPEG2, for example, one GOP consists of 15 frames, and of frame image data of 15 frames comprising one GOP, there is provided one I picture, and all remaining frame image data become B pictures and P pictures.

Accordingly, when only the I picture is used, only one frame is reproduced per 15 frames, and a picture quality of a reproduced image becomes excellent. However, images of 14 frames cannot be reproduced per 15 frames, and hence a motion of a moving object within the image cannot be made smooth. To avoid this shortcoming, it is proposed that the number of I pictures contained within one GOP is increased. However, the number of B pictures and P pictures which are difference images is decreased, and a data amount of encoded data in one GOP is increased, which is not a good idea from an encoding efficiency standpoint.

In short, in the playback modes other than the playback mode where the magnetic tape is reproduced at normal speed in the positive direction, if it is intended that a picture quality is improved much more and that a motion of a moving object within the image is made smooth, there is then the disadvantage that the encoding efficiency is deteriorated.

While one GOP consists of 2 frames as shown in FIGS. 3 and 5 for convenience sake of explanation, if one GOP consists of frame image data of 15 frames as earlier noted, then upon edit, the edit unit always becomes 15 frames. The reason for this is that, unless the edit unit is GOP which is the encoding and decoding unit, then image data used for edit cannot be obtained. If somewhere of GOP is used as an edit point, then pictures ahead of or behind the edit point cannot be reproduced correctly because there is no image data which precedes the edit point from a time standpoint. Furthermore, since it is customary that the user determines the edit point with reference to a reproduced picture, it is difficult for the user to detect a position at which a picture displayed on a television monitor is recorded on the magnetic tape. Accordingly, it is difficult for the user to enter time code data in a manual fashion, which disadvantage is desired to be improved.

SUMMARY OF THE INVENTION

In view of the aforesaid aspect, it is an object of the present invention to provide an image information encoding apparatus, an image information decoding apparatus and a recording and reproducing system in which a picture quality of a reproduced image in the playback modes other than the playback mode where a magnetic tape is reproduced at normal speed in the positive direction can be made satisfactory, a motion of a moving object within the image can be made smooth, and a correspondence between a reproduced image and a position on the magnetic tape can be easily obtained with out deteriorating an encoding efficiency.

The present invention includes a first memory means for storing therein image information of present frame to be encoded, a second memory means for storing therein image information which precedes a position of the image information of present frame on a time base, a read/write control means for supplying read or write control signals for extracting block data from first and second divided areas provided within memory areas of at least the first and second memory means to the first and second memory means, a motion detecting means for executing a motion detection processing by use of the block data of present frame read out from the first memory means and the block data of preceding frame read out from the second memory means to obtain first motion vector data based on a result of the motion detection processing, and executing a motion detection processing by use of the block data of present frame read out from the first memory means and block data in image information of succeeding frame which succeeds a position of the image data of present frame on a time base to obtain second motion vector data based on a result of the motion detection processing, a first motion compensating means for extracting block data of preceding frame shown by the first motion vector data supplied thereto from the motion detecting means from the image information of preceding frame, a second motion compensating means for extracting block data of succeeding frame shown by the second motion vector data supplied thereto from the motion detecting means from the image information of succeeding frame, a first adding means for adding the block data of preceding frame supplied thereto from the first motion compensating means and the block data of succeeding frame supplied thereto from the second motion compensating means to provide a mean value, a second adding means for subtracting the mean value output supplied thereto from the first adding means from the block data of present frame read out from the first memory means, aa selection control means for selecting the block data of present frame read out from the first memory means and the difference data supplied thereto from the second adding means, and a compressing and encoding means for compressing and encoding the block data of present frame or the difference data selected by selection control of the selection control means and decode information including the selection information, wherein the selection control means selects the block data of present frame extracted from the first divided area of the memory area of the first memory means during a first half period of at least one frame period, selects the difference data which results from subtracting the mean value output from the first adding means from the block data of present frame extracted from the second divided area of the memory area of the first memory means by the second adding means during a second half period of the one frame period, selects the block data of present frame extracted from the second divided area of the memory area of the first memory means during a first half period of the next frame of the one frame period, and selects the difference data which results from subtracting the mean value output from the first adding means from the block data of present frame extracted from the first divided area of the memory area of the first memory means by the second adding means during a second half period of the next frame period of the frame period.

According to the present invention, there is provided an image information decoding apparatus in which a motion detection processing is executed by use of block data in which image information of present frame to be encoded is divided into first and second divided areas and which is extracted from the first or second divided area an block data in which image information of preceding frame which precedes a position of the image information of present frame on a time base is divided into first and second divided areas and which is extracted from the first or second divide area, the block data of preceding frame shown by first motion vector data obtained based on a result of the motion detection processing is extracted from the image information of preceding frame, a motion detection processing is executed by use of block data in which image information of present frame to be encoded is divided into first and second divided areas and which is extracted from the first or second divided area and the block data in which image information of succeeding frame which succeeds a position of image information of present frame on a time base is divided into first and second divided areas and which is extracted from the first or second divided area, the block data of succeeding frame shown by the second motion vector data obtained based on a result of motion detection processing is subtracted from the image information of succeeding frame, the block data of preceding frame thus extracted and the block data of succeeding frame thus extracted are added to provide a mean value, the above mean value is subtracted from the block data of present frame extracted from the first or second divided area to provide difference data, the block data of present frame extracted from the first divided area is selected during a first half period of at least one frame period, the difference data which results from subtracting the mean value from the block data of present frame extracted from the second divided area is selected during a second half period of the one frame period, the block data of present frame extracted from the second divided area is selected during a first half period of the next frame period of the above frame period, and the difference data which results from subtracting the mean value from the block data of present frame extracted from the first divided area is selected during a second half period of the next frame period of the above frame period, and encoded information in which the selected selection information and decode information containing the selection information are compressed and encoded is decoded. This image information decoding apparatus includes a decoding means for decoding the compressed and encoded encoding information to provide block data of preceding or succeeding frame or decoded data of present frame, a first memory means for storing therein decoded data of first and second divided areas of present frame supplied thereto from the decoding means, a second memory means for storing therein block data of first and second divided areas of preceding frame supplied thereto from the decoding means, a first motion compensating means for extracting from the second memory means block data provided within the first or second divided area of preceding frame shown by motion vector data added to the block data of first or second divided area of preceding frame from the second memory means upon encoding, a second motion compensating means for extracting from the first or second divided area of succeeding frame from the decoding means block data provided within the first or second frame of succeeding frame shown by motion vector data added to the block data of first or second divided area of succeeding frame from the decoding means upon encoding, a first adding means for adding and averaging the block data provided within the first or second divided area of preceding frame extracted by the fairst motion compensating means and the block data provided within the first or second divided area of succeeding frame extracted by the second motion compensating means, a second adding means for adding the decoded data of first or second divided area of present frame read out from the first memory means, and an added output from the first adding means, a selection information extracting mens for extracting the selection information from decode information added to the encoded information upon encoding, and control means for selectively outputting the added output from the second adding means or the decoded data of first or second divided area of present frame from the first memory means based on selection information extracted by the selection information extracting means as decode image information.

The present invention comprises a first memory means for storing therein image information of succeeding frame which succeeds a position of image information of present frame to be encoded on a time base, a second memory means for storing therein image information of present frame to be encoded, a third memory means for storing therein image information of preceding frame which precedes a position of image information of present frame on a time base, a read/write control means for supplying read or write control signals for extracting block data from the first and second divided areas provided within memory area of at least the first and second memory means, a motion detecting means for executing a motion detection processing by use of the block data of present frame read out from the second memory means and the block data of preceding frame read out from the third memory means to provide first motion vector data based on a result of motion detection processing, and executing a motion detection processing by use of the block data of present frame read out from the second memory means and the block data of succeeding frame read out from the first memory means to provide second motion vector data based on a result of motion detection processing, a first motion compensating means for extracting from the image information of preceding frame the block data of preceding frame shown by the first motion vector data from the motion detecting means, a second motion compensating means for extracting from the image information of succeeding frame the block data of succeeding frame shown by the second motion vector data from the motion detecting means, a first adding means for adding the block data of preceding frame from the first motion compensating means and the block data of succeeding frame from the second motion compensating means to obtain a mean value, a second adding means for subtracting the mean value output from the first adding means from the block data of present frame read out from the first memory means, a selection control means for selecting the block data of present frame read out from the first memory means and the difference data from the second adding means, and a compressing and encoding mean for compressing and encoding the block data of present frame or the difference data selected by selection control of the selection control means and the selection information, wherein the control means selects the block data of present frame extracted from the first divided area of the memory area of the second memory means during a first half period of at least one frame period, selects the difference data which results from subtracting the mean value output from the first adding means from the block data of present frame extracted from the second divided area of the memory area of the second memory means during a second half period of the one frame period, selects the block data of present frame extracted from the second divided area of the memory area of the second memory means during a first half period of the next frame period of the frame period, and selects the difference data which results from subtracting the mean value output from the first adding means from the block data of the present frame extracted from the first divided area of the memory area of the second memory means by the second adding means during a second half period of the next frame period of the frame period.

According to the present invention, there is provided an image information decoding apparatus in which a motion detection processing is executed by use of block data in which image information of present frame to be encoded is divided into first and second divided areas and which is extracted from the first or second divided area and block data in which image information of preceding frame which precedes a position of the image information of preceding frame on a time base is divided into first and second divided areas and which is extracted from the first or second divided area, the block data of preceding frame shown by first motion vector data obtained based on a result of motion detection processing is extracted from the image information of preceding frame, a motion detection processing is executed by use of block data in which image information of present frame to be encoded is divided into first and second divided areas and which is extracted from the first or second divided area and block data in which image information of present frame to be encoded is divided into first and second divided areas and which is extracted from the first or second divided area, and block data in which image information of succeeding frame which succeeds a position of the image information of present frame on a time base is divided into first and second divided areas and which is extracted from the first or second divided area, the block data of succeeding frame shown by second motion vector data obtained based on a result of motion detection processing is extracted from the image information of succeeding frame, the extracted block data of preceding frame and the extracted block data of succeeding frame are added to provide a mean value, the mean value is subtracted from the block data of present frame extracted from the first or second divided area to provide difference data, the block data of present frame extracted from the first divided area is selected during a first half period of at least one frame period, the difference data which results from subtracting the mean value from the block data of present frame extracted from the second divided area is selected during a second half period of the one frame period, the block data of present frame extracted from the second divided area is selected during a first half period of the next frame period of the above frame period, and the difference data which results from subtracting the mean value from the block data of present frame extracted from the first divided area is selected during a second half period of the next frame period of the frame period, and enconded information in which the selected selection information and decode information containing the selection information are compressed and encoded is decoded. This image information decoding apparatus includes a decoding means for decoding the compressed and encoded encode information to provide block data of preceding or succeeding frame or decoded data of present frame, a first memory means for storing therein decoded data of the first and second divided areas of present frame supplied thereto from the decoding means, a second memory means for storing therein decoded data of the first and second divided areas of preceding frame supplied thereto from the decoding means, a first motion compensating means for extracting from the second memory means the block data provided within the first or second divided area of preceding frame shown by motion vector data added to the block data of the first or second divided area of preceding frame from the second memory means upon encoding, a second motion compensating means for extracting from the first or second divided area of succeeding frame from the decoding means the block data provided within the first or second divided area of succeeding frame shown by motion vector data added to the block data of the first or second divided area of succeeding frame from the decoding means upon encoding, a first adding means for adding and averaging the block data provided within the first or second divided area of preceding frame extracted by the first motion compensating means and the block data provided within the first or second divided area of succeeding frame extracted by the second motion compensating means, a second adding means for adding decoded data of first or second divided area of present frame read out from the first memory means and an added output from the first adding means, selection information extracting mean for extracting the selection information from the decode information added to the encoded information upon encoding, and a control means for selectively outputting the added output from the second adding means or the decoded data of the first or second divided area of present frame from the first memory means based on the selection information extracted by the selection information extracting means as decode image information.

BRIEF DESCRIPTION OF THE DRAWINGS

FIGS. 13A through 13E are conceptual diagrams showing examples of sub-sampling in the encoding apparatus and the decoding apparatus according to a third embodiment of the present invention;

DETAILED DESCRIPTION OF THE PREFERRED EMBODIMENTS

An image information encoding apparatus, an image information decoding apparatus, and a recording and reproducing system according to the present invention will be described below in detail with reference to FIGS. 6 to 15.

Figure 6:
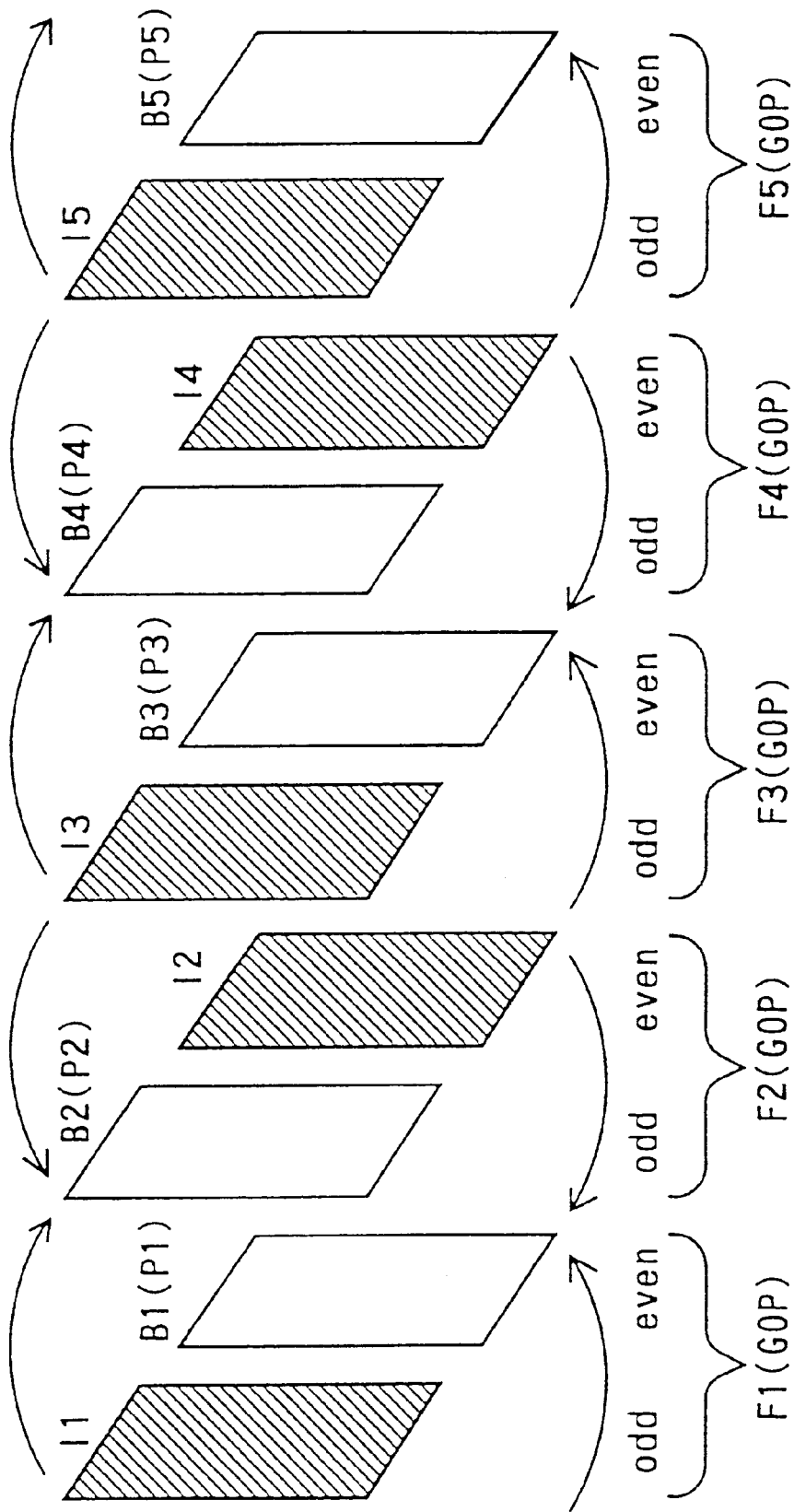
FIG. 6 is a conceptual diagram used to explain a concept in which image data is encoded and decoded by an encoding apparatus and a decoding apparatus according to first and second embodiment of the present invention.

FIG. 6 is a conceptual diagram used to explain a concept in which image data is encoded and decoded by an encoding apparatus and a decoding apparatus according to first and second embodiment of the present invention.

In FIG. 6, in order to understand the present invention clearly, one GOP consists of two field image data. FIG. 6 shows field image data to be encoded, and symbols odd (odd field) and even (even field) for indicating odd field and even field are provided on the lower portions of these encoded image data, respectively. Frame numbers F1 through F5 are further added to the odd and even fields odd and even, by way of example. Field image data shown hatched show field image data I1, I2, I3, I4 and I5 serving as I pictures, and field image data, not shown hatched, show field image data B1, B2, B3, B4, B5 serving as B pictures (or field image data P1, P2, P3, P4, P5 serving as P pictures), respectively.

In this case, the field image data I1 and B1 of the frame number F1 constitute one GOP; the field image data B2 and I2 of the frame number F2 constitute one GOP; the field image data I3 and B3 of the frame number F3 constitute one GOP; the field image data B4 and I4 of the frame number F4 constitute one GOP; and the field image data I5 and B5 constitute one GOP.

The field image data B2 of the odd field of the frame number F2 is interframe-encoded by use of the field image data I1 of the odd field of the frame number F1 and the field image data I3 of the odd field of the frame number F3. The field image data I2 of the even field is intrafield-encoded.

On the other hand, the field image data I3 of the odd field of the frame number F3 is intrafield-encoded, and the field image data B3 of the odd field is interframe-encoded by use of the field image data I2 of the even field of the frame number F2 and the field image data I4 of the even field of the frame number F4. Other field image data are encoded similarly.

In the first frame to be encoded, the field image data of the odd field is intrafield-encoded, and the field image data of the even field is interframe-encoded. In the next frame to be encoded, the field image data of the odd field is interframe-encoded, and the field image data of the even field is intrafield-encoded. If image data are encoded as described above, there is then no problem caused when image data is reproduced in the reverse direction playback mode. This will be described with reference to FIG. 7.

Figure 7:
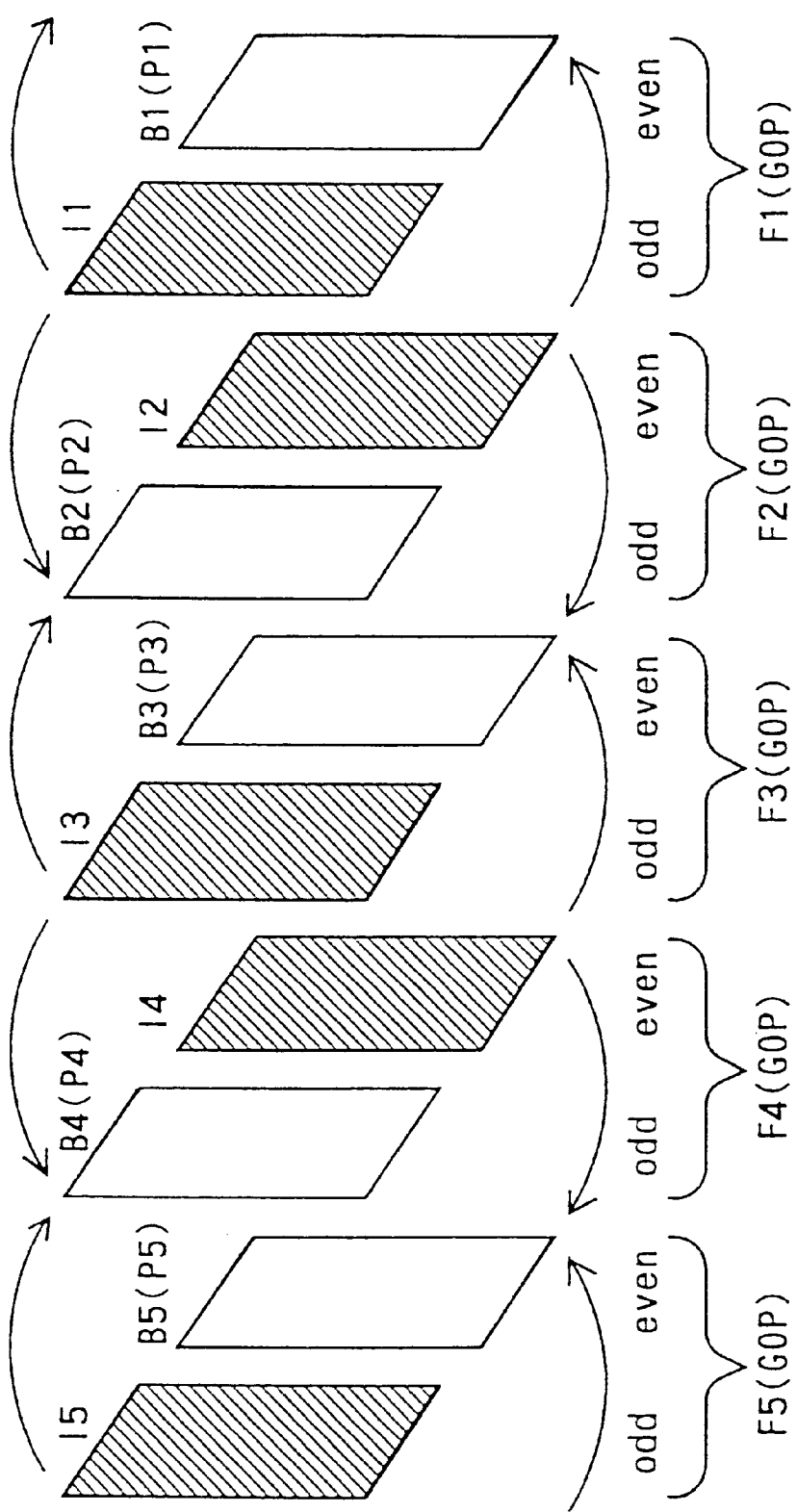
FIG. 7 is a conceptual diagram used to explain a concept in which image data is decoded by the decoding apparatus according to the first and second embodiments of the present invention when image data is reproduced in the reverse direction playback mode.

FIG. 7 is a conceptual diagram showing data string of reproduced image data obtained when a magnetic tape in which recording data encoded as shown in FIG. 6 are recorded is reproduced in the reverse direction. In FIG. 7, elements and parts identical to those of FIG. 6 are marked with the same references and therefore need not be described in detail.

When the digital VCR reproduces a magnetic tape in which recording data obtained by encoding as shown in FIG. 6 are recorded by a playback head while a capstan motor is drive in the reverse direction and the magnetic tape is transported by capstans and pinch rollers in the reverse direction, there is obtained reproduced image data shown in FIG. 7.

Specifically, there are reproduced the field image data I5 of the odd field of the frame number F5, the field image data B5 of the even field of the frame number F5, the field image data B4 of the odd field of the frame number F4, the field image data I4 of the even field of the frame number F4, the field image data I3 of the odd field of the frame number F3, the field image data B3 of the even field of the frame number F3, the field image data B2 of the odd field of the frame number F2, the field image data I2 of the even field of the frame number F2, the field image data I1 of the odd field of the frame number F1, and the field image data B1 of the even field of the frame number F1, in that order.

When the respective field image data I5, I4, I3, I2 and I1 are decoded, there occurs no problem because these data are intrafield-encoded upon encoding. Therefore, if those data are decoded, then a satisfactory reproduced image can be obtained without trouble.

When on the other hand the field image data B5 of the even field of the frame number F5 is decoded, there are used the field image data I6 of the even field of the frame number F6 and the field image data I4, although not shown.

When the field image data B4 is decoded, there are used the field image data I5 and the field image data I3; when the field image data B3 is decoded, there are used the field image data I4 and the field image data I2; when the field image data B2 is decoded, there are used the field image data I3 and the field image data I1; and when the field image data B1 is decoded, there are used the field image data I2 and the field image data I0 of the even field of the frame number F0 not shown.

Then, the field image data I1 through I5 of the frame numbers F5 through F1 used when the field image data B5 to B1 of the frame numbers F5 to F1 are encoded and decoded are compared with each other. Correct patterns should of course be those used upon encoding as will be clear from a comparison of FIGS. 6 and 7.

As shown in FIG. 6, upon encoding, the field image data B5 is encoded by use of the field image data I4 and field image data I6 of even field of frame number F6. On the other hand, as shown in FIG. 7, upon decoding, the field image data B5 is decoded by use of field image data I6 of even field of frame number F6, not shown, and the field image data I4. Therefore, upon decoding, since the same field image data as the field image data used in the encoding is used, the field image data B5 can be decoded satisfactorily.

As shown in FIG. 6, upon encoding, the field image data B4 is encoded by use of the field image data I3 and the field image data I5. On the other hand, as shown in FIG. 7, upon decoding, the field image data B4 is decoded by use of the field image data I5 and the field image data I3. Therefore, upon decoding, since the same field image data as the field image data used in the encoding is used, the field image data B4 can be decoded satisfactorily.

As shown in FIG. 6, upon encoding, the field image data B3 is encoded by use of the field image data I2 and the field image data I4. On the other hand, as shown in FIG. 7, upon decoding, the field image data B3 is decoded by use of the field image data I4 and the field image data I2. Therefore, upon decoding, since the same field image data as the field image data used in the encoding is used, the field image data B3 can be decoded satisfactorily.

As shown in FIG. 6, upon encoding, the field image data B2 is encoded by use of the field image data I1 and the field image data I3. On the other hand, as shown in FIG. 7, upon decoding, the field image data B2 is decoded by use of the field image data I3 and the field image data I1. Therefore, upon decoding, since the same field image data as the field image data used in the encoding is used, the field image data B2 can be decoded satisfactorily.

As shown in FIG. 6, upon encoding, the field image data B1 is encoded by use of field image data of even field of frame number F0, not shown, and the field image data I2. On the other hand, as shown in FIG. 7, upon decoding, the field image data B1 is decoded by use of the field image data I2 and field image data I0 of even field of frame number F0, not shown. Therefore, upon decoding, since the same field image data as the field image data used in the encoding is used, the field image data B1 can be decoded satisfactorily.

As is clear from the above description, when image data is encoded by the processings shown in FIG. 6 and encoded image data is recorded on the magnetic tape, even though the magnetic tape is reproduced in the reverse direction, the image data can be reproduced satisfactorily. In addition, since one GOP consists of intrafield-encoded image data and the interframe-encoded image data, upon high-speed playback, there can be used many image data obtained by the intrafield-encoding, i.e., many I pictures. Thus, a picture quality can be prevented from being deteriorated, and a motion of a moving object within the image can be made smooth. In short, since the intrafield-encoding and the interframe-encoding are used with a satisfactory equilibrium, a picture quality of reproduced image can be improved, and a motion of a moving object within the image can be made smooth without deteriorating an encoding efficiency.

Further, according to the present invention, in order to effect edit at the frame unit upon edit, data of one frame can constantly be recorded with a constant data amount by controlling quantization step data supplied to the quantizing circuit upon encoding. Therefore, since the apparatus can recognize the position at which data corresponds to an arbitrary frame is recorded on the magnetic tape upon edit, corresponding time code data, for example, can be displayed together with a reproduced image. Thus, the user can determine a time code located at a desirable edit point with reference to a reproduced image, thereby making it possible for the user to edit image data at the frame unit.

A modified example of the present invention will be described below.

In the above description, in the first frame to be encoded, the field image data of the odd field is intrafield-encoded, and the field image data of the even field is interframe-encoded. Then, in the next frame to be encoded, the field image data of the odd field is interframe-encoded, and the field image data of the even field is intraframe-encoded.

Alternatively, in the first frame to be encoded, the field image data of the odd field may be interframe-encoded, and the field image data of the even field may be intrafield-encoded. In the next frame to be encoded, the field image data of the odd field may be intrafield-encoded, and the field image data of the even field may be interframe-encoded. Even when image data are encoded as described above, image data can be satisfactorily reproduced in the reverse direction playback mode with similar effects being achieved.

In the first embodiment, one GOP consists of I picture and B picture, and in the second embodiment, one GOP consists of I picture and P picture. The image information encoding apparatus, the image information decoding apparatus, and the recording and reproducing system according to the present invention will be described more fully below in the order of the first and second embodiments.

The first embodiment will be described.

Figure 8:
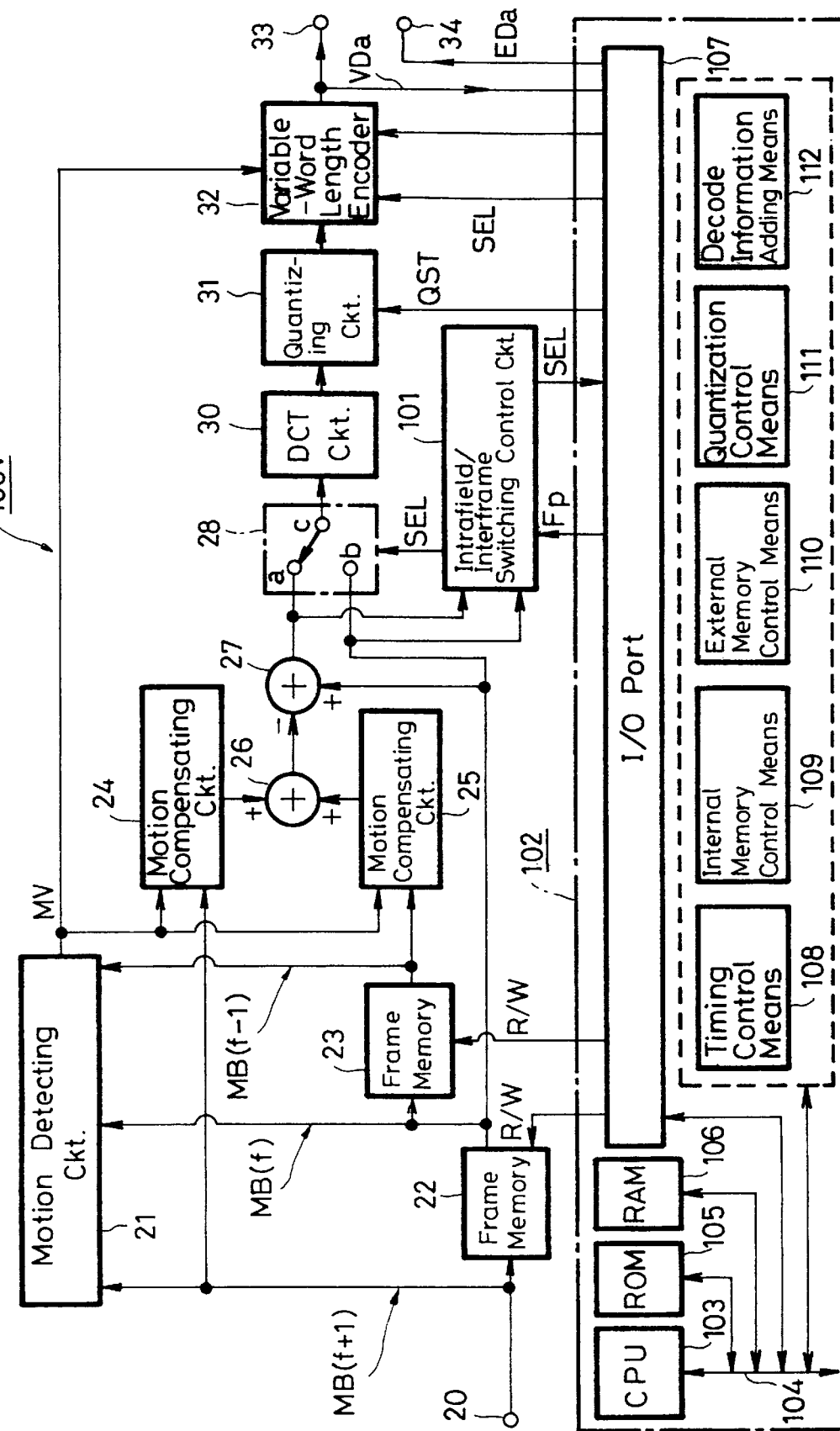
FIG. 8 is a block diagram showing a video encoder of the encoding apparatus according to the first embodiment of the present invention.

FIG. 8 shows, in block form, a video encoder. In FIG. 8, like elements and parts corresponding to those of FIG. 2 are marked with the same references and therefore need not be described in detail. A video encoder generally depicted at reference numeral 100v in FIG. 8 is used in the encoder 3 of the digital VCR shown in FIG. 1A instead of the video encoder 3v shown in FIG. 2. Moreover, the video encoder 100v shown in FIG. 8 is adapted to encode image data on the assumption that one GOP consists of I picture and B picture.

The video encoder 100v shown in FIG. 8 and the video encoder 3v shown in FIG. 2 differ from each other in that the inter/intra judgement circuit 29 used in the video encoder 3v shown in FIG. 2 is replaced with an intrafield/interframe switching control circuit 101 and a controller 102. The intrafield/interframe switching control circuit 101 and the controller 102 will be described.

The intrafield/interframe switching control circuit 101 compares information volumes of the difference data from the adding circuit 27 and the macroblock data MB (f) of the field image data of the odd or even field read out from the frame memory 22, and causes the switch 28 to connect the movable contact c to the inter-side fixed contact a or the intra-side fixed contact b based on a compared result, thereby selecting information with a smaller information volume from the two information.

Further, the intrafield/interframe switching control circuit 101 generates a first divided signal by frequency-dividing a frame pulse Fp supplied thereto from the controller 101 by half, and further inverts the first divided signal to provide a second divided signal whose phase is different from that of the first divided signal by 180 degrees. When the first divided signal, for example, is changed in the level of "0", "11", "0", "1", ... at every field, the second divided signal is changed in the level of "1", "0", "1", "0".

The intrafield/interframe switching control circuit 101 selects the first divided signal when the frame pulse Fp is held at low "0" level, and selects the second divided signal when the frame pulse Fp is held at high "1" level. Then, the intrafield/interframe switching control circuit 101 supplies these divided signals thus selected to the switch 28 as the inter/intra selection signal SEL.

The switch 28 connects the movable contact c to the intra-side fixed contact b when the inter/intra selection signal SEL from the intrafield/interframe switching control circuit 101 is held at low "0" level, and connects the movable contact c to the inter-side fixed contact a when the inter/intra selection signal SEL is held at high "1" level.

During the first frame period since the processing has started, the frame pulse Fp goes to low "0" level so that the intrafield/interframe switching control circuit 101 select the first divided signal and supplies the selected first divided signal to the switch 28 as the inter/intra selection signal SEL. During the odd field period of the first frame period since the processing has started, the inter/intra selection signal SEL goes to low "0" level so that the switch 28 connects the movable contact c to the intra-side fixed contact b. During the even field period, the inter/intra selection signal SEL goes to high "1" level so that the switch 28 connects the movable contact c to the inter-side fixed contact a.

During the next frame period of the frame since the processing has started, the frame pulse Fp goes to high "1" level so that the intrafield/interframe switching control circuit 101 select the second divided signal and supplies the selected second divided signal to the switch 28 as the inter/intra selection signal SEL. Therefore, during the odd field period of the first frame period since the processing has started, the inter/intra selection signal SEL goes to high "1" level so that the switch 28 connects the movable contact c to the inter-side fixed contact a. During the even field period, the inter/intra selection signal SEL goes to low "0" level so that the switch 28 connects the movable contact c to the intraside fixed contact b.

The inter/intra switched states are illustrated below.

Frame pulse FP . . . 0 1 0 1 . . . (unit: frame) First divided signal . . . 01010101 . . . (unit: field) Second divided signal . . . 10101010 . . . (unit: field) Selection signal SEL . . . 01100110 . . . (unit: field) Connection of switch . . . baabbaab . . . (unit: field) Pictures generated . . . IBBIIBBI . . . (unit: field)

The value of the selection control signal SEL, i.e., high "1" level corresponds to "intra", and low "0" level corresponds to "inter".

In the description below, it is assumed that the inter and the intra are switched at every field in response to the inter/intra selection signal SEL.

The controller 102 will be described.

As shown in FIG. 8, in the controller 102, a bus 104 comprising address bus, data bus and control bus is connected to a CPU (central processing unit) 103, and the bus 104 is connected with a ROM (read-only memory) 105 with program data and parameter data stored therein, a RAM (random-access memory) 106 serving as a work area for the program data stored in the ROM 105 and which is served as a holding means for temporarily holding the parameter data, and an input/output port (I/O port) 107 for exchanging data, etc., between it and respective portions shown in FIG. 8.

A manner in which the controller 102 is enabled to function after it has been energized will be described. when the controller 102 is energized, the program data and the parameter data stored in the ROM 105 are supplied to and resident in a main memory of the CPU 103, whereby the CPU 103 are rendered operable in such many ways as shown by solid-line blocks in a one-dot chain line large block in FIG. 8.

Although input terminals and output terminals of a timing control means 108 are not illustrated for the sake of simplicity, the timing control means supplies a variety of reference timing signals to the respective portions shown in FIG. 8. Moreover, this timing control means 108 supplies the frame pulse Fp to the intrafield/interframe switching control circuit 101.

An internal memory control means 109 reads data from the ROM 105 and RAM 106, and writes data in the RAM 106 by supplying read/write control signals to the ROM 105 and the RAM 106.

An external memory control means 110 reads and writes data from and in frame memories 22 and 23 by supplying read/write control signals R/W to the frame memories 22 and 23 through the I/O port 107 based on a divided signal which results from frequency-dividing a frame pulse generated from the timing control means 108 by half. Macroblock data is read by address signals contained in the read/write control signal.

In that case, when the frame image data stored in the frame memories 22 and 23 are interlaced image data, the external memory control means 109 increments a horizontal address value of the address signal in the read/write control signal R/W supplied to the frame memories 22 and 23 up to the maximum value of horizonal address value of macroblock data to be extracted, and then increments a vertical address value by "2". Thus, in the case of the interlaced image data, only macroblock data of the field image of odd field or even field can be read out.

When on the other hand the frame image data stored in the frame memories 22 and 23 are non-interlaced image data, the external memory control means 109 recognizes an area ranging from the minimum address value on the storage spaces of the frame memories 22 and 23 to an address value corresponding to ½ of the storage capacity as an storage area of field image data of odd field, and also recognizes an area ranging from the address value corresponding to the ½ of the storage capacity to the maximum address values on the storage spaces as a storage area of field image data of even field.

The external memory control means 109 increments a horizontal address value of the address signal in the read/write control signal R/W up to the maximum value of a horizontal address value of macroblock data to be extracted, and then increments a vertical address value by "1". Thus, even in the case of non-interlaced image data, only macroblock data of field image data of odd field or even field can be read out.

The quantization control means 111 generates quantization step data QST for making an encoded amount constant on the basis of the encoded amount of variable-word length encoded data VDa supplied thereto through the I/O port 107, and supplies the quantization step data QST through the I/O port 107 to the quantizing circuit 31. The quantization step data QST is supplied to the quantizing circuit 31 to increase and decrease the number of quantization steps, whereby image data of one frame can be recorded on the magnetic tape so as to form n recording tracks by increasing and decreasing the encoded amount of the quantized image data. When image data of one frame, for example, are recorded on the magnetic tape so as to form four tracks, four tracks consist of one frame. Therefore, if the first track of the four tracks is used as the access unit, then image data can be accessed at the frame unit upon edit.

The encoded volume of the variable-word length encoded data VDa can be detected by counting the bit stream of the variable-word length encoded data VDa supplied from the variable-word length encoding circuit 32.

Figure 1A:
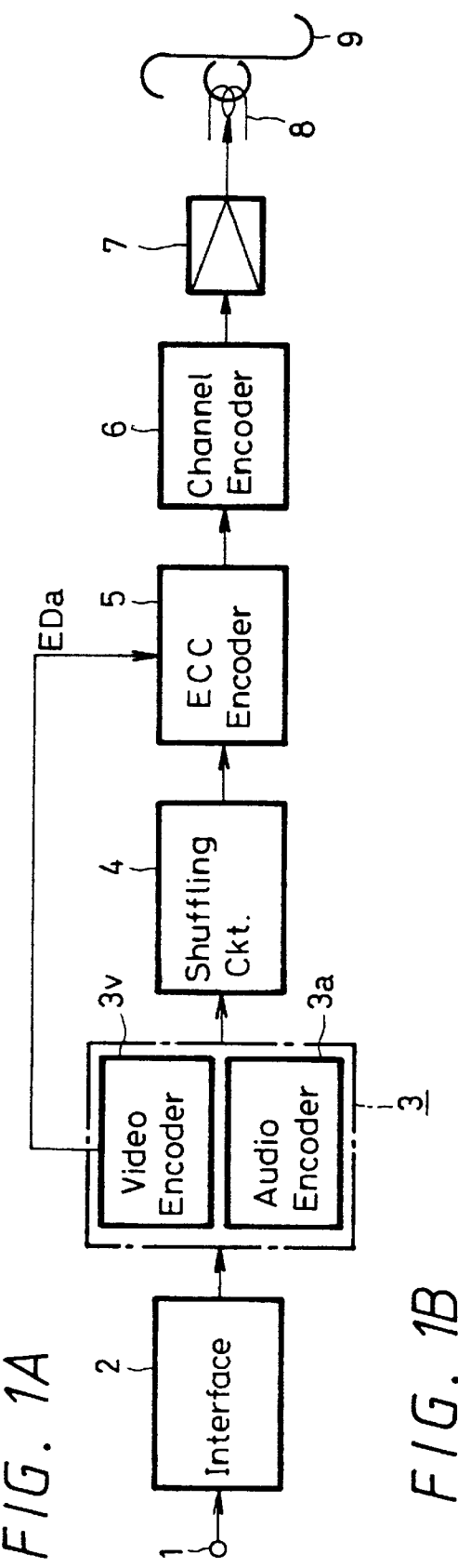
FIG. 1A is a block diagram showing an example of a recording system of a digital VCR.
Figure 1B:
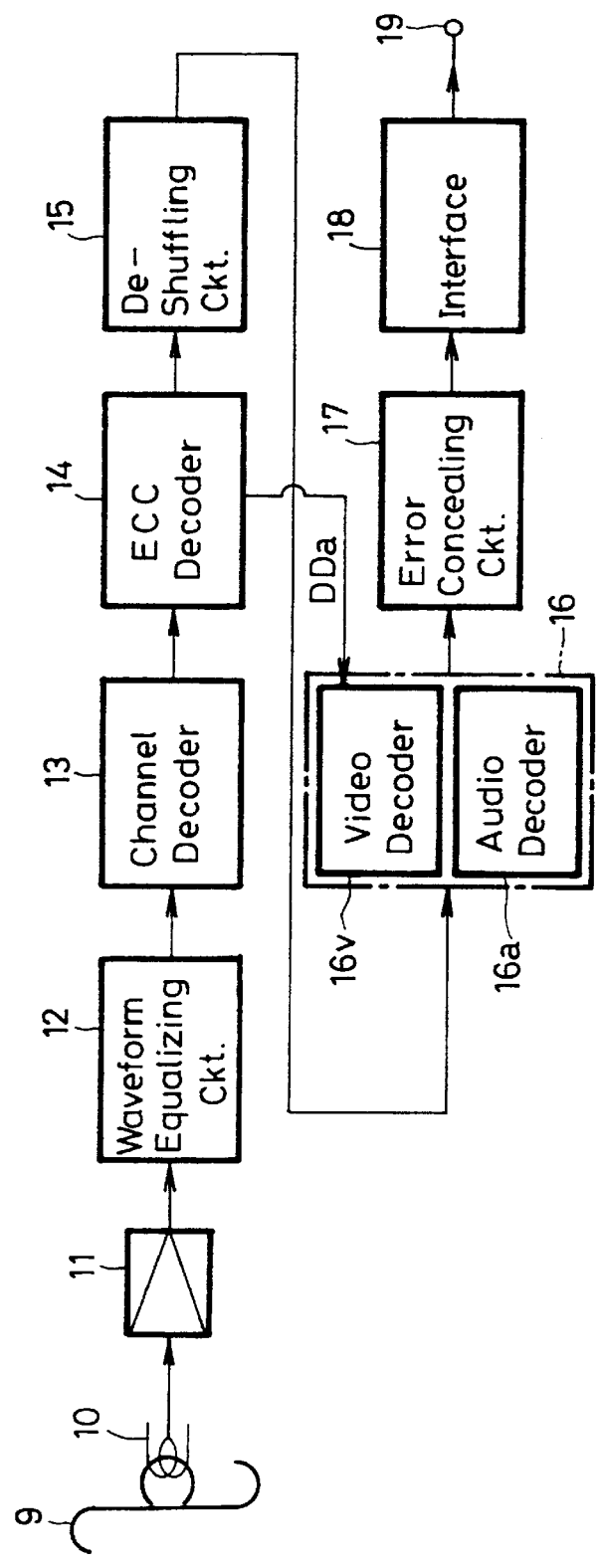
FIG. 1B is a block diagram showing an example of a reproducing system of such a digital VCR.
Figure 2:
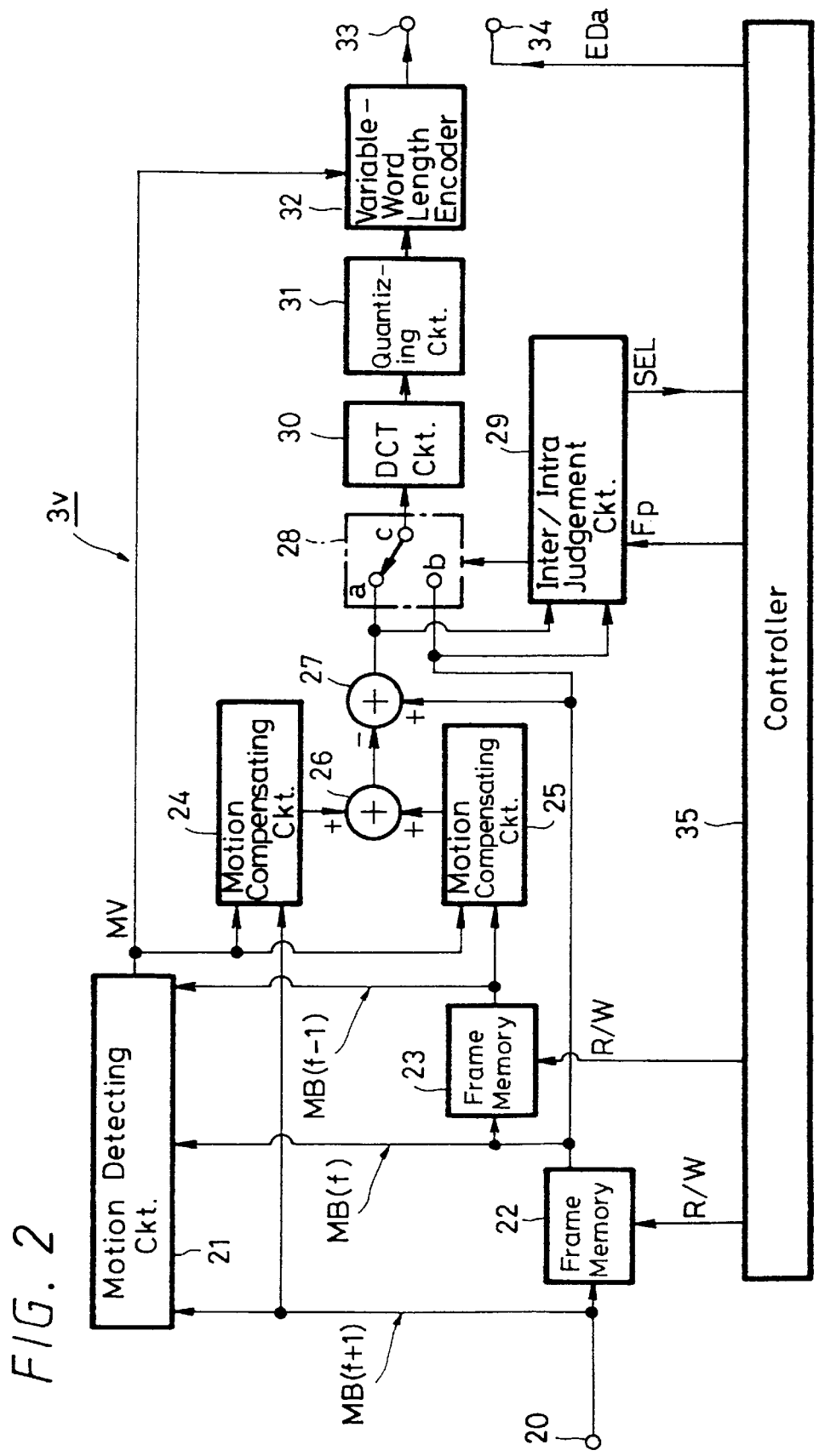
FIG. 2 is a block diagram showing an example of a video encoder.
Figure 3:
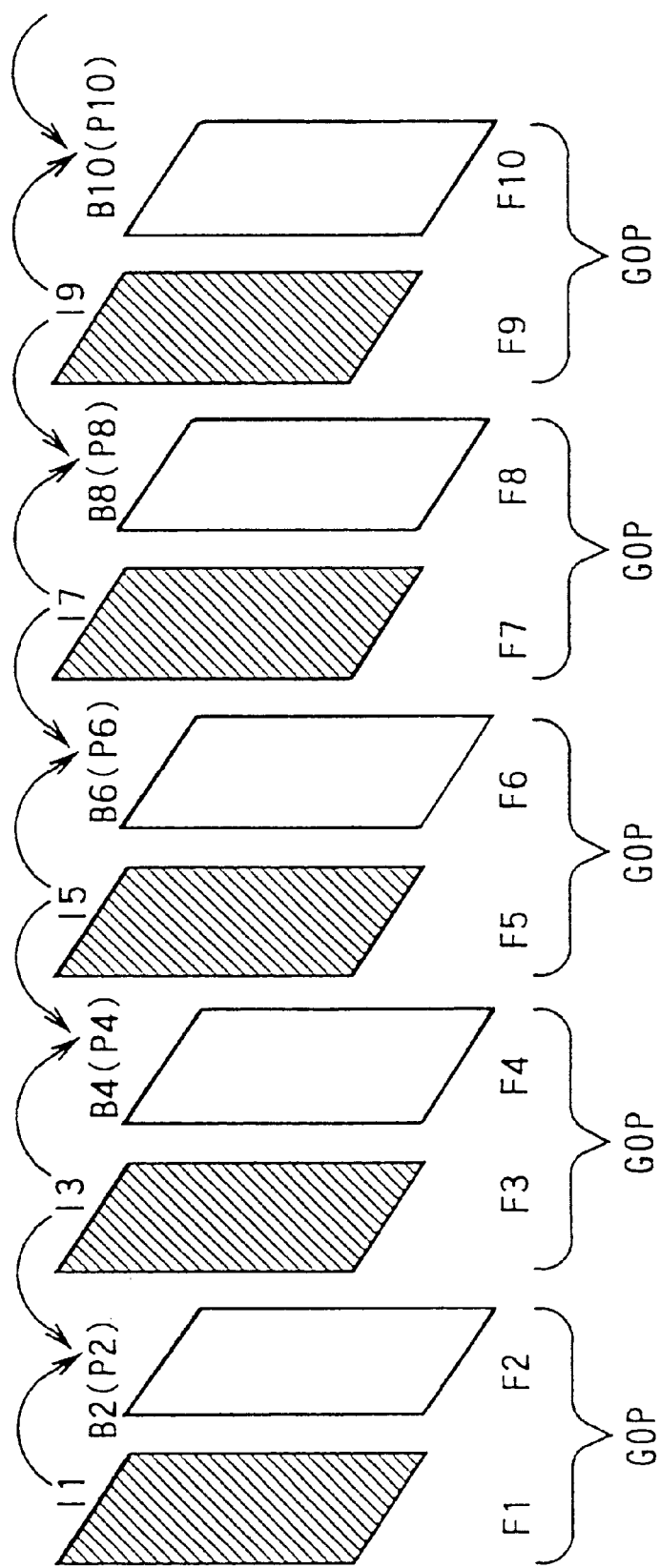
FIG. 3 is a conceptual diagram used to explain prediction directions in the video encoder and the video decoder.

A decode information adding means 112 supplies the inter/intra selection signal SEL and the decode information EDa composed of GOP header data, supplied thereto from the intrafield/interframe switching control circuit 101 through the I/O port 107, to the ECC encoder 5 in the digital VCR shown in FIGS. 1A, 1B through the I/O port 107 and the output terminal.

The GOP header data are data which are generated by the decode information adding means 112. The decode information adding means 112 generates one GOP header data at a point in which the value of the inter/intra selection signal SEL is changed; the decode information adding means 112 generates GOP header data of high "1" level for GOP header data, and generates GOP header data of low "0" level for data other than the GOP header data. When the GOP header data is at high "1" level, it is indicated that image data provided just after the GOP header data is the header of GOP and the header of picture. When the GOP header data is at low "0" level, it is indicated that the image data provided immediately after the GOP header data is the header of picture.

The decode information EDa is generated at every field image data, and added to the header position of the encoded field image data. The decode information EDa is added to the field image data by the ECC encoder 5 in the digital VCR shown in FIG. 1A. An arrangement of data provided in one GOP is as follows.

Order of data outputted:
1st . . . GOP header data
2nd . . . inter/intra selection signal SEL
3rd . . . field image data encoded as I or B picture
4th . . . GOP header data
5th . . . inter/intra selection signal SEL
6th . . . field image data encoded as B or P picture An operation of the video encoder will be described.

When I pictures comprising one GOP are generated, the switch 28 connects the movable contact c to the intra-side fixed contact b under control of the intrafield/interframe switching control circuit 101. In this case, field image data read out from the frame memory 22 is encoded by the DCT circuit 31 and the circuits following the DCT circuit 31. At that time, the decode information EDa generated by the decode information adding circuit 112 in the controller 102 is supplied through the output terminal 34 to the ECC encoder 5 shown in FIG. 1A.

When B picture comprising one GOP are generated, the switch 28 connects the movable contact c to the inter-side fixed contact a under control of the intrafield/interframe switching control circuit 101.

The motion detecting circuit 21 detects motion of the macroblock data MB (f) provided within the field image data of odd or even field of the present frame and macroblock data MB (f+1) provided within field image data of odd or even field of the succeeding frame, sequentially. As a result, the motion detecting circuit 21 selects the macroblock data MB (f+1) provided within the field image data of odd or even field of the succeeding frame whose content is closest to that of the macroblock data MB (f) provided within the field image data of odd or even field of the present frame, and generates motion vector data MV which indicates the position of the macroblock data MB (f+1) of the field image data of the odd or even field of the succeeding frame using the position of the macroblock data MB (f) provided within the field image data of odd or even field of the present frame.

For the sake of simplicity, FIG. 8 shows one motion detecting circuit 21. However, in actual practice, the video encoder 100V includes two motion detecting circuits for executing the above two motion detection processings. These two motion detecting circuits output motion vector data MV obtained as a result of motion detection.

Similarly, the motion detecting circuit 21 selects macroblock data MB (f−1) provided within field image data of odd or even field of preceding frame whose content is closest to that of the macroblock data MB (f) provided within the field image data of odd or even field of the present frame, and generates motion vector data MV indicative of the position of the macroblock data MD (f–1) provided within the field image data of odd or even field of the preceding frame by using the position of the macroblock data MB (f) provided within the field image data of odd or even field of the present frame as a starting point.

The above two motion vector data MV are supplied to the variable-word length encoding circuit 32 and the motion compensating circuits 24, 25, respectively. The motion compensating circuit 24 extracts from the field image data of the odd or even field of the succeeding frame the macroblock data MB (f+1) shown by the motion vector data MV. The extracted macroblock data MB (f+1) provided within the field image data of odd or even field of the succeeding frame is supplied to the adding circuit 26.

On the other hand, the motion compensating circuit 25 extracts from the field image data of the odd or even field of the preceding frame the macroblock data MB (f–1) shown by the motion vector data MV. The extracted macroblock data MB (f–1) provided within the field image data of the odd or even field of the preceding frame is supplied to the adding circuit 26.

The adding circuit 26 adds the macroblock data MB (f+1) provided within the field image data of odd or even field of the succeeding frame supplied thereto from the motion compensating circuit 24 and the macroblock data MB (f–1) provided within the field image data of the odd or even field of the preceding frame supplied thereto from the motion compensating circuit 25, and averages added macroblock data by multiplying the added result with the coefficient "½". The mean value data from the adding circuit 26 is supplied to the adding circuit 27, and the macroblock data MB (f) provided within the field image data of the odd or even field of the present frame is supplied to the adding circuit 27. Therefore, the adding circuit 27 subtracts the mean value data of the adding circuit 26 from the macroblock data MB (f) provided within the field image data of the odd or even field of the present frame. The output from the adding circuit 27 is interframe-encoded by the DCT circuit 30, the quantizing circuit 31 and the variable-word length encoding circuit 32, and outputted as B picture.

After all macroblock data MB (f) provided within the field image data in the odd or even field of the present frame stored in the frame memory 22 have been processed in the above-mentioned manner, i.e., interframe-encoded, the frame image data stored in the frame memory 22 is read out, and supplied to the frame memory 23, in which it is stored as image data of preceding frame. On the other hand, image data of the next frame is stored in the frame memory 22 as frame image data of present frame. At that time, the decode information EDa from the decode information adding means 12 in the controller 102 is supplied through the output terminal 34 to the ECC encoder 5 shown in FIG. 1A.

The quantization control means 111 detects a data volume of the variable-word length encoded data VDa supplied from the variable-word length encoding circuit 32, and supplies the quantization step data QST to the quantizing circuit 31 based on a detected result, whereby the quantizing circuit 31 quantizes coefficient data supplied thereto from the DCT circuit 30 at the quantization step number based on the quantization step data QST from the quantization control means 111 in the controller 102.

Since image data are processed as described above, the encoded amount of the encoded field image data serving as B picture within each frame and the encoded amount of the encoded field image data serving as I picture are constantly kept constant, and a ratio between these encoded amounts also can be made constant. Thus, image data can be recorded by image data of at least one frame so as to form n recording tracks.

Figure 4:
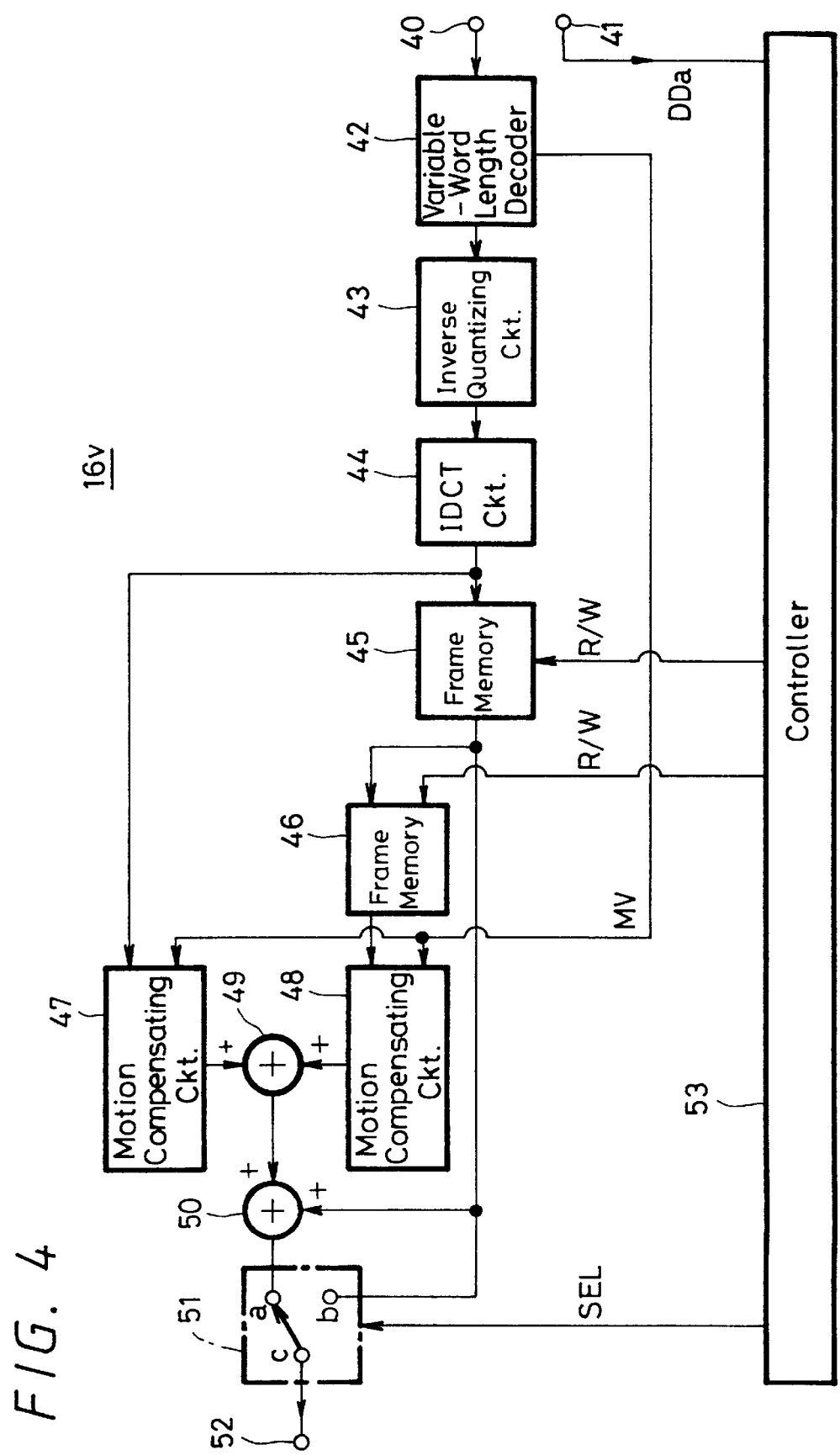
FIG. 4 is a block diagram showing an example of a video decoder.
Figure 5:
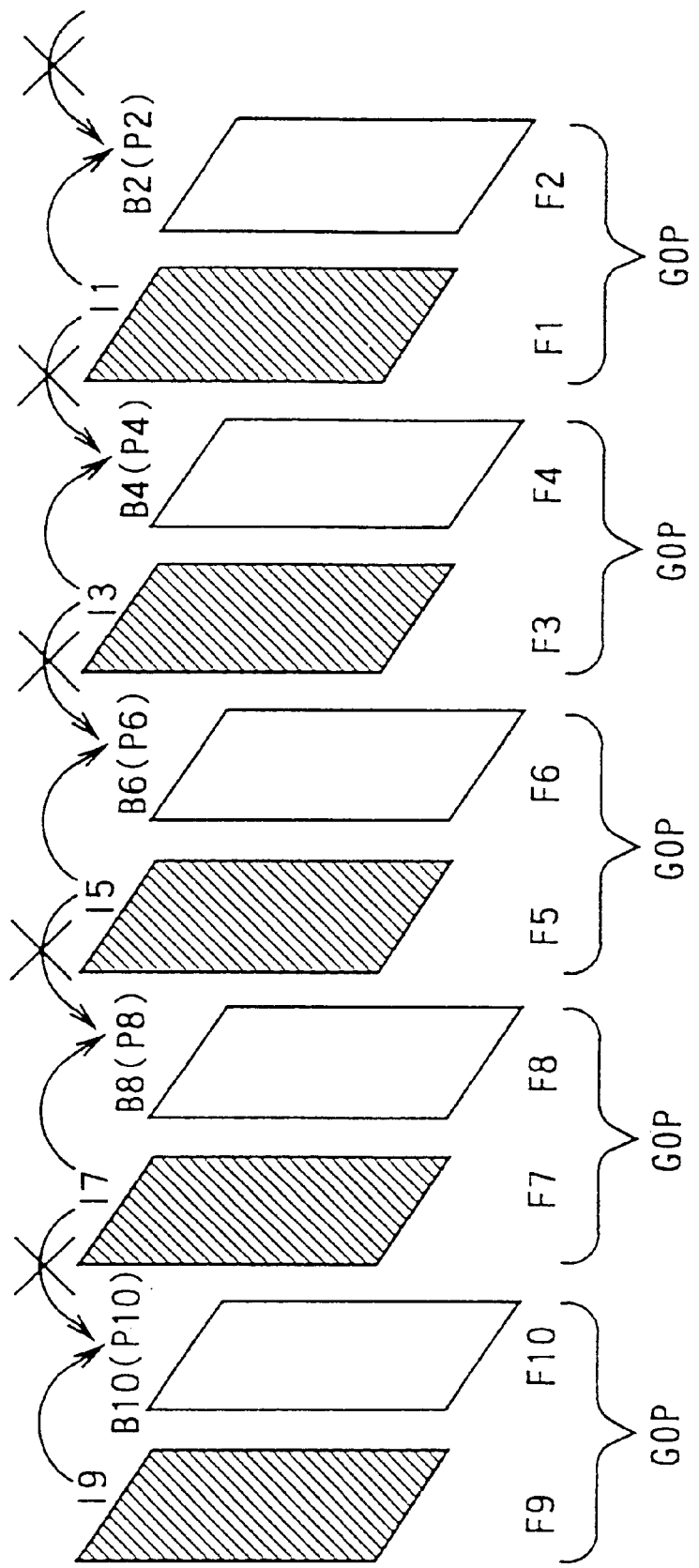
FIG. 5 is a conceptual diagram used to explain a manner in which image data is decoded by the video decoder when image data is reproduced in the reverse direction playback mode.
Figure 9:
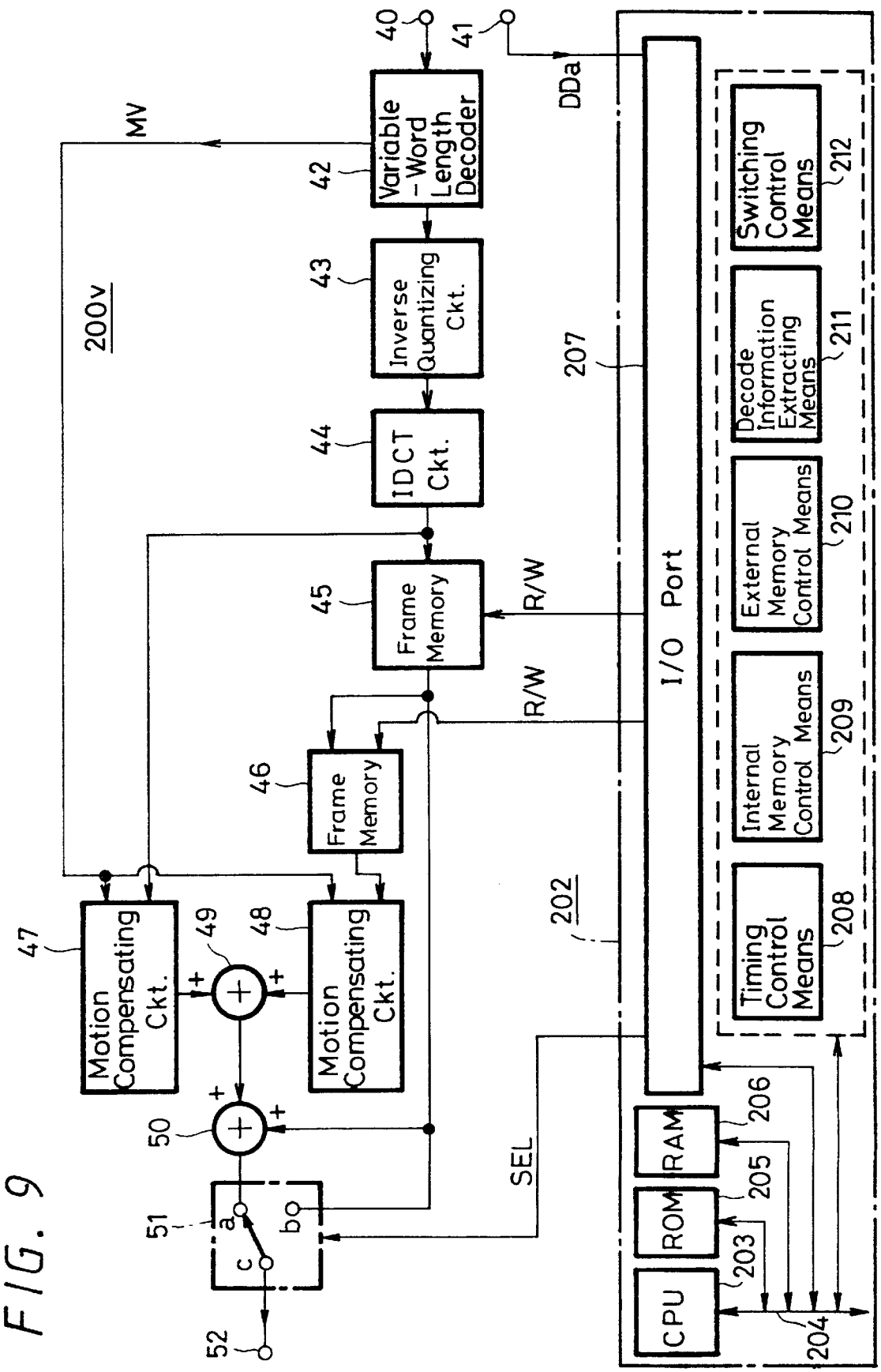
FIG. 9 is a block diagram showing a video decoder of the decoding apparatus according to the first embodiment of the present invention.

FIG. 9 is a block diagram showing an example of a video decoder. In FIG. 9, like elements and parts corresponding to those of FIG. 4 are marked with the same references and therefore need not be described in detail. A video decoder 200v shown in FIG. 9 is used by the video decoder 16 in the digital VCR shown in FIGS. IA, 1B instead of the video decoder 16v shown in FIG. 4. The video decoder 200v shown in FIG. 9 is arranged on the assumption that one GOP consists of I pictures and B pictures.

The video decoder 200v shown in FIG. 9 and the video decoder 16v shown in FIG. 4 differ from each other in controller 202. The controller 202 will be described below.

In the controller 202, as shown in FIG. 9, a bus 204 consisting of address bus, data bus and control bus is connected to a CPU 203. The bus 204 is connected with a ROM 205 with program data and parameter data stored therein, a RAM 206 serving as a work area for processing based on the program data stored in the ROM 205 and which is serving as a holding means for temporarily holding the parameter data, and an I/O port 207 for exchanging data between it and respective portion shown in FIG. 9.

A manner in which the controller 202 is rendered operable after it has been energized will be described.

When the controller 202 is energized, the program data and the parameter data stored in the ROM 205 are supplied to and reside on a main memory of the CPU 203, whereby the CPU 203 are given many functions shown by solid-line blocks within a one-dot chain line large block in FIG. 9.

A timing control means 208 supplies a variety of reference timing signals to respective portions shown in FIG. 9 through input and output terminals, although not shown for the sake of simplicity.

An internal memory control means 209 reads data from the ROM 205, reads data from the RAM 206, and writes data in the RAM 206 by supplying read/write control signals to the ROM 205 and the RAM 206.

An external memory control means 210 supplies read/write control signals R/W to the frame memories 45, 46 through the I/O port 207, and read and write data from and in the frame memories 45, 46 based on a divided signal which results from frequency-dividing the frame pulse Fp generated from the timing control means 208 by half. Macroblock data is read out by address signals contained in the read/write control signals R/W. Although the address signal had to be manipulated upon encoding, reproduced image data are stored in the frame memories 45, 46 at the macroblock unit upon decoding so that the address signals are manipulated in a manner similar to that used when the frame image data is the non-interlaced image data in the encoding mentioned above.

A decode information extracting means 211 obtains the decode information DDa supplied thereto from the ECC decoder 14 shown in FIG. 1B through the input terminal 41, and supplies the GOP header data and the inter/intra selection signal SEL contained in the decode information DDa thus obtained to the timing control means 208 and a switching control means 212, respectively.

The switching control means 212 supplies the inter/intra selection signal SEL supplied thereto from the decode information extracting means 211 to the switch 51 to effect the inter/intra switching.

An operation of the video decoder 200v will be described. In order to understand the operation of the video decoder 200v more clearly, let it be assumed that upon decoding, frame data serving as decoded I picture of immediately-preceding GOP is stored in the frame memory 46 and that the IDCT circuit 44 outputs field image data of odd or even field of frame serving as decoded I picture of GOP to be decoded. Further, let it be assumed that frame image data serving as decoded I picture of immediately-preceding GOP is frame image data of preceding frame, image data serving as B picture of GOP to be decoded is difference image data of odd or even field of the present frame, and that frame image data serving as decoded I picture of GOP to be decoded is frame image data of succeeding frame.

Video data from the de-shuffling circuit 15 shown in FIG. 1B is supplied through the input terminal 40 shown in FIG. 9 to the variable-word length decoding circuit 42. On the other hand, the decode information DDa from the ECC decoder 14 shown in FIG. 1B is supplied through the input terminal 41 shown in FIG. 9 to the controller 202. The variable-word length decoding circuit 42 decodes the video data to provide quantized coefficient data. The decoded video data is supplied to the inverse quantizing circuit 43, and the inverse quantizing circuit 43 inverse-quantizes the decoded video data to provide coefficient data that has been processed in a DCT fashion. The video data that has been reconverted to the DCT coefficient data is supplied to the IDCT circuit 44, and thereby transformed into the original image data. In the above description, "original image data" means "difference data" if this image data is B picture generated by interframe-encoding, and "macroblock data" if this image data is I picture generated by intrafield-encoding.

The decode information extracting means 211 in the controller 202 obtains the decode information DDa, and supplies the GOP header data and the inter/intra selection signal SEL to the timing control means 208 and the switching control means 212. The switching control means 212 supplies the inter/intra selection signal SEL to the switch 51 as a switching control signal, whereby the movable contact c of the switch 51 is connected to the inter-side fixed contact a.

After the difference image data serving as B picture has been stored in the frame memory 45, the motion compensating circuit 47 extracts from the field image data of odd or even field of succeeding frame serving as decoded I picture the macroblock data MB (f+1) shown by the motion vector data MV supplied from the variable-word length decoding circuit 42. The macroblock data MB (f+1) extracted from the field image data of the odd or even field of the succeeding frame by the motion compensating circuit 47 is supplied to the adding circuit 49.

After the frame image data serving as decoded I picture of immediately-preceding GOP has been stored in the frame memory 46, the motion compensating circuit 48 starts the processing in unison with the processing start timing of the motion compensating circuit 47. Specifically, the motion compensating circuit 48 extracts the macroblock data MB (f−1) shown by the motion vector data MV supplied from the variable-word length decoding circuit 42 from the field image data of odd or even field of the frame image data serving as decoded I picture of immediately-preceding GOP. The macroblock data MB (f−1) that has been extracted from the field image data of odd or even field serving as the preceding frame by the motion compensating circuit 48 is supplied to the adding circuit 49.

The signal line connected to the output terminal of the variable-word length decoding circuit 42 is shown by a single line, and one symbol "MV" is referred to as a symbol indicating motion vector. However, the motion vector data MV are respectively obtained for all macroblocks of the field image data of the odd or even field of one frame image data when motion detections are carried out upon encoding. Accordingly, the motion vector data MV supplied to the motion compensating circuit 47 and the motion vector data supplied to the motion compensating circuit 48 are different motion vector data obtained upon encoding.

The macroblock data MB (f+1) from the motion compensating circuit 47 and the macroblock data MB (f−1) from the motion compensating circuit 48 are added by the adding circuit 49. The added result is multiplied with the coefficient "½" by the ½-multiplier incorporated in the adding circuit 49, and thereby averaged. The mean value data from the adding circuit 49 is supplied to the adding circuit 50.

The adding circuit 50 adds the difference data read out from the frame memory 45 and the mean value data from the adding circuit 49. The added output from the adding circuit 50 is supplied through the output terminal 52 to the error concealing circuit 17 shown in FIG. 1B as decoded reproduced video data of odd or even field of the present frame.

The read/write control signals R/W from the controller 53 are respectively supplied to the frame memories 45, 46, whereby macroblock data in the field image data of odd field or even field of succeeding frame serving as I picture outputted from the IDCT circuit 44 is supplied to the motion compensating circuit 47, and the frame memory 46, in which it is stored.

After field image data of odd or even field of the present frame serving as B pictures have been all restored by repeatedly executing the above-mentioned processings, the switching control means 212 in the controller 202 supplies the inter/intra selection signal SEL to the switch 51, whereby the movable contact c of the switch 51 is connected to the intraside fixed contact b. Since the contents of the frame memory 45 are sequentially rewritten as macroblock data MB (f+1) of field image data of odd or even field of succeeding frame as I picture each time the processing is executed, at this time, frame image data of succeeding frame serving as I picture is stored in the frame memory 45.

The read/write control signal R/W is supplied to the frame memory 45 from the controller 53, whereby field image data of odd or even field of succeeding frame serving as I picture stored in the frame memory 45 is supplied through the switch 51 and the output terminal 52 to the error concealing circuit 17 shown in FIG. 1B as decoded reproduced video data.

As described above, according to this embodiment, upon encoding, the field image data of one filed consisting of one frame is intrafield-encoded by the intrafield/interframe switching control circuit 101 in the video encoder 100v, and the field image data of the other field is interframe-encoded. Further, field image data to be intrafield-encoded and interframe-encoded is switched at every frame. When the encoded field image data is recorded, the decode information adding means 112 adds the inter/intra selection signal SEL to the decoded field image data. Upon decoding, the decode information extracting means 211 in the video decoder 200v extracts the decode information DDa, and the switching control means 212 supplies the inter/intra selection signal SEL in the decode information DDa to the switch 51, whereby the switch 51 is switched in the same manner as that in the encoding under control of the switching control means 212.

Accordingly, as shown in FIGS. 6 and 7, when image data is reproduced in the reverse direction, all image data can be decoded correctly. In addition, one field image data consisting one frame is intrafield-encoded, and the other field image data is interframe-encoded. There is then the large effect that a picture quality of a reproduced image can be improved and that a motion of a moving object within a picture can be made smooth without lowering the encoding efficiency.

The quantization step data QST is supplied to the quantizing circuit 31 by the quantization control means 111 to control the quantization step number in the quantizing circuit 31 thereby to make the encoded amount of the encoded frame image data constant. Thus, the encoded frame image data can be recorded on the magnetic tape so as to form n tracks.

Therefore, since the recording and reproducing apparatus can constantly recognize the corresponding position of the reproduced picture on the magnetic tape and the time code data corresponding to the reproduced picture can be displayed together with the reproduced picture, the user can determine a desirable edit point at the frame unit.

Figure 10:
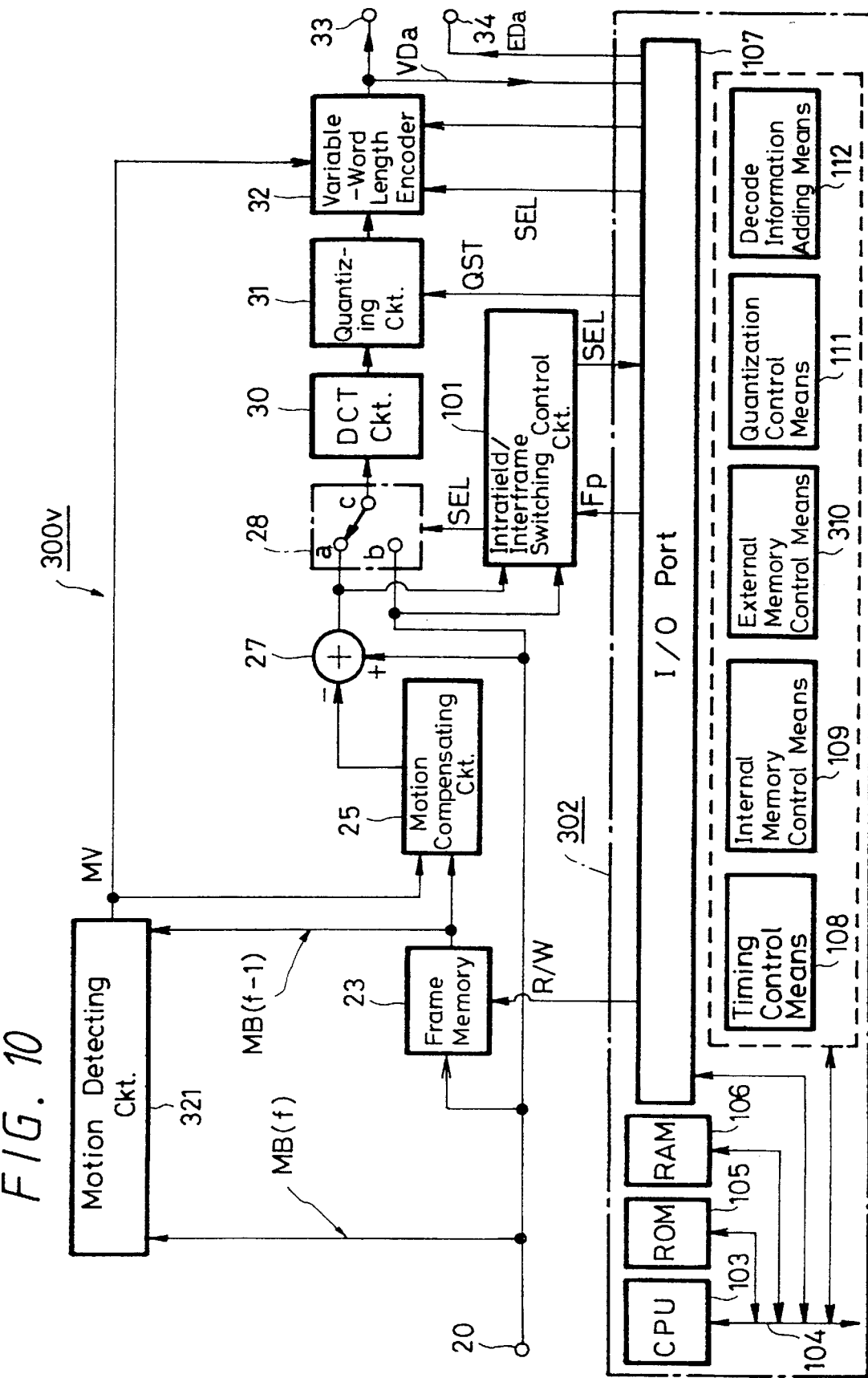
FIG. 10 is a block diagram showing a video encoder of the encoding apparatus according to the second embodiment of the present invention.

FIG. 10 is a block diagram showing another example of the video encoder shown in FIG. 8. In FIG. 10, like elements and parts corresponding to those of FIG. 8 are marked with the same references and therefore need not be described.

A video encoder 300ν shown in FIG. 10 differs from the video encoder 100ν shown in FIG. 8 in that the frame memory 22, the motion compensating circuit 24 and the adding circuit 26 can be removed. The reason for this is that one GOP consists of I pictures and P pictures in the video encoder 300ν shown in FIG. 10. Since the P picture is the image data generated by one-direction predictive encoding, there may be provided one frame memory and one motion compensating circuit. Further, since the adding circuit 26 is required only in the case of bidirectional predictive encoding, the adding circuit 26 becomes unnecessary in the one-direction predictive encoding.

Accordingly, an external memory control means 310 supplies the read/write control signal R/W to only the frame memory 23.

An operation of this video encoder 300ν will be described below. When I pictures composing one GOP are generated, the switch 28 connects the movable contact c to the intra-side fixed contact b under control of the intrafield/interframe switching control circuit 101. In this case, the field image data supplied through the input terminal 20 is encoded by the DCT circuit 31 and the circuits following the DCT circuit 31. Moreover, at that time, the decode information EDa generated by the decode information adding circuit 112 in the controller 102 is supplied through the output terminal 34 to the ECC encoder 5 shown in FIG. 1A.

When P pictures composing one GOP are generated, the switch 28 connects the movable contact c to the inter-side fixed contact a under control of the intrafield/interframe switching control circuit 101.

The motion detecting circuit 21 sequentially effects the motion detection of the macroblock data MB (f) provided within the field image data of odd or even field of the present frame and the macroblock data MB (f−1) provided within the field image data of odd or even field of the preceding frame read out from the frame memory 23. The motion detecting circuit 21 selects the macroblock data MB (f−1) provided in the field image data of odd or even field of the preceding frame whose content is closest to that of the macroblock data MB (f) provided within the field image data of odd or even field of the present frame, and obtains motion vector data MV indicative of the position of the macroblock data MB (f−1) provided within the field image data of odd or even field of the preceding frame using the position of the macroblock data MB (f) provided within the odd or even field of the present frame as a start point.

The motion vector data MV is supplied to the variable-word length encoding circuit 32 and the motion compensating circuit 25. The motion compensating circuit 25 extracts from the field image data of odd or even field of the preceding frame the macroblock data MB (f−1) shown by the above motion vector data MV. The extracted macroblock data MB (f−1) provided within the field image data of odd or even field of the preceding frame is supplied through the subtraction-side input terminal of the adding circuit 27 to the adding circuit 27.

The macroblock data MB (f) provided within the field image data of odd or even field of the present frame is supplied through the input terminal 20 to the adding circuit 27, whereby the adding circuit 27 subtracts the macroblock data MB (f−1) provided within the field image data of odd or even field of the preceding frame from the macroblock data MB (f) provided within the field image data of odd or even field of the present frame. The output from the adding circuit 27 is interframe-encoded by the DCT circuit 30, the quantizing circuit 31 and the variable-word length encoding circuit 32, and outputted as P picture.

During all macroblock data MB (f) provided within the field image data of odd and even fields of the present frame supplied through the input terminal 20 are processed in the above-mentioned manner, i.e., interframe-encoded, the field image data of odd and even fields of the present frame are supplied to the frame memory 23, and stored in the frame memory 23 as image data of preceding frame. On the other hand, the next frame image data is supplied through the input terminal 20 to the video encoder 300ν. At that time, the decode information EDa from the decode information adding means 112 in the controller 102 is supplied through the output terminal 34 to the ECC encoder 5 shown in FIG. 1A.

The quantization control means 111 detects a data volume of the variable-word length encoded data VDa supplied thereto from the variable-word length encoding circuit 32, and supplies the quantization step data QST to the quantizing circuit 31 based on the detected result. Thus, the quantizing circuit 31 quantizes the coefficient data from the DCT circuit 30 at the quantization step number based on the quantization step data QST supplied thereto from the quantization control means 111 in the controller 102.

Since image data are processed as described above, the encoded amount of the encoded field image data serving as P picture in each frame and the encoded amount of the encoded field image data serving as I picture can constantly be kept constant, and a ratio between these encoded amounts also can be made constant. Therefore, image data can be recorded by image data of at least one frame so aa to form n recording tracks.

Figure 11:
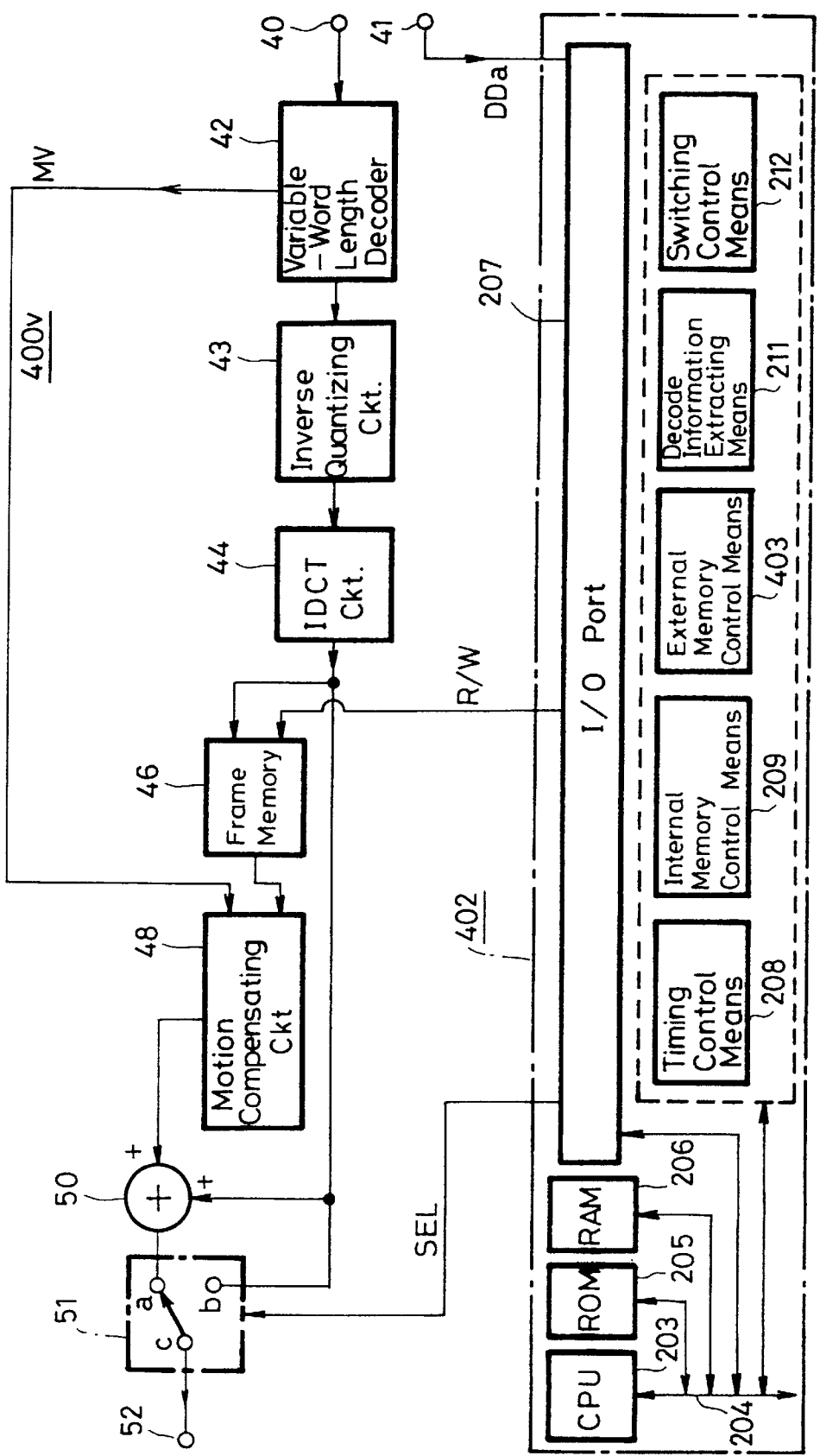
FIG. 11 is a block diagram showing a video decoder of the decoding apparatus according to the second embodiment of the present invention.

FIG. 11 is a block diagram showing other example of the video decoder shown in FIG. 9. In FIG. 11, like elements and parts corresponding to those of FIG. 9 are marked with the same references and therefore need not be described in detail.

A video decoder 400ν shown in FIG. 11 differs from the video decoder 200ν shown in FIG. 9 only in that the frame memory 45, the motion compensating circuit 47 and the adding circuit 49 can be removed therefrom. The reason for this is that one GOP consists of I pictures and P pictures in the video encoder 400ν shown in FIG. 11. Since the P picture is image data generated by one-direction predictive encoding, there may be provided one frame memory and one motion compensating circuit. Furthermore, since the adding circuit 49 is needed in order to decode only the B picture by bidirectional predictive encoding, the adding circuit 49 may be removed when the P picture obtained by one-direction predictive encoding is decoded.

Accordingly, the external memory control means 403 supplies the read/write control signal R/W to only the frame memory 46.

An operation of the video decoder 400v will be described below. In order to understand the operation of the video decoder 400v more clearly, let it be assumed that, when decoding image data, frame image data is stored in the frame memory 46 as decoded I picture of immediately-preceding GOP and that the IDCT circuit 44 outputs field image data of odd or even field as decoded P picture of GOP to be decoded.

Further, let it be assumed that the frame image data serving as decoded I picture of immediately-preceding GOP is frame image data of preceding frame and that image data serving as P picture of GOP to be decoded is difference image data of odd or even field of present frame.

Video data from the de-shuffling circuit 15 shown in FIG. 1B is supplied through an input terminal 40 shown in FIG. 11 to the variable-word length decoding circuit 42. On the other hand, the decode information DDa from the ECC decoder 14 shown in FIG. 1B is supplied th rough an input terminal 41 shown in FIG. 1B to the controller 402. The video data is decoded to quantized coefficient data by the variable-word length decoding circuit 42. The decoded video data is supplied to the inverse quantizing circuit 43, and reconverted to DCT coefficient data by this inverse quantizing circuit 43. The video data reconverted in the form of DCT coefficient data is supplied to the IDCT circuit 44, thereby converted to the original image data. Herein, "original image data" means "difference data" if this image data is P picture generated by interframe-encoding, and "macroblock data" if this image data is I picture generated by intrafield-encoding.

The decode information extracting means 211 in the controller 402 obtains the decode information DDa, and supplies the GOP data and the inter/intra selection signal SEL to the timing control means 208 and the switching control means 212. The switching control means 212 supplies the inter/intra selection signal SEL to the switch 51 as the switching control signal, whereby the movable contact c of the switch 51 is connected to the inter-side fixed contact a.

The motion compensating circuit 48 extracts from the field image data of odd or even field of decoded frame image data serving as I picture of immediately-preceding GOP the macroblock data MB (f−1) shown by the motion vector data MV supplied thereto from the variable-word length decoding circuit 42. The macroblock data MB (f−1) extracted from the field image data of odd or even field serving as the preceding frame by the motion compensating circuit 48 is supplied to the adding circuit 50.

The adding circuit 50 adds the difference data from the IDCT circuit 44 and the macroblock data MB (f−1) extracted from the field image data of odd or even field serving as the preceding frame from the motion compensating circuit 48. The added output from the adding circuit 50 is supplied through the output terminal 52 to the error concealing circuit 17 shown in FIG. 1B as the decoded reproduced video data of odd of even field of the present frame.

The read/write control signal R/W from the external memory control means 403 in the controller 102 is supplied to the frame memory 46, whereby the frame image data serving as the next I picture outputted from the IDCT circuit 44 is supplied to and stored in the frame memory 46.

After all field image data of odd or even field of the present frame serving as P pictures have been restored by repeatedly executing the above-mentioned processings, the switching control means 212 in the controller 402 supplies the inter/intra selection signal SEL to the switch 51, whereby the movable contact c of the switch 51 is connected to the intraside fixed contact b.

As described above, according to this embodiment, upon encoding, the intrafield/interframe switching control circuit 101 in the video encoder 300v intrafield-encodes the field image data of one field consisting of one frame, and the field image data of other field is interframe-encoded by one-direction predictive encoding as P picture. The field image data that are to be intrafield-encoded and interframe-encoded are switched at every frame. When the encoded field image data is recorded, the decode information adding means 112 adds the inter/intra selection signal SEL to the decoded field image data. upon decoding, the decode information extracting means 211 in the video decoder 400v extracts the decode information DDa, and the switching control means 212 supplies the inter/intra selection signal SEL contained in the decode information DDa to the switch 51, whereby the switch 51 is switched in the same manner as that of the encoding.

Accordingly, as earlier noted with reference to FIGS. 6 and 7, all image data can be used when image data is reproduced in the reverse direction playback mode. In addition, since one field image data of one frame is intrafield-encoded and the image data of the other field is interframe-encoded by one-direction predictive encoding to thereby generate P pictures, in addition to the effects achieved by the first embodiment, the video encoder and decoder may have one frame memory, one motion compensating circuit and one adding circuit. Moreover, the adding circuit incorporating therein the ½-multiplier become unnecessary, and the processing can be made simple. Thus, a time required by the encoding and the decoding can be reduced considerably.

In the first and second embodiments of the present invention, there is provided one motion detecting circuit 21. In actual practice, this motion detecting circuit 21 includes therein two motion detecting circuit. Therefore, according to this embodiment, it is sufficient to use only one motion detecting circuit.

Figure 12:
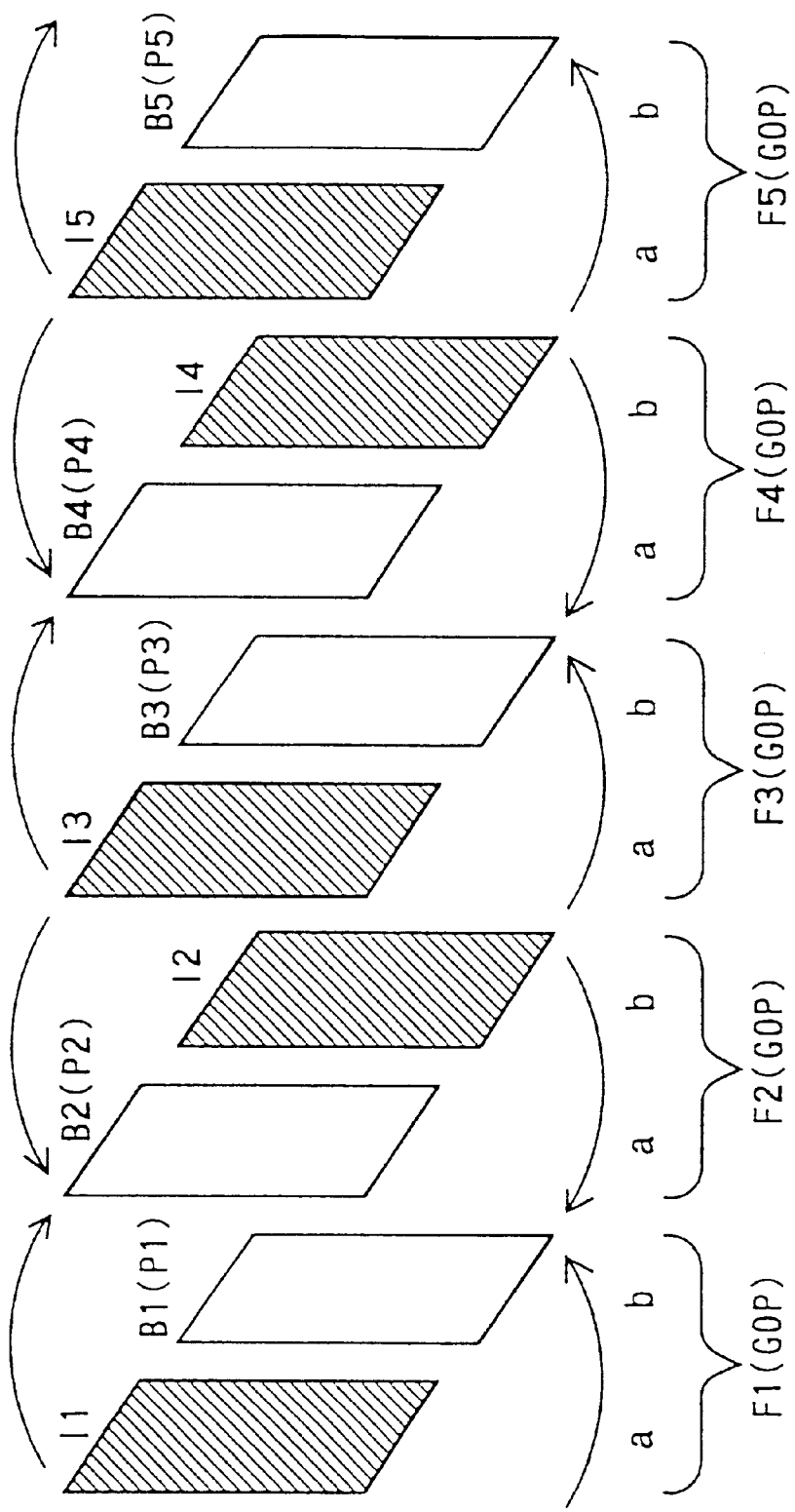
FIG. 12 is a conceptual diagram used to explain a manner in which image data is encoded and decoded by an encoding apparatus and a decoding apparatus according to a third embodiment of the present invention.

FIG. 12 is a conceptual diagram used to explain a concept in which image data is encoded and decoded in the encoding apparatus and the decoding apparatus according to a third embodiment of the present invention.

In order to understand the third embodiment of the present invention more clearly, FIG. 12 shows the case that one GOP is constituted by two subsample image data. FIG. 12 shows each of subsample image data to be encoded. Reference symbols a and b indicating subsample a and subsample b are provided on the lower portions of these image data, and frame numbers F1 through F5 are provided on the lower portions of subsamples a and b, by way of example. Subsample image data shown hatched are subsample image data I1, I2, I3, I4 and I5 serving as I pictures, and subsample image data not shown hatched are subsample image data B1, B2, B3, B4 and B5 serving as B pictures (or subsample image data P1, P2, P3, P4 and P5 serving as P pictures).

Herein, "subsample" means that frame image data is divided by some suitable methods, which will be described later on with reference to FIGS. 13A through 13E. One divided subsample image data is referred to as "subsample a", and the other divided subsample image data is referred to as "subsample b".

In this case, subsample image data I1 and B1 of frame number F1 constitute one GOP; subsample image data B2 and I2 of frame number F2 constitute one GOP; subsample image data I3 and B3 of frame number F3 constitute one GOP; subsample image data B4 and T4 of frame number F4 constitute one GOP; and subsample image data 15 and B5 of frame number F5 constitute one GOP.

As is clear from FIGS. 13A through 13E, according to this embodiment, one GOP consists of I picture which results from intra-subsample-encoding and B or P picture which results from interframe-encoding, and the order of intra-subsample-encoding and interframe-encoding is changed at every frame. By way of example, a manner in which subsample image data I2, B2, I3 and B3 of frame numbers F2, F3 are encoded will be described below.

The subsample image data B2 of the subsample a of the frame number F2 is interframe-encoded by use off the subsample image data I1 of the subsample a of the frame number F1 and the subsample image data I3 of subsample a of the frame number F3, and the field image data I2 of the subsample b is intra-subsample-encoded.

On the other hand, the subsample image data I3 of the frame number F3 is intra-subsample-encoded, and the subsample image data B3 of the subsample b is interframe-encoded by use of the subsample image data I2 of the subsample b of the frame number F2 and the subsample image data I4 of the subsample b of the frame number F4. Other subsample image data are encoded similarly.

In the first frame to be encoded, the subsammple image data of subsample a is intra-subsample-encoded, and the subsample image data of subsample b is interframe-encoded. In the next frame to be encoded, the subsample image data of subsample a is interframe-encoded, and the subsample image data of subsample b is intra-subsample-encoded. If the subsample image data are encoded as described above, then when image data is reproduced in the reverse direction, there then occurs no problem. A similar explanation to that of FIG. 7 can be applied to this embodiment. In that case, "odd" and "even" shown in FIG. 7 are changed to as "a" and "b", respectively.

FIGS. 13A through 13E are conceptual diagrams used to explain the above-mentioned subsample patterns. In FIGS. 13A through 13E, pixel data Pa, Pb, . . . , Pp provided within a macroblock formed of 4 lines×4 pixels are illustrated on the left-hand side, and subsample image data of subsampled subsamples a and b are illustrated on the right-hand side, respectively.

Figures 13A, 13B, 13C, 13D, 13E:
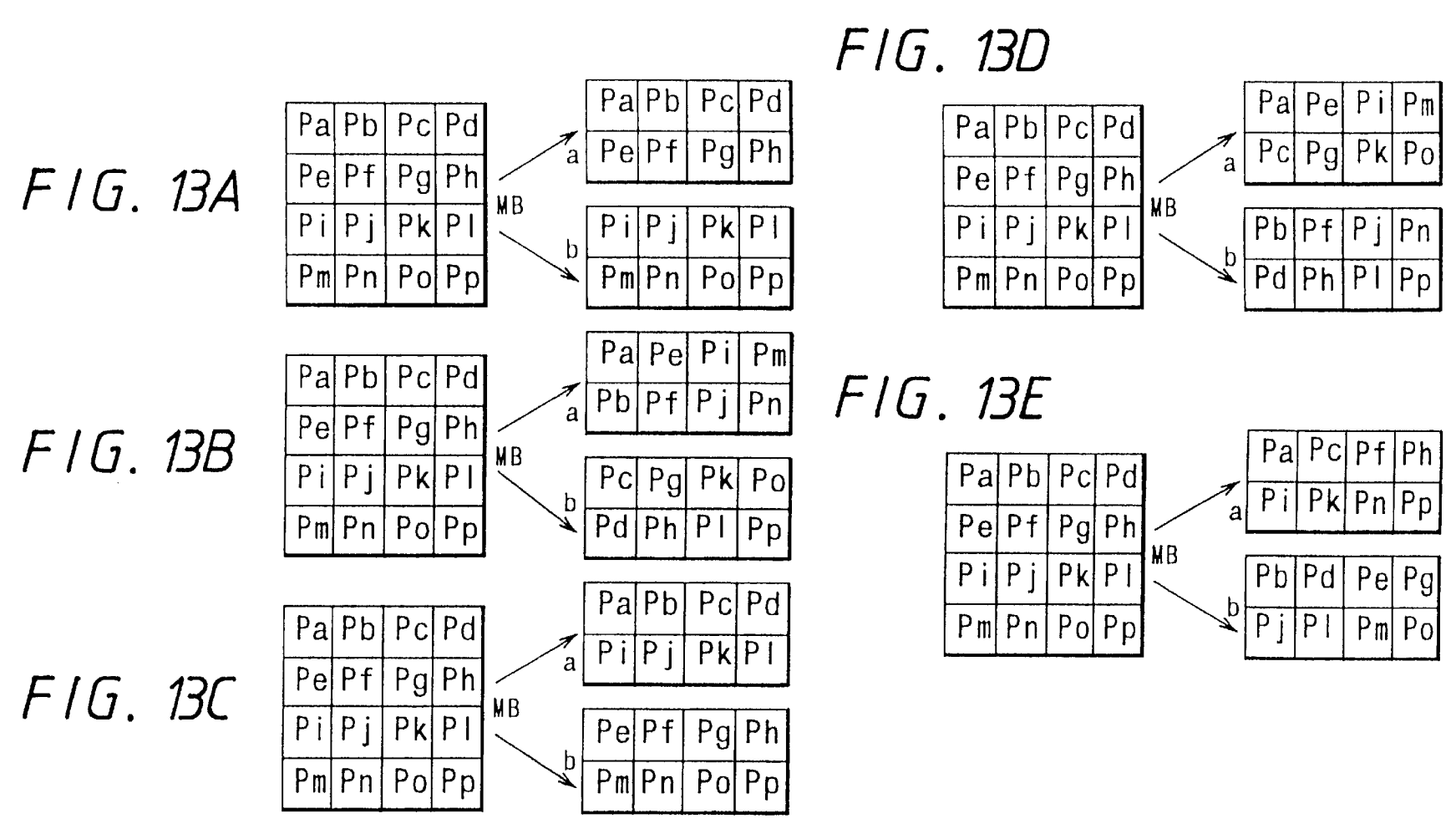

FIG. 13A shows a manner in which the pixel data Pa, Pb, . . . , Pp provided within the macroblock are divided along the vertical direction, i.e., the pixel data Pa, Pb, . . . , Pp provided within the macroblock are divided into subsample image data of subsamples a composed of upper pixel data Pa, Pb, Pc, Pd, Pe, Pf, Pg and Ph and subsample image data of subsamples b composed of lower pixel data Pi, Pj, Pk, Pl, Pm, Pn, Po, Pp.

FIG. 13B shows a manner in which the pixel data Pa, Pb, . . . , Pp provided within the macroblock data are divided along the right and left direction, i.e., the pixel data Pa, Pb, Pp provided within the macroblock are divided into subsample image data of subsamples a composed of left-hand side pixel data Pa, Pe, Pi, Pm, Pb, Pf, Pj and Pn and subsample image data of subsamples b composed of right-hand side pixel data Pc, Pg, Pk, Po, Pd, Ph, Pl, Pp.

FIG. 13C shows a manner in which the pixel data Pa, Pb, . . . , Pp provided within the macroblock are divided into odd fields and even fields, i.e., the pixel data Pa, Pb, . . . , Pp provided within the macroblock are divided into subsample image data of subsamples a composed of odd field image data Pa, Pb, Pc, Pd, Pi, Pj, Pk and Pl and subsample image data of subsamples b composed of even field image data Pe, Pf, Pg, Ph, Pm, Pn, Po, Pp.

FIG. 13D shows a manner in which the pixel data Pa, Pb, . . . , Pp provided within the macroblock are divided alternately in the longitudinal direction, i.e., the pixel data Pa, Pb, . . . , Pp provided within the macroblock are divided into subsample image data of subsamples a composed of pixel data Pa, pe, P, Pm, Pc, Pg, Pk and Po and subsample image data of subsamples b composed of pixel data Pb, Pf, Pj,Pn, Pd, Ph, Pl, Pp.

FIG. 13E shows a manner in which the pixel data Pa, Pb, . . . , Pp provided within the macroblock are divided in a checkered fashion, i.e., the pixel data Pa, Pb, . . . , Pp provided within the macroblock data are divided into subsample image data of subsamples a composed of pixel data Pa, Pc, Pf, Ph, Pi, Pk, Pn and Pp and subsample image data of subsamples b composed of pixel data Pb, Pd, Pe, Pg, Pj, Pl, Pm, Po.

As is clear from the above description, when the image data is encoded by the processing described above with reference to FIG. 12 and the encoded image data is recorded on the magnetic tape, even if such magnetic tape is reproduced in the reverse direction, the recorded image data can be reproduced satisfactorily. In addition, since one GOP consists of intra-subsample-encoded image data and interframe-encoded image data, upon high-speed playback mode, a number of image data which are provided by the intra-subsample-encoding, i.e., I pictures can be used so that the picture quality can be prevented from being deteriorated and that the moving object within the image can be moved smoothly. In short, since the intra-subsample-encoding and the interframe-encoding are used with a satisfactory equilibrium, without deteriorating the encoding efficiency, the picture quality of the reproduced image can be improved, and the motion of the moving object within the image can be made smooth.

An encoding apparatus and a decoding apparatus according to a third embodiment of the present invention will be described below more fully.

Figure 14:
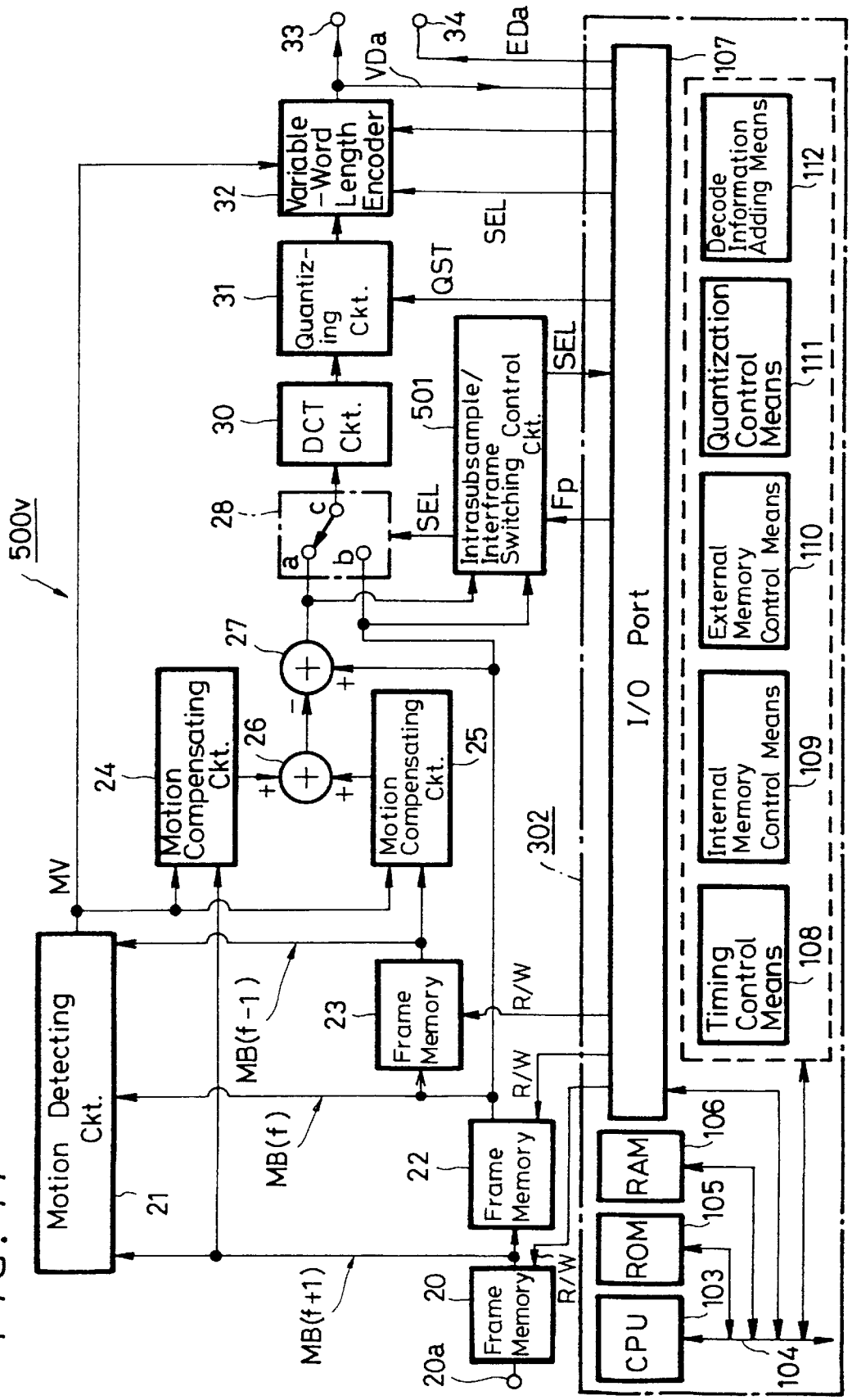
FIG. 14 is a block diagram showing a video encoder in the encoding apparatus and the decoding apparatus according to the third embodiment of the present invention.

FIG. 14 is a block diagram further showing an example of a video encoder. In FIG. 14, elements and parts identical to those of FIG. 8 are marked with the same references and therefore need not be described in detail. A video encoder 500 shown in FIG. 14 is used in the encoder 3 in the digital VCR shown in FIGS. 1A, 1B instead of the video encoder 3v shown in FIG. 2. Moreover, the video encoder 500v shown in FIG. 14 is arrange under the condition that one GOP consists of I pictures and B pictures.

The video encoder 500v shown in FIG. 14 and the video encoder 100v shown in FIG. 8 differ from each other in that the intrafield/interframe switching control circuit 101 used in the video encoder 100v shown in FIG. 8 is replaced with a function of an external memory control means 510 which are functions of an intra-subsample/interframe switching control circuit 501 and a controller 502 and the frame memory 20 additionally provided. The intra-subsample/interframe switching control circuit 501 and the external memory control means 510 will be described.

The intra-subsample/interframe switching control circuit 101 compares information volumes of the difference data supplied thereto from the adding circuit 27 and macroblock data MB (f) of subsample image data of subsamples a or subsamples b of present frame read out from the frame memory 22, and connects the movable contact c of the switch 28 to the inter-side fixed contact a or the intra-side fixed contact b on the basis of a compares result to thereby select a smaller information volume of the two information volumes.

The intra-subsample/interframe switching control circuit 501 obtains a first divided signal by frequency-dividing a frame pulse Fp supplied thereto from the controller 502 by half, and also generates a second divided signal with a phase different from that of the first divided signal by 180 degrees by inverting the first divided signal. When the first divided signal is changed at every field in the form of "0", "1", "0", "1", ..., the second divided signal is changed in the form of "1", "0", "1", "0", ...

The intra-subsample/interframe switching control circuit 501 selects the first divided signal when the frame pulse Fp is held at low "0" level, and selects the second divided signal when the frame pulse Fp is held at high "1" level. Then, the intra-subsample/interframe switching control circuit 501 supplies these selected divided signals to the switch 29 as the inter/intra selection signal SEL.

The switch 28 connects the movable contact c to the intra-side fixed contact b when the inter/intra selection signal SEL from the intra-subsample/interframe switching control circuit 501 is held at low "0" level, and connects the movable contact c to the inter-side fixed contact a when the inter/intra selection signal SEL is held at high "1" level.

During the first frame period since the processing has been just started, since the frame pulse Fp goes to low "0" level, the intra-subsample/interframe switching control circuit 501 selects the first divided signal, and supplies the selected first divided signal to the switch 28 as the inter/intra selection signal SEL. During the period of the subsample a within the first frame period since the starting has been started, since the inter/intra selection signal SEL goes to low "0" level, the movable contact c of the switch 28 is connected to the intra-side fixed contact b. During the subsample period b, since the inter/intra selection signal SEL goes to high "1" level, the movable contact 28c of the switch 28 is connected to the inter-side fixed contact a.

During the next frame period of the frame since the processing has just been started, since the frame pulse Fp goes to high "1" level, the intra-subsample/interframe switching control circuit 501 selects the second divided signal, and supplies the selected second divided signal to the switch 28 as the inter/intra selection signal SEL. Therefore, during the period of the subsample a within the first frame period since the processing has just been started, the inter/intra selection signal SEL goes to high "1" level, the movable contact c of the switch 28 is connected to the inter-side fixed contact a. During the period of the subsample b, the inter/intra selection signal SEL goes to low "0" level so that the movable contact c of the switch 28 is connected to the intra-side fixed contact b.

The inter/intra switched states are as follows:

Frame pulse Fp . . . 0 1 0 1 . . . (unit: frame)
First divided signal . . . 01010101 . . . (unit: ½ frame)
Second divided signal . . . 10101010 . . . (unit: ½ frame)
Selection signal SEL . . . 01100110 . . . (unit: ½ frame)
Connections of switches . . . baabbaab . . . (unit: ½ frame)
Pictures generated . . . IBBIIBBI . . . (unit: ½ frame)

The low "0" level which is the value of the selection control signal SEL corresponds to "intra", and the high "1" level corresponds to "inter", respectively.

In the following description, it is assumed that inter and intra are switched at every subsample by this inter/intra selection signal SEL.

The external memory control means 510 supplies the read/write control signals R/W through the I/O port 107 to the frame memories 20, 22 and 23 to read and write data from and in these frame memories 20, 22 and 23 based on the divided signal which results from frequency-dividing the frame pulse Fp generated from the timing control means 108 by half. Macroblock data are read out therefrom in response to the address signals in the read/write control signal R/W.

In that case, if the frame image data stored in the frame memories 20, 22 and 23 are interlaced image data, when inputted frame image data are stored in the frame memories 20, 22 and 23 in the input order, the external memory control means 110 manipulates horizontal-direction address values of address signals in the read/write control signals R/W supplied to the frame memories 20, 22 and 23 as follows. However, it is assumed that unit memory areas on storage spaces of the frame memories 20, 22 and 23 are accessed by addresses (H, V) where H represents a horizontal-direction address and V represents a vertical-direction address.

In the case of the subsampling processing shown in FIG. 13A:

Memory areas from the minimum address (Hmin, Vmin) (min represents minimum address values of horizontal and vertical directions) to address (Hmax, Vmax/2) (max represents maximum address values in the horizontal and vertical directions) corresponding to the capacity of ½ of whole storage capacity on the storage spaces of the frame memories 20, 22 and 23 are assigned to subsamples a, and remaining storage areas are assigned to subsamples b.

The external memory control means 510 increments horizontal-direction addresses of extracted macroblocks supplied to the storage areas of the frame memories 20, 22, 23 from the header address of the extracted macroblock to the horizontal-direction maximum value of the macroblock, and then increments the value of the vertical direction by "1". Thus, in the case of the interlaced image data, it is possible to read only the macroblock data of subsample image data of subsamples a or b.

In the case of subsample processing shown in FIG. 13B:

Memory areas from the minimum address (Hmin, Vmin) (min represents minimum address values of horizontal and vertical directions) to address (Hmax/2, Vmax) (max represents maximum address values of the horizontal and vertical directions) of the left half of the whole storage area corresponding to the capacity of ½ of the whole storage capacity on the storage spaces of the frame memories 20, 22 and 23 are assigned to the subsamples a, and remaining storage areas are assigned to the subsamples b.

The external memory control means 510 increments horizontal-direction addresses of extracted macroblock supplied to the respective storage areas of the frame memories 20, 22, 23 from the header address of the extracted macroblock to the maximum value of the horizontal direction of the macroblock, and then increments the value of the vertical direction by "1". Thus, in the case of the interlaced image data, it is possible to read only the macroblock data of subsample image data of subsamples a or b.

In the case of the subsampling processing shown in FIG. 13C:

Memory areas from the address (Hmin, Vodd) (odd represents odd number) to address (Hmax, Vodd) on the respective storage spaces of the frame memories 20, 22 and 23, i.e., all memory areas corresponding to the odd lines are assigned to the memory areas of subsample a. Within the whole memory area, the memory areas from the address (Hmin, Veven) (even represents even number) to the address (Hmax, Veven), i.e., all memory areas corresponding to even-numbered lines are assigned to memory areas of subsample b.

The external memory control means 510 increments the address of the horizontal direction of extracted macroblock supplied to the storage areas of the frame memories 20, 22, 23 from the header address of the extracted macroblock to the maximum value of the horizontal direction of the macroblock, and then increments the value of the vertical direction by "2". Thus, in the case of the interlaced image data, it is possible to read only the macroblock data of subsample image data of subsamples a or b.

In the case of subsample processing shown in FIG. 13D:

Memory areas from the address (Hodd, Vmin) to the address (Hodd, Vmax), i.e., all storage areas which become odd lines as seen from the horizontal direction are assigned to memory areas of subsample a. Within the whole storage area, the storage area from the address (Heven, Vmin) to the address (Heven, Vmax), i.e., all storage areas corresponding to even lines as seen from the horizontal direction are assigned to storage areas of subsamples b.

The external memory control means 510 increments the address of the horizontal direction of extracted macroblock supplied to the respective storage areas of the frame memories 20, 22, 23 from the header address of the extracted macroblock to the maximum value in the vertical direction of the macroblock, and then increments the value of the horizontal direction by "2". Thus, in the case of the interlaced image data, it is possible to read only the macroblock data of subsample image data of subsamples a or subsamples b.

In the case of subsample processing shown in FIG. 13E:

The storage areas of subsamples a of the frame memories 20, 22 and 23 fall in the range of the storage area from the address (Hmin, Vodd) to the address (Hmax, Vood), i.e., storage area of odd lines and also which ranges from address (Hodd, Vmin) to the address (Hodd, Vmax), and the storage area from the address (Hmin, Veven) to the address (Hmax, veven), i.e., storage area of even lines and also which ranges from the address (Heven, Vmin) to the address (Heven, Vmax).

The storage areas of subsamples b of the frame memories 20, 22 and 23 become storage areas ranging from the address (Hmin, Vodd) to the address (Hmax, Vodd), i.e., storage area of odd lines and which ranges from the address (Heven, Vmin) to the address (Heven, Vmax), and the storage area ranging from the address (Hmin, Veven) to the address (Hmax, Veven), i.e., the storage area of even lines and which also ranges from the address (Hodd, Vmin) to the address (Hodd, Vmax).

Then, the external memory control means 510 increments address of the horizontal direction of the macroblock of extracted subsamples a, supplied to the respective storage areas of the frame memories 20, 22 and 23, by "2" for odd lines so as to make the address value become odd number from the header address of the extracted macroblock to the maximum value in the horizontal direction of the macroblock. Then, the external memory control means 510 increments the value of the vertical direction by "1", and increments the same by "2" for even line in such a way as to make the address value become even number from the header address of the extracted macroblock to the maximum value in the horizontal direction of the macroblock. Thereafter, the external memory control means 510 increments the value of the vertical direction by "1".

On the other hand, the external memory control means 510 increments the address in the horizontal direction of the macroblock of extracted subsamples b, supplied to the respective storage areas of the frame memories 20, 22 and 23, for odd line by "2" in such a way as to make the address value become even number from the header address of the extracted macroblock to the maximum value in the horizontal direction of the macroblock, and then increments the value of the vertical direction by "1". For even lines, the external memory control means 510 increments the address by "2" in such a way as to make the address value become odd number from the header address of the extracted macroblock to the maximum value in the horizontal direction of the macroblock, and then increments the value of the vertical direction by "1".

Thus, even in the case of the interlaced image data, it is possible to read only the macroblock data of the subsample image data of the subsamples a or subsamples b.

When the frame image data stored in the frame memories 20, 22 and 23 are non-interlaced image data, if inputted image data are stored in the memory area at its area shown by the minimum address to the maximum address as they are, then field image data of odd fields are stored in the upper half areas of the memory areas of the frame memories 20, 22 and 23, and field image data of even fields are stored in the remaining lower half areas of the memory areas. As a result, address manipulation for subsample processings shown in FIGS. 13A through 13E becomes complicated. Therefore, upon writing, writing addresses are manipulated such that frame image data may be stored in the storage spaces of the frame memories 20, 22 and 23 as one frame image data.

Specifically, when the field image data of odd fields are written in the frame memories 22 and 23, write addresses are address (Hmin, Vodd) to address (Hmax, Vodd). When the field image data of even fields are written in the frame memories 20, 22 and 23, write addresses are address (Hmin, Veven) to address (Hmax, Veven). If the addresses are manipulated as described above, then the external memory control means 510 stores the field image data of odd field and even field in the frame memories 20, 22 and 23, forms frame images on the storage spaces of the frame memories 20, 22 and 23, and then executes the address manipulation for the above subsampling.

Operation will be described next. When I pictures comprising one GOP are generated, the movable contact c of the switch 28 is connected to the intra-side fixed contact b under control of the intrasubsample/interframe switching control circuit 501. Then, in this case, subsample image data read out from the frame memory 22 is encoded by the circuits following the DCT circuit 31. At, that time, decode information EDa generated by the decode information adding circuit 112 in the controller 102 is supplied through the output terminal 34 to the ECC encoder 5 shown in FIG. 1A.

Subsequently, when B pictures comprising one GOP are generated, the movable contact c of the switch 28 is connected to the inter-side fixed contact a under control of the intrasubsample/interframe switching control circuit 501.

The motion detecting circuit 21 executes a motion detection processing by use of macroblock data MB (f) within subsample image data of subsample a or subsample b of present frame and macroblock data MB (f+1) within subsample image data of subsample a or subsample b of succeeding frame. As a result, macroblock data MB(f+1) within the subsample image data of subsample a or subsample b of succeeding frame whose contents are best agreed with those of the macroblock data MB (f) within the subsample image data of subsample a or subsample b of present frame is selected, and there can be obtained motion vector data MV indicating a position of macroblock data MB (f+1) of subsample image data of subsample a or subsample b of succeeding frame using the position of the macroblock data MB (f) provided within the subsample image data of subsample a or subsample b of present frame as a starting point.

Similarly, the motion detecting circuit 21 executes a motion detection processing by use of macroblock data MB (f) provided within subsample image data of subsample a or subsample b of present frame and macroblock data MB (f−1)

provided within subsample image data of subsample a or subsample b of preceding frame. As a result, there is selected macroblock data MB (f−1) provided within subsample image data of subsample a or subsample b of preceding frame whose contents are best agreed with those of the macroblock MB (f) provided within the subsample image data of subsample a or subsample b of present frame. Then, there can be obtained motion vector data indicating the position of macroblock data MB (f−1) provided within the subsample image data of subsample a or subsample b of preceding frame using the position of the macroblock data MB (f) provided within the subsample image data of subsample a or subsample b of present frame as a starting point.

The above two motion vector data MV are supplied to the variable-word length encoding circuit 32 and the motion compensating circuits 24, 25, respectively. The motion compensating circuit 24 extracts the macroblock data MB (f+s) shown by the motion vector data MV from the subsample image data of subsample a or subsample b of succeeding frame. The thus extracted macroblock data MB (f+1) provided within the subsample image data of subsample a or subsample b of succeeding frame is supplied to the adding circuit 26.

On the other hand, the motion compensating circuit 25 extracts the macroblock data MB (f−1) shown by the motion vector data MV from the subsample image data of subsample a or subsample b of preceding frame. The thus extracted macroblock data MB (f−1) provided within the subsample image data of subsample a or subsample b of preceding frame is supplied to the adding circuit 26.

The adding circuit 26 adds the macroblock data MB (f+1) provided within the subsample image data of subsample a or subsample b of succeeding frame supplied thereto from the motion compensating circuit 24 and the macroblock data MB (f−1) provided within the subsample image data of subsample a or subsample b of preceding frame supplied thereto from the motion compensating circuit 25, and averages the added result by multiplying the added result with the coefficient "½". The resultant mean value data is supplied to the adding circuit 27. The macroblock data MB (f) provided within the subsample image data of subsample a or subsample b of present frame read out from the frame memory 22 is supplied to the adding circuit 27. Thus, the adding circuit 27 subtracts the mean value data from the adding circuit 26 from the macroblock data MB (f) provided within the subsample image data of subsample a or subsample b of present frame. An output from the adding circuit 27 is interframe-encoded by the DCT circuit 30, the quantizing circuit 31 and the variable-word length encoding circuit 32, and outputted as B pictures.

After the above processing, i.e., interframe-encoding processing on all macroblock data MB (f) provided within the subsample image data of subsample a or subsample b of present frame stored in the frame memory 22 is ended, frame image data stored in this frame memory 22 is read out, supplied to the frame memory 23, and stored in the frame memory 23 as image data of preceding frame. On the other hand, frame image data read out from the frame memory 20 is stored in the frame memory 22 as frame image data of present frame, and the next frame image data is stored in the frame memory 20 as frame image data of succeeding frame. At that time, the decode information EDa from the decode information adding means 112 in the controller 102 is supplied through the output terminal 34 to the ECC encoder 5 shown in FIG. 1A.

On the other hand, the quantizing control means 111 detects the data amount of the variable-word-length encoded data Vda supplied thereto from the variable-word length encoding circuit 32, and supplies quantization step data QST to the quantizing circuit 31 based on a detected result. Thus, the quantizing circuit 31 quantizes coefficient data from the DCT circuit 30 at the quantization step number based on the quantization step data QSTN supplied thereto from the quantization control means 111.

When image data are processed as described above, the encoded amount of encoded subsample image data serving as B pictures provided within each frame and the encoded amount of encoded subsample image data serving as I pictures are constantly kept constant, and a ratio between these encoded amounts can be made constant. Accordingly, image data can be recorded by image data of at least one frame so as to form n recording tracks.

Figure 15:
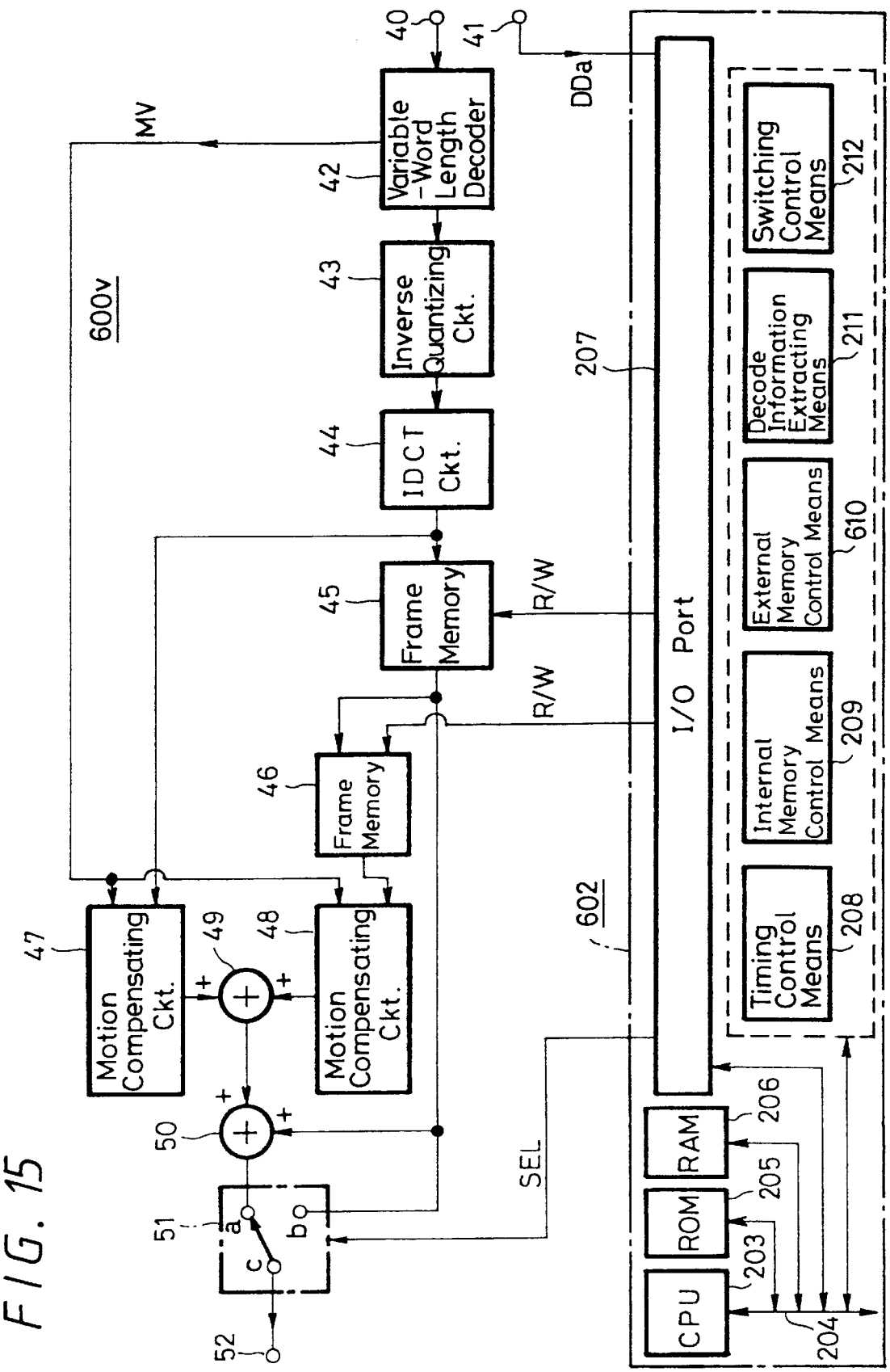
FIG. 15 is a block diagram showing a video decoder in the encoding apparatus and the decoding apparatus according to the third embodiment of the present invention.

FIG. 15 is a block diagram showing an example of a video decoder. In FIG. 15, like elements and parts corresponding to those of FIG. 9 are marked with the same references and therefore need not be described in detail. A video decoder 600v shown in FIG. 15 is used in the decoder 16 of the digital VCR shown in FIGS. 1A, 1B instead of the video decoder 16v shown in FIG. 4. The video decoder 600v shown in FIG. 15 is arranged on the assumption that one GOP consists of I pictures and B pictures.

The video decoder 600v shown in FIG. 15 differs from the video decoder 200v shown in FIG. 9 in an external memory control means 602 in a controller 602. The external memory control means 610 will be described below.

The external memory control means 610 manipulates addresses of frame memories 45, 46 in such a manner as to extract subsample image data of subsample a and subsample b. This address manipulation is similar to that executed by the external memory control means 510 of the video encoder 200v shown in FIG. 14.

An operation of this external memory control means 610 will be described below. In order to understand the present invention more clearly, let it be assumed that, upon decoding, frame image data serving as decoded I picture of immediately-preceding GOP is stored in the frame memory 46 and that the IDCT circuit 44 outputs subsample image data of subsample a or subsample b of frame serving as decoded I picture of GOP to be decoded. Further, let it be assumed that the frame image data serving as decoded I picture of immediately-preceding GOP is frame image data of preceding frame, image data serving as B picture of GOP to be decoded is difference image data of subsample a or subsample b of present frame and that frame image data serving as decoded I picture of GOP to be decoded is frame image data of succeeding frame.

Video data from the de-shuffling circuit 15 shown in FIG. 1B is supplied through an input terminal 40 shown in FIG. 15 to a variable-word length decoding circuit 42. On the other hand, decode information DDa from the ECC decoder shown in FIG. 1B is supplied through an input terminal shown in FIG. 15 to the controller 602. The video data is decoded by the variable-word length decoding circuit 42 as quantized coefficient data. The thus decoded video data is supplied to the inverse quantizing circuit 43, and then reconverted to DCT coefficient data by this inverse quantizing circuit 43. The video data that has been reconverted to the DCT coefficient data is supplied to the IDCT circuit 44, and thereby re-transformed to the original image data. "Original image data" means "difference data" if the image data is B picture generated by interframe-encoding, and "macroblock data" if the image data is I picture generated by the intrasubsample-encoding.

The decode information extracting means 211 in the controller 602 obtains the decode information DDa and supplies GOP header data and the inter/intra selection signal SEL to the timing control means 208 and the switching control means 212. The switching control means 212 supplies the inter/intra selection signal SEL to the switch 51 as a switching control signal, whereby the movable contact c of the switch 51 is connected to the inter-side fixed contact a.

The motion compensating circuit 47 extracts macroblock data MB (f+1) shown by the motion vector data MV supplied from the variable-word length decoding circuit 42 from the subsample image data of subsample a or subsample b of succeeding frame serving as decoded I picture from the IDCT circuit 44 after the difference image data serving as B picture has been stored in the frame memory 45. The macroblock data MB (f+1) extracted from the subsample image data of subsample a or subsample b of succeeding frame by the motion compensating circuit 47 is supplied to the adding circuit 49.

On the other hand, the motion compensating circuit 48 starts the processing in unison with the processing start timing of the motion compensating circuit 47 after the frame image data serving as decoded I picture of immediately-preceding GOP has been stored in the frame memory 46. Specifically, the motion compensating circuit 48 extracts macroblock data MB (f−1) shown by the motion vector data MV supplied from the variable-word length decoding circuit 42 from the subsample image data of subsample a or subsample b of frame image data serving as decoded I picture of immediately-preceding GOP stored in the frame memory 46. The macroblock data MB (f−1) extracted from the subsample image data of subsample a or subsample b of preceding frame by the motion compensating circuit 48 is supplied to the adding circuit 49.

Although signal line connected to the output terminal of the variable-word length decoding circuit 42 is shown by a single line and one symbol "MV" is used to indicate motion vector data, motion vector data for all macroblocks of subsample image data of subsample a or subsample b of one frame image data are obtained in each motion detection in the encoding as earlier noted with reference to FIGS. 1A, 1B. Accordingly, the motion vector data MV supplied to the motion compensating circuit 47 and the motion vector MV supplied to the motion compensating circuit 48 are different ones obtained in respective encoding processings.

The macroblock data MB (f+1) from the motion compensating circuit 47 and the macroblock data MB (f−1) from the motion compensating circuit 48 are added by the adding circuit 49. The added result is multiplied with the coefficient "½" by the ½-multiplier incorporated within the adding circuit 49 and thereby averaged. The mean value data from the adding circuit 49 is supplied to the adding circuit 50.

The adding circuit 50 adds the difference data read out from the frame memory 45 and the mean value data from the adding circuit 49. The added output from the adding circuit 50 is supplied through the output terminal 52 to the error concealing circuit 17 shown in FIG. 1B as reproduced video data of decoded subsample a or subsample b of present frame.

The read/write control signals R/W from the controller 53 are supplied to the frame memories 45, 46, whereby macroblock data in the subsample image data of subsample a or subsample b of succeeding frame serving as I pictures outputted from the IDCT circuit 44 are supplied to the motion compensating circuit 47 and the frame memory 46 and thereby stored.

After all sample image data of subsample a or subsample b of present frame serving as B pictures have been restored by repeatedly executing the above-mentioned processings, the switching control means 212 in the controller 602 supplies the inter/intra selection signal SSE to the switch 51, whereby the movable contact c of the switch 51 is connected to the intra-side fixed contact b. Since the contents of the frame memory 45 are sequentially rewritten as macroblock data MB (f+1) of subsample image data of subsample a or subsample b of succeeding frame serving as I pictures each time the processing is executed, at this time point, the frame image data of succeeding frame serving as I pictures are stored in the frame memory 45.

The read/write control signal R/W is supplied to the frame memory 45 from the controller 53, whereby subsample image data of subsample a or subsample b of succeeding frame serving as I pictures stored in the frame memory 45 are supplied through the switch 51 and the output terminal 52 to the error concealing circuit 17 shown in FIG. 1B.

As described above, according to this embodiment, upon encoding, subsample image data of one subsample within one frame is intrasubsample-encoded by the intrasubsample/interframe switching control circuit 501 of the video encoder 500*v*, and the subsample image data of the other subsample is interframe-encoded. The subsample image data that should be intrasubsample-encoded and interframe-encoded are switched at every frame. When the encoded subsample image data is recorded, the decode information adding means 112 adds the inter/intra selection signal SEL to the decoded subsample image data. Upon decoding, the decode information extracting means 211 in the video decoder 600*v* extracts the decode information DDa, and the switching mean 212 supplies the inter/intra selection signal SEL in the decode information DDa to the switch 51, whereby the switch 51 is changed in position in the same manner as that in the encoding.

Accordingly, one frame image data is divided by executing subsampling according to the methods shown in FIGS. 13A through 13E, and the processing is executed by use of the subsample image data thus obtained. Therefore, the following effects can be achieved in addition to the effects achieved in the first embodiment.

In case the subsample processing shown in FIG. 13A is employed:

Image data of odd field and even field are divided in the vertical direction within one frame, and image data this divided in the vertical direction can be processed separately. In addition, when the macroblock of present frame and the macroblock of preceding or succeeding frame are compared with each other for detection a motion, pixel data of odd fields and pixel data of even fields can be compared with each other. Therefore, a correlation between one macroblock to be encoded and other compared macroblock in the odd field and a correlation between one macroblock to be encoded and other compared macroblock in the even field can be detected, thereby improving a motion detection accuracy.

In case the subsample processing shown in FIG. 13B is employed:

Image data of odd field and even field can be divided in the horizontal direction within one frame, and image data thus divided in the horizontal direction can be processed individually. In addition, when the macroblock of present frame and the macroblock of preceding or succeeding frame are compared with each other for detecting a motion, pixel data of odd fields and pixel data of even fields can be compared with each other. Therefore, a correlation between one macroblock to be encoded and other compared macroblock in the odd field and a correlation between one macroblock to be encoded and other compared macroblock in the even field can be detected, thereby improving a motion detection accuracy.

In case the subsample processing shown in FIG. 13C is employed:

Image data of odd field and even field can be divided into odd fields and even fields within one frame. In addition, when the macroblock of present frame and the macroblock of preceding or succeeding frame are compared with each other for detecting a motion, pixel data of odd field and pixel data of even field can be compared with each other. Therefore, a correlation between one macroblock of odd field or even field to be encoded and other compared macroblock of e ven field or odd field can be detected, thereby improving a motion detection accuracy.

In case the subsample processing shown in FIG. 13D is employed:

Image data of odd field and even field are divided in a stripe fashion, and divided one image data and the divided other image data can be processed individually. In addition, when the macroblock of present frame and the macroblock of preceding or succeeding frame are compared with each other for detecting a motion, pixel data of odd fields and pixel data of even fields can be compared with each other. Therefore, a correlation between one macroblock to be encoded and other compared macroblock in the same fields can be detected, and hence a motion detection accuracy can be improved.

In case the subsample processing shown in FIG. 13E is employed:

Image data of odd field and even field are divided in a checker pattern, and one divided image data and the other divided image data can be processed individually. In addition, when the macroblock of present frame and the macroblock of preceding or succeeding frame are compared with each other for detecting a motion, pixel data of odd fields and pixel data of even fields can be compared with each other. Therefore, a correlation between one macroblock to be encoded and other compared macroblock in the odd field and the even field can be detected, thereby improving a motion detection accuracy.

A difference between effects achieved in the first and second embodiments and the third embodiment will be described below.

In the first and second embodiments, the intrafield-encoding and the interframe-encoding are executed as already described. In the third embodiment, the intrasubsample-encoding and the interframe-encoding are executed as already described.

A difference between the effects achieved in the first and second embodiments and the third embodiments will be described below on the assumption that the methods of these embodiments are applied to the digital VCR shown in FIGS. 1A and 1B.

In the case of the first and second embodiments:

When image data is recorded on a magnetic tape or reproduced from the magnetic tape at the field unit by use of at least two heads, if one of the two heads is out of order, then one frame is reconstructed by odd or even field.

In the case of the third embodiment:

When image data is recorded on a magnetic tape or reproduced from the magnetic tape at the subsample unit by use of at least two heads, if one of the two heads is out of order, then one frame is reconstructed by one of two subsamples.

When one frame is reconstructed by one field, a time gap exists between original two fields because a frame image cannot be obtained immediately after a picture of object is taken by a video camera or the like, and images are obtained at every field in the sequential order of odd field and even field, for example. Therefore, when one frame is reconstructed by interpolating a field having a time gap from one field, a picture quality is deteriorated much more by an amount corresponding to the above time gap.

On the other hand, when one frame is reconstructed by use of one subsample, pixels composing odd and even fields which are spaced apart each other from a time gap standpoint are contained in the above subsample at a uniform ratio. Therefore, when one frame is reconstructed by interpolating the other subsample by one subsample, as compared with the case that the one frame is reconstructed by use of the above field, it is natural that a satisfactory picture quality can be obtained.

However, extra processing step is required in order to obtain the subsample. Accordingly, from an encoding efficiency standpoint, the encoding processings according to the first and second embodiments are advantageous, and hence the above-mentioned methods should preferably be switched adaptively in accordance with purposes. "Switched adaptively" means that the arrangements shown in the first, second and third embodiments are incorporated within one system, and these arrangements are electrically switched in accordance with the user's purpose or that the arrangements shown in the first, second and third embodiments are selected in accordance with requirements of devices in which the inventive apparatus is mounted.

A modified example of the third embodiment will be described.

While one GOP is composed of I picturers and B pictures in the third embodiment, the present invention is not limited thereto, and one GOP can of course be composed of I pictures and P pictures. In that case, similarly to the difference of the second embodiment relative to the first embodiment, the frame memory 20, the motion compensating circuit 24 and the adding circuit 26 can be removed from the video encoder 500v, and the frame memory 45, the motion compensating circuit 47 and the adding circuit 49 can be removed from the video decoder 600v. According to operation of this modified example of the third embodiment, in the explanation of operation in the second embodiment, "field" is changed to "subsample a", "subsample b" or "subsample". Effects achieved by this modified example of the third embodiment become mixture of the effects of the second embodiment and the effects of the third embodiment, in addition to the effects achieved by the first embodiment.

According to the present invention, the selection control means selects the block data of present frame extracted from the first divided area of the memory area of the first memory means during the first half period of at least one frame period, and selects the difference data which results from subtracting the mean value output of the first adding means from the block data of present frame extracted from the second divided area of the memory area of the first memory means by the second adding means during the second half period of the one frame period. The selection control means selects the block data of present frame extracted from the second divided area of the memory area of the first memory means during a first half period of the next frame period of the above frame period, and selects the difference data which results from subtracting the mean value output from the first adding means from the block data of present frame extracted from the first divided area of the memory area of the first memory means by the second adding means during the second half period of the next frame period of the above frame period. Therefore, when encoded information thus encoded is decoded, if a time of decoding processing is limited, then the block data of present frame extracted from the first and second divided areas of the memory area of the first memory means and encoded are decoded as they are. If the arrangement of encoded information to be decoded is reversed to that of the encoding, the block data of present frame extracted from the first and second divided areas of the memory area of the first memory means and encoded are decoded as they are. Also, the difference data can be decoded by use of the block data of present frame extracted from the first or second divided area of adjacent frames of the corresponding frame. Consequently, a picture quality of decoded image obtained when data arrangement of encoded information to be decoded is reversed to that in the encoding can be made satisfactory without deteriorating an encoding efficiency even though the time required by the decoding processing is insufficient. Further, a motion of a moving object within the image can be made smooth.

The quantization control means in the control means detects an encoded amount of encoded image data from the encoding means, and controls the quantization step size in the quantization processing in the encoding means based on a detected result. Thus, upon encoding, a data amount of encoded image data of one frame can be made constant, whereby a processing time of every frame in the decoding can be made constant.

Since image data are encoded separately by use of pixel data of odd field and pixel data of even field, there can be obtained at least two encoded informations within one frame, whereby one frame can be used as the encoding and decoding unit.

Since the preceding or succeeding frame is used in the encoding processing, the encoding processing using any one of frames can be executed. Therefore, as compared with the case that the two frames are used, it is sufficient to use only one motion compensating means, one memory means and one adding circuit. Thus, a processing time can be reduced.

As described above, according to the present invention, the decoding means obtains the block data of preceding or succeeding frame or the decoded data of present frame by decoding the compressed and encoded encoding information, and the decoded data of the first and second divided areas of present frame from the decoding means are stored in the first memory means. The block data of the first and second divided areas of preceding frame from the decoding means are stored in the second memory means, and the block data provided within the first or second divided area of preceding frame shown by motion vector data added to the block data of the first or second area of preceding frame from the second memory means upon encoding is extracted from the second memory means by the first motion compensating means. The block data provided within the first or second divided area of succeeding frame shown by motion vector data added to the block data of the first or second divided area of succeeding frame from the encoding means upon encoding is extracted from the first or second divided area of succeeding frame from the decoding means by the second motion compensating means. The block data provided within the first or second divided area of preceding frame extracted by the first motion compensating means and the block data provided within the first or second divided area of succeeding frame extracted by the second motion compensating means are added by the first adding means and then averaged. The decoded data of the first or second divided area of present frame read out from the first memory means and the added output from the first adding means are added by the second adding means, and the selection information extracting means extracts the selection information from the decode information added to the encode information upon encoding. The control means selectively outputs the added output from the second adding means or the decoded data of the first or second divided area of present frame from the first memory means as decode information based on the selection information extracted by the selection information extracting means. If the decoding processing time is limited, then the block data of present frame extracted from the first and second divided areas of the memory area of the first memory means and encoded are decoded as they are. If the arrangement of encode information to be encoded is reverse to that in the encoding, then the block data of present frame extracted from the first and second divided areas of the memory area of the first memory means and encoded are decoded as they are. Furthermore, the difference data can be decoded by use of the block data of present frame extracted from the first or second divided areas of adjacent frames of the corresponding frame. Therefore, a picture quality of decoded image obtained when data arrangement of encoded information to be decoded is reversed to that in the encoding can be made satisfactory without deteriorating an encoding efficiency even though the time required by the decoding processing is insufficient. Further, a motion of a moving object within the image can be made smooth.

As described above, according to the present invention, the selection control means the block data of present frame extracted from the first divided area of the memory area of the second memory means during a first half period of at least one frame period, and selects the difference data which results from subtracting the mean value output from the first adding means from the block data of present frame extracted rom the second divided area of the memory area of the second memory means by the second adding means during a second half period of the one frame period. The selection control means selects the block data of present frame extracted from the second divided area of the memory area of the second memory mans during a first half period of the next frame period of the above frame period, and selects the difference data which results from subtracting the mean value output from the first adding means from the block data of the present frame extracted from the first divided area of the memory area of the second memory means by the second adding means during a second half period of the next frame period of the above period. Therefore, when the encode information thus encoded is decoded, if the decoding processing time is limited, then the block data of present frame extracted from the first and second divided areas of the memory area of the first memory means and encoded are decoded as they are. If the arrangement of encode information to be decoded is reverse to that in the encoding, then the block data of present frame extracted from the first and second divided areas of the memory area of the first memory means and encoded are decoded as they are. Furthermore, the difference data can be decoded by use of the block data of present frame extracted from the first or second divided areas of adjacent frames of the corresponding frame. Therefore, a picture quality of decoded image obtained when data arrangement of encoded information to be decoded is reversed to that in the encoding can be made satisfactory without deteriorating an encoding efficiency even though the time required by the decoding processing is insufficient. Further, a motion of a moving object within the image can be made smooth.

The quantization control means in the control means detects an encoded amount of encoded image data from the encoding means, and controls the quantization step size in the quantization processing in the encoding means based on a detected result. Thus, upon encoding, a data amount of encoded image data of one frame can be made constant, whereby a processing time of every frame in the decoding can be made constant.

Since image data are encoded separately by use of pixel data of odd field and pixel data of even field, there can be obtained at least two encoded informations within one frame, whereby one frame can be used as the encoding and decoding unit.

Since image data are encoded separately by use of pixel data of upper half portion of a frame image and pixel data of lower half portion of the frame image, there can be obtained at least two encoded informations within one frame, whereby one frame can be used as the encoding and decoding unit and a motion between the odd and even fields can be detected.

Since image data are encoded separately by use of pixel data of left half portion of a frame image and pixel data of right half portion of the frame image, there can be obtained at least two encoded informations within one frame, whereby one frame can be used as the encoding and decoding unit and a motion between the odd and even fields can be detected.

Since image data are encoded separately by use of pixel data of odd-numbered columns in the horizontal direction of a frame image and pixel data of even-numbered columns in the horizontal direction of the frame image, there can be obtained at least two encoded informations within one frame, whereby one frame can be used as the encoding and decoding unit and a motion between the odd and even fields can be detected with an accuracy.

Since image data are encoded separately by use of odd-numbered pixel data of odd-numbered columns in the vertical direction of a frame image and even-numbered pixel data of even-numbered columns in the vertical direction of the frame image and even-numbered pixel data of odd-numbered columns in the horizontal direction of the frame image and odd-numbered pixel data of even-numbered columns in the vertical direction of the frame image, there can be obtained at least two encoded informations within one frame, whereby one frame can be used as the encoding and decoding unit and a motion between the odd and even fields can be detected with a higher accuracy.

Since only the preceding or succeeding frame is used in the encoding processing, upon encoding, only the preceding or succeeding frame is used in the encoding processing. Thus, upon decoding, only the preceding or succeeding frame used in the encoding is used. Therefore, as compared with the case that the two frames are used, it is sufficient to use only one motion compensating means, one memory means and one adding circuit. Thus, a processing time can be reduced.

As described above, according to the present invention, the decoding means obtains the block data of preceding or succeeding frame or the decoded data of present frame by decoding the compressed and encoded encoding information, and the decoded data of the first and second divided areas of present frame from the decoding means are stored in the first memory means. The decoded data of the first and second divided areas of preceding frame from the decoding means are stored in the second memory means, and the block data provided within the first or second divided area of preceding frame shown by motion vector data added to the block data of the first or second area of preceding frame from the second memory means upon encoding is extracted from the second memory means by the first motion compensating means. The block data provided within the first or second divided area of succeeding frame shown by motion vector data added to the block data of the first or second divided area of succeeding frame from the decoding means is extracted from the first or second divided area of succeeding frame from the decoding means by the second motion compensating means. The block data provided within the first or second divided area of preceding frame extracted by the first motion compensating means and the block data provided within the first or second divided area of succeeding frame extracted by the second motion compensating means are added by the first adding means and then averaged. The decoded data of the first or second divided area of present frame read out from the first memory means and the added output from the first adding means are added by the second adding means, and the selection information extracting means extracts the selection information from the decode information added to the encode information upon encoding. The control means selectively outputs the added output from the second adding means or the decoded data of the first or second divided area of present frame from the first memory means as decode information based on the selection information extracted by the selection information extracting means. If the decoding processing time is limited, then the block data of present frame extracted from the first and second divided areas of the memory area of the first memory means and encoded are decoded as they are. If the arrangement of encode information to be decoded is reverse to that in the encoding, then the block data of present frame extracted from the first and second divided areas of the memory area of the first memory means and encoded are decoded as they are. Furthermore, the difference data can be decoded by use of the block data of present frame extracted from the first or second divided area of adjacent frames of the corresponding frame. Therefore, a picture quality of decoded image obtained when data arrangement of encoded information to be decoded is reversed to that in the encoding can be made satisfactory even though the time required by the decoding processing is insufficient. Further, a motion of a moving object within the image can be made smooth.

In the recording and reproducing system, since the encoded information encoded by the above encoding processing is recorded on the recording medium, the encoded and recorded encoded information is reproduced from the recording medium and the reproduced encoded information is decoded, when data is reproduced from the recording medium at high speed, a time required by decoding is limited so that the block data of present frame extracted from the first and second divided areas of the memory area of the first memory means and encoded are decoded as they are. When data is reproduced from the recording medium in the reverse direction, although the arrangement of encoded information to be decoded is reversed to that in the encoding, the block data of present frame extracted from the first and second divided areas of the memory area of the first memory means and encoded are decoded as they are. Furthermore, the difference data can be decoded by use of block data of present frame extracted from the first or second divided area of adjacent frames of the corresponding frame. Therefore, without deteriorating the encoding efficiency, a picture quality obtained in the playback modes other than the playback mode wherein recorded image data is reproduced at normal speed in the positive direction can be improved, and a motion of the moving object within the image can be made smooth. In addition, a corresponding relationship between a reproduced picture and a position on a recording medium can be achieved easily, and hence the edit can be carried out at the frame unit.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An image information encoding apparatus comprising:

first memory means for storing therein image information of present frame to be encoded;

second memory means for storing therein image information of preceding frame which precedes a position of said present frame on a time base;

read/write control means for supplying read/write control signals to said first and second memory means such that block data are extracted from first and second divided areas of memory areas of at least said first and second memory means;

motion detecting means for effecting motion-detection by use of block data of present frame read out from said first memory means and block data of preceding frame read out from said second memory means to obtain first motion vector data based on a result of said motion detection processing, and effecting motion-detection by use of block data of present frame read out from said first memory means and block data in image information of succeeding frame which succeeds the position of said present frame on the time base to obtain second motion vector data based on a result of said motion detection processing;

first motion compensating means for extracting block data of preceding frame shown by said first motion vector data from said motion detecting means from image information of said preceding frame;

second motion compensating means for extracting block data of succeeding frame shown by said second motion vector data from said motion detecting means from image information of said succeeding frame;

first adding means for adding said block data of preceding frame from said first motion compensating means and said block data of succeeding frame from said second motion compensating means to provide a mean value;

second adding means for subtracting a mean value output from said first adding means from block data of present frame read out from said first memory means;

selection control means for selecting said block data of present frame read out from said first memory means and difference data from said second adding means; and compressing and encoding means for compressing and encoding said block data of present frame or said difference data selected by said selection control means and decode information including said selection information, wherein said selection control means selects block data of present frame extracted from said first divided area of the memory area of said first memory means during a first half period of at least one frame period, selects difference data which results from subtracting said mean value output from said first adding means from said block data of present frame extracted from said second divided area of the memory area of said first memory means by said second adding means during a second half period of said one frame period, selects block data of present frame extracted from said second divided area of the memory area of said first memory means during a first half period of the next frame period of said frame period, and selects difference data which results from subtracting said mean value output from said first adding means from block data of present frame extracted from said first divided area of the memory area of said first memory means by said second adding means during a second half period of the next frame period of said frame period.

2. An image information encoding apparatus as claimed in claim 1, wherein said control means includes quantization control means for detecting an encoded amount of encoded information from said encoding means and which controls a quantization step size of a quantization processing in said encoding means.

3. An image information encoding apparatus as claimed in claim 1, wherein said first divided area of memory areas of said first and second memory means is an area composed of memory areas where odd field pixel data are stored, and said second divided area is an area composed of memory areas where even field pixel data are stored.

4. In an image information decoding apparatus wherein a motion detection processing is carried out by use of block data in which image information of present frame to be encoded is divided into first and second divided areas, block data being extracted from said first or second divided area and block data in which image information of preceding frame which precedes a position of image information on a time base is divided into first and second divided areas, said block data being extracted from said first or second divided area, block data of preceding frame shown by first motion vector data obtained based on a result of said motion detection processing is extracted from said image information of preceding frame, a motion detection processing is executed by use of block data in which image information of present frame to be encoded is divided into first and second divided areas and which is extracted from said first or second divided area and block data in which image information of succeeding frame which succeeds a position of said image information of present frame on a time base is divided into first and second divided areas and which is extracted from said first or second divided area, said block data of succeeding frame shown by second motion vector data obtained based on a result of said motion detection processing is extracted from said image information of succeeding frame, said extracted block data of preceding frame is added to said extracted block data of succeeding frame to calculate a mean value, said mean value is subtracted from said block data of present frame extracted from said first or second divided area to provide difference data, said block data of present frame extracted from said first divided area is selected during a first half period of at least one frame period, and said difference data which results from subtracting said mean value from said block data of present frame extracted from said second divided area is selected during a second half period of said one frame period, said block data of present frame extracted from said second divided area is selected during a first half period of the next frame period of said frame period, and said difference data which results from subtracting said mean value from said block data of present frame extracted from said first divided area is selected during a second half period of the next frame period of said frame period, and encode information in which said selected selection information and decode information containing said selection information are compressed and encoded is decoded, said image information decoding apparatus comprising:

decoding means for decoding said compressed and encoded encode information to provide block data of preceding or succeeding frame or decoded data of present frame;

first memory means for storing therein block data of first and second divided areas of preceding frame from said decoding means;

second memory means for storing therein block data of first and second divided areas of preceding frame from said decoding means;

first motion compensating means for extracting from said second memory means block data within said first or second divided area of preceding frame shown by motion vector data added to said block data of first or second divided area of preceding frame from said decoding means upon encoding;

second motion compensating means for extracting from the first or second divided area of succeeding frame from said encoding means block data provided within said first or second divided area of succeeding frame shown by motion vector data added to said block data of said first or second divided area of succeeding frame from said decoding means upon encoding;

first adding means for adding and averaging block data provided within said first or second divided area of preceding frame extracted by said first motion compensating means and block data provided within said first or second divided area of succeeding frame extracted by said second motion detecting means;

second adding means for adding decoded data of first or second divided area of present frame read out from said first memory means and an added output from said first adding means;

selection information extracting means for extracting said selection information from decode information added to said encoded information upon encoding; and control means for selectively outputting said added output from said second adding means or decoded data of first or second divided area of present frame from said first memory means based on selection information extracted by said selection information extracting means as decode image information.

5. An image information decoding apparatus comprising:

memory means for storing therein image information of preceding frame which precedes a position of encoded present frame on a time base;

read/write control means for supplying a read/write control signal to said memory means such that macroblock data are respectively extracted from first and second divided areas of memories areas of at least said memory means;

motion detecting means for effecting a motion detection by use of said block data of present frame and block data of preceding frame read out from said memory mean, and obtaining motion vector data based on a result of said motion detection processing;

motion compensating means for extracting block data of preceding frame shown by said motion vector data supplied thereto from said motion detecting means from said image information of said frame;

adding means for subtracting from said block data of said frame block data of preceding frame supplied thereto from said motion compensating means;

selection control means for selecting said macroblock data of present frame and difference data supplied thereto from said adding means; and compressing and encoding means for compressing and encoding said block data of present frame or said difference data selected by said selection control means, and decode information including said selection information, wherein said selection control means selects block data of present frame extracted from said first divided area of present frame during a first half period of at least one frame period, selects difference data which results from subtracting block data from said motion compensating means from block data of present frame extracted from said second divided area of present frame by said adding means during a second half period of at least one frame period, selects block data extracted from said second divided area of present frame during a first half period of the next frame period of said frame period, and selects difference data which results from subtracting block data from said motion compensating means from block data of present frame extracted from said first divided area of present frame by said adding means during a second half period of the next frame period of said frame period.

6. An image information encoding apparatus as claimed in claim 5, wherein said control means includes quantization control means for detecting an encoded amount of encoded information from said encoding means and which controls a quantization step size of a quantization processing in said encoding means.

7. An image information encoding apparatus as claimed in claim 5, wherein said first divided area within said memory areas of said first and second memory means is an area composed of memory areas of odd field pixel data, and said second divided area is an area composed of memory areas of even field pixel data.

8. In an image information decoding apparatus in which a motion detection is carried out by use of block data in which image information of present frame to be encoded is divided into first and second divided areas, said block data being extracted from said first or second divided area, and block data in which image information of preceding frame which precedes a position of image information of present frame on a time base is divided into first and second divided areas, said block data being extracted from said first or second divided area, said block data of preceding frame shown by motion vector data obtained based on a result of said motion detection processing is extracted from said image information of preceding frame, block data extracted from said preceding frame by said motion vector data is subtracted from said block data of present frame extracted from said first or second divided area to provide difference data, block data of present frame extracted from said first divided area is selected during a first half period of at least one frame period, difference data which results from subtracting said block data of preceding frame from said block data of present frame extracted from said second divided area is selected during a second half period of said one frame period, block data of preceding frame extracted from said second divided area is selected during a first half period of the next period of said frame period, difference data which results from subtracting said block data of preceding frame from block data of present frame extracted from said first divided area is selected during a second half period of the next frame period of said frame period, and encoded information in which said selected information and decode information including said selected information is decoded, said image information decoding apparatus comprising:

decoding means for decoding said compressed and encoded encode information to provide block data of preceding frame or decoded data of present frame;

memory means for memorizing decoded data of present frame provided in first and second divided areas supplied thereto from said decoding means;

motion compensating means for extracting said block data of preceding frame located within first and second divided areas shown by motion vector data added to block data of preceding frame of first or second divided areas supplied thereto from said decoding means upon encoding;

adding means for adding decoded data of present frame of first or second divided area read out from said memory means and block data of preceding frame of first or second divided area from said motion compensating means;

selected information extracting means for extracting said selected information from decoded information added to said encoded information upon encoding; and control means for selectively outputting an added output from said adding means or decoded data of present frame of first or second divided areas from said first memory means as decode image information based on selection information extracted by said selection information extracting means.

9. An image information encoding apparatus comprising:

first memory means for storing therein image information of succeeding frame which succeeds a position of encoded image information of present frame on a time base;

second memory means for storing therein encoded information of present frame;

third memory means for storing therein image information of preceding frame which precedes a position of said image information of present frame on a time base;

read/write control means for supplying read/write control signals to said first, second and third memory means such that block data are extracted from first and second divided areas provided within memory areas of at least said first and second memory means;

motion detecting means for effecting a motion detection processing by use of block data of present frame read out from said second memory means and block data of preceding frame read out from said third memory means, obtaining first motion vector data based on a result of said motion detection processing, effecting a motion detection processing by use of block data of present frame read out from said second memory means and block data of succeeding frame read out from said first memory means, and obtaining second motion vector data based on a result of said motion detection processing;

first motion compensating means for extracting block data of preceding frame shown by said first motion vector data from said motion detecting means from said image information of preceding frame;

second motion detecting means for extracting block data of succeeding frame shown by said second motion vector data from said motion detecting means from said image information of succeeding frame;

first adding means for adding said block data of preceding frame supplied thereto from said first motion compensating means and said block data of succeeding frame supplied thereto from said second motion compensating means to obtain a mean value;

second adding means for subtracting a mean value output from said first adding means from block data of present frame read out from said first memory means;

selection control means for selecting block data of present frame read out from said first memory means and difference data from said second adding means; and compressing and encoding means for compressing and encoding said block data of present frame or said difference data selected by said selection control means and decode information including said selection information, wherein said selection control means selects block data of present frame extracted from said first divided area of the memory area of said second memory means during a first half period of at least one frame period, selects said difference data which results from subtracting said mean value output of said first adding means from block data of present frame extracted from said second divided area of the memory area of said second memory means by said second adding means during a second half period of at least one frame period, selects block data of present frame extracted from said second divided area of the memory means of said second memory during a first half period of the next period of said frame period, and selects said difference data which results from subtracting said mean value output from said first adding means from block data of present frame extracted from said first divided area of the memory area of said second memory means by said second adding means during a second half period of the next frame period of said frame period.

10. An image information encoding apparatus as claimed in claim 9, wherein said control means includes quantization control means for detecting an encoded amount of encoded image information from said encoding means and which controls a quantization step size of a quantization processing in said encoding means.

11. An image information encoding apparatus as claimed in claim 9, wherein said first divided area of memory areas of said first, second and third memory means is an area comprising memory areas of odd field pixel data, and said second divided area is an area comprising memory areas of even field pixel data.

12. An image information encoding apparatus as claimed in claim 9, wherein said first divided area of memory areas of said first, second and third memory means is an area comprising memory areas of upper half pixel data of frame image, and said second divided area is an area comprising memory areas of lower half pixel data of said frame image.

13. An image information encoding apparatus as claimed in claim 9, wherein said first divided area of memory areas of said first, second and third memory means is an area comprising memory areas of left half pixel data of frame image, and said second divided area is an area comprising memory areas of right half pixel data of said frame image.

14. An image information encoding apparatus as claimed in claim 9, wherein said first divided area of memory areas of said first, second and third memory means is an area comprising memory areas of pixel data of odd-numbered columns in the horizontal direction of frame image, and said second divided area is an area comprising memory areas of pixel data of even-numbered columns in the horizontal direction of said frame image.

15. An image information encoding apparatus as claimed in claim 9, wherein said first divided area of memory areas of said first, second and third memory means is an area comprising memory areas of odd-numbered pixel data of odd-numbered rows in the vertical direction of frame image and memory areas of even-numbered pixel data of even-numbered rows in the vertical direction of said frame image, and said second divided area is an area comprising memory areas of even-numbered pixel data of odd-numbered columns in the horizontal direction of said frame image and memory areas of odd-numbered pixel data of even-numbered columns in the vertical direction of said frame image.

16. In an image information decoding apparatus in which a motion detection processing is executed by use of block data in which encoded image information of present frame is divided into first and second divided areas, said block data being extracted from said first or second divided areas and block data in which block data of preceding frame which precedes a position of said image information of present frame on a time base is divided into first and second divide areas, said block data being extracted from said first or second divided area, said block data of preceding frame shown by first motion vector data obtained on the basis of a result of said motion detection processing is extracted from said image information of preceding frame, a motion detection processing is executed by use of block data in which encoded image information of present frame is divided into first and second divided areas, said block data of succeeding frame shown by second motion vector data obtained on the basis of a result of said motion detection processing is extracted from said image information of succeeding frame, said extracted block data of preceding frame and said extracted block data of succeeding frame are added to provide a mean value, said mean value is subtracted from block data of present frame extracted from said first or second divided area to provide difference data, said block data of present frame extracted from said first divided area is selected during a first half period of at least one frame period, said difference data, which results from subtracting said mean value from said block data of present frame extracted from said second divided area, is selected during a second half period of said one frame period, said block data of present frame extracted from said second divided area is selected during a first half period of the next frame period of said frame period, said difference data, which results from subtracting said mean value from said block data of present frame extracted from said first divided area, is selected during a second half period of the next frame period of said frame period, and encoded information in which said selected selection information and decode information including said selection information are compressed and encoded are decoded, said image information decoding apparatus comprising:

decoding means for decoding said compressed and encoded encode information to provide block data of preceding or succeeding frame or decoded data of present frame;

first memory means for storing therein decoded data of first and second divided areas of present frame supplied thereto from said decoding means;

second memory means for storing therein decoded data of first and second divided area of preceding frame supplied thereto from said decoding means;

first motion compensating means for extracting from said second memory means said block data of first or second divided area of preceding frame shown by motion vector data added to block data of first or second divided area of preceding frame supplied thereto from said second memory means upon encoding;

second motion compensating means for extracting from first or second divided area of succeeding frame from said decoding means said block data of first or second divided area of succeeding frame shown by motion vector data added to block data of first or second divided area of succeeding frame supplied thereto from said decoding means upon encoding;

first adding means for averaging said block data by adding said block data of first or second divided area of preceding frame extracted by said first motion compensating means and said block data of first or second divided area of succeeding frame extracted by said second motion compensating means;

second adding means for adding said decoded data of first or second divided area of present frame read out from said second memory means and an added output from said first adding means;

selection information extracting means for extracting said selection information from decode information added to said encoding information upon encoding; and control means for selectively outputting an added output from said second adding means or decoded data of first or second divided area of present frame supplied thereto from said first memory means based on selection information extracted by said selection information extracting means as decode image information.

17. An image information encoding apparatus comprising:

first memory means for storing therein image information of present frame to be encoded;

second memory means for storing therein image information of preceding frame which precedes a position of image information of present frame on a time base;

read/write control means for supplying read or write control signals for extracting block data from first and second divided areas within memory areas of at least first and second memory means to said first and second memory means;

motion detecting means for executing a motion detection processing by use of block data of present frame read out from said first memory means and block data of preceding frame read out from said second memory means, and obtaining motion vector data based on a result of said motion detection processing;

motion compensating means for extracting said block data of preceding frame shown by said motion vector data from said motion detecting means from image information of preceding frame stored in said second memory means;

adding means for subtracting block data of preceding frame supplied thereto from said motion compensating means from said block data of present frame;

selection control means for selecting said block data of present frame and difference data supplied thereto from said adding means; and compressing and encoding means for compressing and encoding said block data of present frame or said difference data selected by selection control of said selection control means and decode information including said selection information, wherein said selection control means selects block data of present frame extracted from said first divided area of said present frame during a first half period of at least one frame period, selects difference data, which results from subtracting block data supplied thereto from said motion compensating means from said block data of present frame extracted from said second divided area of said present frame, during a second half period of said one frame, selects block data extracted from said second divided area of said present frame during a first half period of the next frame period of said frame period, and selects difference data, which results from subtracting block data supplied thereto from said motion compensating means from said block data of present frame extracted from said first divided area of said present frame by said adding means, during a second half period of the next frame period of said frame period.

18. An image information encoding apparatus as claimed in claim 17, wherein said control means includes quantization control means for detecting an encoded amount of encoded image information from said encoding means and which controls a quantization step size of a quantization processing in said encoding means.

19. An image information encoding apparatus as claimed in claim 17, wherein said first divided area within memory areas of said first and second memory means is an area comprising memory ares of odd field pixel data and said second divided area is an area comprising memory areas of even field pixel data.

20. An image information encoding apparatus as claimed in claim 17, wherein said first divided area within memory areas of said first and second memory means is an area comprising memory areas of pixel data of upper half of a frame image and said second divided area is an area comprising memory areas of pixel data of lower half of said frame image.

21. An image information encoding apparatus as claimed in claim 17, wherein said first divided area within memory areas of said first and second memory means is an area comprising memory areas of pixel data of left half of a frame image and said second divided area is an area comprising memory areas of pixel data of right half of said frame image.

22. An image information encoding apparatus as claimed in claim 17, wherein said first divided area within memory areas of said first and second memory means is an area comprising memory areas of pixel data of odd-numbered columns in the horizontal direction of a frame image and said second divided area is an area comprising memory ares of pixel data of even-numbered columns in the horizontal direction of said frame image.

23. An image information encoding apparatus as claimed in claim 17, wherein said first divided area within memory areas of said first and second memory means is an area comprising memory areas of odd-numbered pixel data of odd-numbered columns in the vertical direction of a frame image and even-numbered pixel data of even-numbered rows in the vertical direction of said frame image, and said second divided area is an area comprising memory areas of even-numbered pixel data of odd-numbered rows in the horizontal direction of said frame image and odd-numbered pixel data of even-numbered columns in the vertical direction of said frame image.

24. In an image information decoding apparatus wherein a motion detection processing is executed by use of block data in which image information of present frame to be encoded is divided into first and second divided areas, said block data being extracted from said first or second divided area, and block data in which image information of preceding frame which precedes a position of said image information of present frame on a time base is divided into first and second divided areas, said block data being extracted from said first or second divided area, said block data of preceding frame shown by motion vector data obtained based on a result of said motion detection processing is extracted from said image information of preceding frame, said image information of preceding frame is subtracted from block data of present frame extracted from said first or second divided area to provide difference data, said block data of present frame extracted from said first divided area is selected during a first half period of at least one frame period, difference data which results from subtracting block data extracted from said image information of preceding frame from said block data of present frame extracted from said second divided area is selected during a second half period of said one frame period, said block data of present frame extracted from said second divided area is selected from a first half period of the next frame period of said frame period, said difference data which results from subtracting block data extracted from said image information of preceding frame from said block data of present frame extracted from said first divided area is selected from a second half period of the next frame period of said frame period, and encoded information in which said selected selection information and decode information including said selection information are compressed and encoded is decoded, said image information decoding apparatus comprising:

decoding means for decoding said compressed and encoded encode information to provide block data of preceding frame or decoded data of present frame;

first memory means for storing therein decoded data of first and second divided areas of present frame supplied thereto from said decoding means;

second memory means for storing therein decoded data of first and second divided areas of preceding frame supplied thereto from said decoding means;

motion compensating means for extracting from said second memory means said block data within said first or second divided area of preceding frame shown by motion vector data added to said block data of first or second divided area of preceding frame from said second memory means upon encoding;

adding means for adding decoded data of first or second divided area of present frame read out from said first memory means and said block data of first or second divided area of preceding frame supplied thereto from said motion compensating means;

selection information extracting means for extracting said selection information from decode information added to said encoded information upon encoding; and control means for selectively outputting an added output from said adding means or decoded data of first or second divided area of present frame supplied thereto from said first memory means based on selection information extracted by said selection information extracting means as decode image information.

25. An image information recording and reproducing system comprising:

a recording system including:
first memory means for storing therein image information of present frame to be encoded;
second memory means for storing therein image information of preceding frame which precedes a position of said image information of present frame on a time base;
read/write control means for supplying read or write control signals for extracting block data from first and second divided areas provided within memory areas of at least said first and second memory means to said first and second memory means;
motion detecting means for executing a motion detection processing by use of block data of present frame read out from said first memory means and block data of preceding frame read out from said second memory means to obtain first motion vector data based on a result of said motion detection processing, and executing a motion detection processing by use of block data of present frame read out from said first memory means, and block data in image information of succeeding frame which succeeds a position of said block data of present frame on a time base to obtain second motion vector data based on a result of said motion detection processing;

first motion compensating means for extracting from said image information of preceding frame said block data of preceding frame shown by said first motion vector data supplied thereto from said motion detecting means;

second motion compensating means for extracting from said image information of succeeding frame said block data of succeeding frame shown by said second motion vector data supplied thereto from said motion detecting means;

first adding means for adding said block data of preceding frame supplied thereto from said first motion compensating means and said block data of succeeding frame supplied thereto from said second motion compensating means to provide a mean value;

second adding means for subtracting a mean value output from said first adding means from block data of present frame read out from said first memory means;

selection control means for selecting block data of present frame extracted from said first divided area of memory areas of said first memory means during a first half period of at least one frame period, selecting difference data which results from subtracting said mean value output from said first adding means from block data of present frame extracted from said second divided area of memory areas of said first memory means by said second adding means during a second half period of said one frame period, selecting said block data of present frame extracted from said second divided area of memory ares of said first memory means during a first half period of the next frame period of said frame period, and selecting said difference data which results from subtracting said mean value output from said first adding means from said block data of present frame extracted from said first divided area of memory areas of said first memory means by said second adding means during a second half period of said one frame period;

compressing and encoding means for compressing and encoding said block data of present frame or difference data selected by selection control of said selection control means and decode information including said selection information;

recording means for recording compressed and encoded data from said compressing and encoding means on a recording medium; and a reproducing system including:

reproducing means for reproducing said compressed and encoded data from said recording medium;

decoding means for decoding encoded information reproduced by said reproducing means to provide block data of preceding or succeeding frame or decoded data of present frame;

third memory means for storing therein decoded data of first and second divided areas of present frame from said decoding means;

fourth memory means for storing therein block data of first and second divided areas of preceding frame from said decoding means;

third motion compensating means for extracting from said fourth memory means said block data within first or second divided area of preceding frame shown by motion vector data added to block data of first or second divided area of preceding frame from said fourth memory means upon encoding;

fourth motion compensating means for extracting said first or second divided area of succeeding frame from said decoding means said block data within said first or second divided area of succeeding frame shown by motion vector data added to block data of first or second divided area of succeeding frame from said decoding means upon encoding;

third adding means for adding said block data of first or second divided area of preceding frame extracted by said third motion compensating means and said block data of first or second divided area of succeeding frame extracted by said fourth motion compensating means to provide a mean value;

fourth adding means for adding decoded data of first or second divided area of said present frame read out from said third memory means and an added output from said third adding means;

selection information extracting means for extracting said selection information from decode information added to said encoded information upon encoding; and control means for selectively outputting an added output from said fourth adding means or decoded data of first or second divided area of present frame from said third memory means based on selection information extracted by said selection information extracting means as decoded image information.

26. An image information recording and reproducing system as claimed in claim 25, wherein said control means includes quantization control means for detecting an encoded amount of image data from said encoding means and which controls a quantization step size of a quantization processing in said encoding means based on a detected result.

27. An image information recording and reproducing system as claimed in claim 25, wherein said first divided area provided within memory areas of said first and second memory means is an area comprising memory areas of odd field pixel data, and said second divided area is an area comprising memory areas of even field pixel data.

28. An image information recording and reproducing system comprising:

a recording system including:

first memory means for storing therein image information of preceding frame which precedes a position of image information of present frame on a time base;

read/write control means for supplying read or write control signals for extracting block data from first and second divided areas within memory area of at least said first memory means to said first memory means;

motion detecting means for executing a motion detection processing by use of said block data of present frame and block data of preceding frame read out from said first memory means to provide motion vector data based on a result of said motion detection processing;

first motion compensating means for extracting from said image information of preceding frame block data of preceding frame shown by motion vector data;

first adding means for subtracting block data of preceding frame supplied thereto from said first motion compensating means from said block data of present frame;

selection control means for selecting block data of present frame extracted from said first divided area of present frame during a first half period of at least one frame period, selecting difference data which results from subtracting block data supplied thereto from said first motion compensating means from said block data of present frame extracted from said second divided area of present frame by said first adding means during a second half period of said one frame period, selecting block data extracted from said second divided area of present frame during a first half period of the next frame period of said frame period, and selecting difference data which results from subtracting block data supplied thereto from said first motion compensating means from block data of present frame extracted from said first divided area of present frame by said first adding means during a second half period of the next frame period of said frame period;

compressing and encoding means for compressing and encoding said block data of present frame or said difference data selected by selection control of said selection control means and decode information including said selection information to provide compressed and encoded information; and recording means for recording said compressed and encoded information on a recording medium; and a reproducing system including:

reproducing means for reproducing said compressed and encoded information from said recording medium;

decoding means for decoding said compressed and encoded encoding information to provide block data of preceding frame or decoded data of present frame;

second memory means for storing therein decoded data of first and second divided area of preceding frame supplied thereto from said decoding means;

second motion compensating means for extracting said block data of first or second divided area of preceding frame shown by motion vector data added to said block data of first or second divided area of preceding frame supplied thereto from said second memory means from said second memory means;

second adding means for adding said decoded data of first or second divided area of present frame supplied thereto from said decoding means and said block data of first or second divided area of preceding frame supplied thereto from said second motion compensating means;

selection information extracting means for extracting said selection information from decode information added to said encoded information upon encoding; and control means for selectively outputting an added output from said second adding means or said decoded data of first or second divided areas of present frame supplied thereto from said second memory means based on selection information extracted by said selection information extracting means as decode image information.

29. An image information recording and reproducing system as claimed in claim 28, wherein said control means includes quantization control means for detecting an encoded amount of encoded image data from said encoding means and which controls a quantization step size of a quantization processing in said encoding means based on a detected result.

30. An image information recording and reproducing system as claimed in claim 28, wherein said first divided area provided within memory areas of said first and second memory means is an area comprising memory areas of odd field pixel data, and said second divided area is an area comprising memory areas of even field pixel data.

31. An image information recording and reproducing system comprising:

a recording system including:

first memory means for storing therein image information of succeeding frame which succeeds a position of image information of present frame on a time base;

second memory means for storing therein image information of present frame to be encoded;

third memory means for storing therein image information of preceding frame which precedes a position of said image information of present frame on a time base;

read/write control means for supplying read or write control signals for extracting block data from first and second divided areas within memory area of at least said first and second memory means to said first, second and third memory means;

motion detecting means for executing a motion detection processing by use of said block data of present frame read out from said second memory means and block data of preceding frame read out from said third memory means to provide first motion vector data based on a result of said motion detection processing and executing a motion detection processing by use of block data of present frame read out from said second memory means and said block data of succeeding frame read out from said first memory means to provide second motion vector data based on a result of said motion detection processing;

first motion compensating means for extracting from said image information of preceding frame block data of preceding frame shown by said first motion vector data supplied thereto from said motion detecting means;

second motion compensating means for extracting from said image information of succeeding frame block data of succeeding frame shown by said second motion vector data supplied thereto from said motion detecting means;

first adding means for adding block data of preceding frame supplied thereto from said first motion compensating means and said block data of succeeding frame supplied thereto from said second motion compensating means to provide a mean value;

second adding means for subtracting a mean value output from said first adding means from said block data of present frame read out from said first memory means;

selection control means for selecting block data of present frame extracted from said first divided area of memory area of said second memory means during a first half period of at least one frame period, selecting difference data which results from subtracting said mean value output from said first adding means from said block data of present frame extracted from said second divided area of memory area of said second memory means during a second half period of said one frame period, selecting block data of present frame extracted from said second divided area of memory area of said second memory means during a first half period of the next frame period of said frame period, and selecting difference data which results from subtracting said mean value output from said first adding means from block data of present frame extracted from said first divided area of memory area of said second memory means during a second half period of the next frame period of said frame period;

compressing and encoding means for compressing and encoding said block data of present frame or said difference data selected by selection control of said selection control means and decode information including said selection information to provide compressed and encoded information; and recording means for recording said compressed and encoded information on a recording medium; and a reproducing system including:

reproducing means for reproducing said compressed and encoded information from said recording medium;

decoding means for decoding said compressed and encoded encoding information to provide block data of preceding or succeeding frame or decoded data of present frame;

fourth memory means for storing therein decoded data of first and second divided areas of present frame supplied thereto from said decoding means;

fifth memory means for storing therein decoded data of first and second divided areas of preceding frame supplied thereto from said decoding means;

third motion compensating means for extracting said block data of first or second divided area of preceding frame shown by motion vector data added to said block data of first or second divided area of preceding frame supplied thereto from said fifth memory means from said fifth memory means;

fourth motion compensating means for extracting block data provided within said first or second divided area of said succeeding frame shown by said motion vector data added to said block data of said first or second divided area of succeeding frame supplied thereto from said decoding means from said first or second divided area of succeeding frame from said decoding means;

third adding means for adding said block data provided within said first or second divided are of preceding frame extracted by said third motion compensating means and said block data provided within said first or second divided area of succeeding frame extracted by said fourth motion compensating means to provide a mean value;

fourth adding means for adding decoded data of said first or second divided area of present frame read out from said fourth memory means, and an added output from said third adding means;

selection information extracting means for extracting said selection information from decode information added to said encoded information upon encoding; and control means for selectively outputting an added output from said fourth adding means or decoded data of said first or second divided area of present frame supplied thereto from said fourth memory means based on selection information extracted by said selection information extracting means as decode image information.

32. An image information recording and reproducing system as claimed in claim 31, wherein said control means includes quantization control means for detecting an encoded amount of encoded image data from said encoding means and which controls a quantization step size of a quantization processing in said encoding means based on a detected result.

33. An image information recording and reproducing system as claimed in claim 31, wherein said first divided area of memory areas of said first, second, third, fourth and fifth memory means is an area comprising memory areas of odd field pixel data, and said second divided area is an area comprising memory areas of even field pixel data.

34. An image information recording and reproducing system as claimed in claim 31, wherein said first divided area of memory areas of said first, second, third, fourth and fifth memory means is an area comprising memory areas of upper half pixel data of an frame image, and said second divided area is an area comprising memory areas of lower half pixel data of said frame image.

35. An image information recording and reproducing system as claimed in claim 31, wherein said first divided area of memory areas of said first, second, third, fourth and fifth memory means is an area comprising memory areas of left half pixel data of a frame image, and said second divided area is an area comprising memory areas of right half pixel data of said frame image.

36. An image information recording and reproducing system as claimed in claim 31, wherein said first divided area of memory areas of said first, second, third, fourth and fifth memory means is an area comprising memory areas of pixel data of odd-numbered columns i n the horizontal direction of a frame image, and said second divided area is an area comprising memory areas of pixel data of even-numbered columns in the horizontal direction of said frame image.

37. An image information recording and reproducing system as claimed in claim 31, wherein said first divided area of memory areas of said first, second, third, fourth and fifth memory means is an area comprising memory areas of odd-numbered pixel data of odd-numbered rows in the vertical direction of a frame image and memory areas of even-numbered pixel data of even-numbered rows in the vertical direction of said frame image, and said second divided area is an area comprising memory areas of even-numbered pixel data of odd-numbered columns in the horizontal direction of said frame image and memory areas of odd-numbered pixel data of even-numbered columns in the vertical direction of said frame image.

38. An image information recording and reproducing system comprising:

a recording system including:

first memory means for storing therein image information of present frame to be encoded;

second memory means for storing therein image information of preceding frame which precedes a position of said image information of present frame on a time base;

read/write control means for supplying read or write control signals for extracting block data from first and second divided areas provided within memory areas of at least said first and second memory means to said first and second memory means;

motion detecting means for executing a motion detection processing by use of block data of present frame read out from said first memory means and block data of preceding frame read out from said second memory means to provide motion vector data based on a result of said motion detection processing;

first motion compensating means for extracting said block data of preceding frame shown by said motion vector data from said motion detecting means from said image information of preceding frame stored in said second memory means;

first adding means for subtracting said block data of preceding frame supplied thereto from said first motion compensating means from said block data of present frame;

selection control means for selecting block data of present frame extracted from said first divided area of present frame during a first half period of at least one frame period, selecting difference data which results from subtracting said block data supplied thereto from said first motion compensating means from said block data of present frame extracted from said second divided area of said present frame by said first adding means during a second half period of said frame period, selecting block data extracted from said second divided area of said present frame during a first half period of the next frame period of said frame period, and selecting difference data which results from subtracting said block data supplied thereto from said first motion compensating means from said block data of present frame extracted from said first divided area of present frame by said first adding means during a second half period of the next frame period of said frame period; and compressing and encoding means for compressing and encoding said block data of present frame or said difference data selected by selection control of said selection control means and decode information including said selection information to provide compressed and encoded information; and a reproducing system including:

reproducing means for reproducing said compressed and encoded information from said recording medium;

decoding means for decoding said compressed and encoded encoding information to provide block data of preceding frame or decoded data of present frame;

third memory means for storing therein decoded data of said first and second divided areas of present frame supplied thereto from said decoding means;

fourth memory means for storing therein decoded data of said first and second divided areas of preceding frame supplied thereto from said decoding means;

second motion compensating means for extracting from said fourth memory means block data provided within said first or second divided area of said preceding frame shown by motion vector data added to said block data of first or second divided area of preceding frame supplied thereto from said third memory means upon encoding;

second adding means for adding decoded data of first or second divided area of said present frame read out from said third memory means and block data of said first and second divided area of preceding frame supplied thereto from said second motion compensating means;

selection information extracting means for extracting said selection information from decode information added to said encoded information upon encoding; and control means for selectively outputting an added output from said second adding means or decoded data of said first or second divided area of present frame supplied thereto from said third memory means based on selection information extracted by said selection information extracting means as decode image information.

39. An image information recording and reproducing system as claimed in claim 38, wherein said control means includes quantization control means for detecting an encoded amount of encoded image data from said encoding means and which controls a quantization step size of a quantization processing in said encoding means based on a detected result.

40. An image information recording and reproducing system as claimed in claim 38, wherein said first divided area within memory areas of said first, second, third and fourth memory means is an area comprising memory areas of odd field pixel data and said second divided area is an area comprising memory areas of even field pixel data.

41. An image information recording and reproducing system as claimed in claim 38, wherein said first divided area within memory areas of said first, second, third and fourth memories is an area comprising memory areas of upper half pixel data of a frame image and said second divided area is an area comprising memory ares of lower half pixel data of said frame image.

42. An image information recording and reproducing system as claimed in claim 38, wherein said first divided area within memory areas of said first, second, third and fourth memory means is an area comprising memory areas of left half pixel data of a frame image and said second divided area is an area comprising memory areas of right half pixel data of said frame image.

43. An image information recording and reproducing system as claimed in claim 38, wherein said first divided area within memory areas of said first, second, third and fourth memory means is an area comprising memory area of pixel data of odd-numbered columns in the horizontal direction of a frame image and said second divided area is an area comprising memory areas of pixel data of even-numbered columns in the horizontal direction of said frame image.

44. An image information recording and reproducing system as claimed in claim 38, wherein said first divided area within memory areas of said first, second, third and fourth memory means is an area comprising memory areas of odd-numbered pixel data of odd-numbered rows in the vertical direction of a frame image and even-numbered pixel data of even-numbered columns in the vertical direction of said frame image and said second divided area is an area comprising memory areas of even-numbered pixel data of odd-numbered rows in the horizontal direction of said frame image and odd-numbered pixel data of even-numbered columns in the vertical direction of said frame image.

* * * * *